United States Patent
Nakajima et al.

(10) Patent No.: US 7,260,266 B2
(45) Date of Patent: Aug. 21, 2007

(54) IMAGE PROCESSING METHOD, IMAGE PROCESSING APPARATUS, IMAGE PROCESSING PROGRAM AND IMAGE RECORDING APPARATUS

(75) Inventors: Takeshi Nakajima, Hino (JP); Tsukasa Ito, Musashino (JP); Kouji Miyawaki, Hino (JP)

(73) Assignee: Konica Corporation, Tokyo (JP)

( * ) Notice: Subject to any disclaimer, the term of this patent is extended or adjusted under 35 U.S.C. 154(b) by 875 days.

(21) Appl. No.: 10/669,694

(22) Filed: Sep. 23, 2003

(65) Prior Publication Data
US 2004/0066850 A1 Apr. 8, 2004

(30) Foreign Application Priority Data
Oct. 4, 2002 (JP) ............................. 2002-292140

(51) Int. Cl.
G06K 9/46 (2006.01)
G06K 9/40 (2006.01)
(52) U.S. Cl. ...................................... 382/240; 382/254
(58) Field of Classification Search ................ 382/162, 382/164, 166, 173, 232, 233, 240, 254, 275, 382/260–264, 284; 345/589, 600–604; 375/240.19
See application file for complete search history.

(56) References Cited

U.S. PATENT DOCUMENTS

| | | | |
|---|---|---|---|
| 5,619,998 A * | 4/1997 | Abdel-Malek et al. ........ | 600/437 |
| 6,381,280 B1 * | 4/2002 | Lynch et al. ............ | 375/240.19 |
| 6,801,672 B1 * | 10/2004 | Thomas ..................... | 382/275 |
| 6,912,319 B1 * | 6/2005 | Barnes et al. ................ | 382/240 |
| 2002/0054713 A1 * | 5/2002 | Matsuura ..................... | 382/275 |
| 2003/0133500 A1 * | 7/2003 | Auwera et al. ........ | 375/240.11 |
| 2004/0066850 A1 * | 4/2004 | Nakajima et al. ...... | 375/240.19 |
| 2004/0071363 A1 * | 4/2004 | Kouri et al. ................ | 382/276 |
| 2004/0170335 A1 * | 9/2004 | Pearlman et al. ........... | 382/240 |
| 2004/0213477 A1 * | 10/2004 | Nakajima et al. ........... | 382/254 |
| 2005/0141778 A1 * | 6/2005 | Nakajima et al. ........... | 382/254 |

(Continued)

FOREIGN PATENT DOCUMENTS

JP 09-022460 A 1/1997

(Continued)

OTHER PUBLICATIONS

Strang G., et al., "Wavelet and Filter Banks" Wellesley-Cambridge Press, pp. 28-45, Sep. 2000.

(Continued)

*Primary Examiner*—Amir Alavi
(74) *Attorney, Agent, or Firm*—Frishauf, Holtz, Goodman & Chick, P.C.

(57) ABSTRACT

There are described an image processing method, an image processing apparatus, an image processing program and an image recording apparatus characterized by reduced computation loads and capable of suppressing the mottled granular noise contained in color image signals and enhancing the sharpness of the image, without generating noises similar to color misregistration and false color contour appearing close to the edge. The image processing method includes the steps of: converting the image signals to luminance signals and chrominance signals; applying a Dyadic Wavelet transform processing to at least the luminance signals; suppressing a signal intensity of a high-frequency luminance component at P-th level, when the intensity of the high-frequency luminance component conforms to a specific condition; applying a Dyadic Wavelet inverse-transform processing to transformed and processed signals; and synthesizing processed luminance signals and the chrominance signals with each other to generate processed image signals.

62 Claims, 11 Drawing Sheets

FOREIGN PATENT DOCUMENTS

| JP | 09-212623 A | 8/1997 |
| JP | 2000-215307 A | 8/2000 |
| JP | 2000-224421 A | 8/2000 |
| JP | 2001-143068 A | 5/2001 |
| JP | 2001-155148 A | 6/2001 |

OTHER PUBLICATIONS

Mallat S. et al., "Singularity detection and processing with wavelets", IEEE Trans. Inform. Theory, 38 617 (1992) pp. 220-241.

Mallat S. et al., "Characterization of signal from multiscale edges", IEEE Trans. Pattern Anal. Machine Intel., 14 710 (1992) pp. 148-156.

"Digital Photography" Chapter 2 and 3, Published by the Society of Photographic Science and Technology of Japan, Corona Publishing Co., Ltd. Sep. 2000.

"Practical Image Processing Learnt in C-Language" p. 54, by Inoue et al., OHM Publishing Co., Ltd. (2001).

"Singularity Detection and Processing With Wavelets" by S. Mallat and W. L. Hwang, IEEE Trans. Inform. Theory 38 617 (1992).

"Characterization of Signal From Multiscale Edges" by S. Mallat and S. Zhong, IEEE Trans. Patter Anal. Machine Intel. 14 710 (1992).

Chang, S. G. et al., "Adaptive Wavelet Thresholding for Image Denoising and Compression" IEEE Transactions on Image Processing, IEEE Inc. New York, US, vol. 9, No. 9, Sep. 9, 2000, pp. 1532-1546, XP000963526, ISSN:1057-7149.

Donoho D. L. et al., "Threshold Selection for Wavelet Shrinkage of Noisy Data" Engineering in Medicine and Biology Society, 1994, Engineering Advances: New Opportunities for Biomedical Engineers., Proceedings of the 16th Annual International Conference of the IEEE Baltimore, MD, USA Nov. 3-6, 1994, New York, NY, USA, IEEE, US, Nov. 3, 1994, pp. A24-A25, XP010145191, ISBN: 0-7803-2050-6.

Nowak, R. D. et al. "Wavelet-Domain Filtering for Photon Imaging Systems" IEEE Transactions on Image Processing, IEEE Inc. New York, US, vol. 8, No. 5, May 1, 1999, pp. 666-678, XP002240325, ISSN: 1057-7149.

Shapiro J. M., "Embedded Image Coding Using Zerotrees of Wavelet Coefficients" IEEE Transactions on Signal Processing, IEEE, Inc. New York, US, vol. 41, No. 12, Dec. 1, 1993, pp. 3445-3462, XP000426658, ISSN: 1053-587X.

* cited by examiner

IMAGE PROCESSING METHOD, IMAGE PROCESSING APPARATUS, IMAGE PROCESSING PROGRAM AND IMAGE RECORDING APPARATUS

BACKGROUND OF THE INVENTION

The present invention relates to an image processing method, an image processing apparatus, an image processing program and an image recording apparatus; particularly to an image processing method, an image processing apparatus, an image processing program and an image recording apparatus for an image formed into image signals through scanning of a color photographic film.

The image formed on the color photographic film is optically read by a CCD sensor or the like and is converted into image signals. After having been subjected to various types of image processing represented by negative/positive reversal, brightness adjustment, color balance adjustment, removal of granular noise and enhancement of sharpness, such image signals are distributed through such media as a CD-R, floppy (R) disk and memory card or via the Internet, and are outputted as hard copy images on silver halide photographic paper by an inkjet printer, thermal printer or the like. Alternatively, such image signals are displayed on the medium such as CRT, liquid crystal display or plasma display to be viewed.

Generally, a photographic film image is formed by a collection of pigment clouds of various sizes. When this image is enlarged for observation, mottled granular irregularity is visible according to the size of pigment clouds, although uniform colors should appear. Corresponding granular noise signals are included in the image signals obtained by optical reading of the image formed on a photographic film, using a CCD sensor or others. These granular noise signals are increased considerably with image processing of sharpness enhancement in particular, with the result that image quality is deteriorated. This has created a problem.

In recent years, a less costly digital still camera (hereinafter abbreviated as "DSC") has come into widespread use. The DSC incorporated in such equipment as a cellular phone and laptop PC is also extensively used. The image sensor used in a less-costly DSC is characterized by a small pixel pitch. Shot noise tends to be produced at a low sensitivity, and not much consideration is given to cooling of an image sensor, so that conspicuous dark current noise is produced. The CMOS image sensor is often adopted in the less-costly DSC, so leakage current noise is conspicuous. When such noise is further subjected to image processing of interpolation of color filter arrangement and edge enhancement, the mottled granular irregularities are formed to deteriorate image quality. This has raised a problem. (For DSC noise and interpolation of color film arrangement, see the Non-Patent Document 1 listed later, for example).

To remove noise from image signals, the low-pass filter median filter technique is known. (See the Non-Patent Document 2 listed later, for example). However, noise removal by simple filtering involves reduced image sharpness, and a satisfactory image cannot be obtained.

Another widely known method for solving the above-mentioned problem is to use multiple filters to separate image signals into multiple frequency band components, and then to carry out suppression and enhancement for each frequency band. The Patent Documents 1 and 2 (listed later) propose the following technique, for example: Inputted image signals are decomposed into low, intermediate and high frequency band components, and enhancement processing is applied to the above-mentioned high frequency band components. At the same time, suppression processing is applied to the above-mentioned intermediate frequency band components. Processed high and intermediate frequency band components are synthesized with low frequency band components to get processed image signals, whereby granular noise is suppressed and sharpness is enhanced. By uniform suppression of the intermediate frequency band component where granular noise is mainly present, this technique has the effect of removing the granular irregularities that appear as mottles on the screen. However, since the information on image structure present on the intermediate frequency band components is also suppressed at the same time, shadow is suppressed on the bridge of the nose or around the eyes, for example, and the face appears blurred. A smooth expressionless face wearing makeup will appear.

The Patent Documents 3 and 4 (listed later) propose a technique of changing the filter conditions for each local site of an image, using the low-pass filter with varying sizes and shape. In this technique, the intermediate and high frequency band components are suppressed to remove the granular noise on the flat portion characterized by monotonous changes in brightness such as the cheek of the face or blue sky; whereas, on the edge portion such as hair and contour of the face characterized by sharp change in the brightness, a blur can be avoided without the intermediate frequency band components being suppressed. To get such an effect, however, a decision must be made to set the size and shape of the low-pass filter adequately for each step of processing. This takes much time and it is difficult to get sufficient effects by automatic processing of a desired image.

The frequency band is divided for each local site of an image, and a technique of using a wavelet transform is known as an effective way of suppression and enhancement for each frequency band. The details of wavelet transform are disclosed in the Non-Patent Documents 3 and 4. The following describes the overview:

The wavelet transform is operated as follows: In the first place, the following wavelet function is used, where vibration is observed in a finite range as shown in FIG. 1:

[Eq. 1] (1)
$$\psi_{a,b}(x) = \psi\left(\frac{x-b}{a}\right)$$

Using the above function, the wavelet transform coefficient $<f, \psi_{a,b}>$ with respect to input signal f(x) is obtained by:

[Eq. 2] (2)
$$\langle f, \psi_{a,b}\rangle \equiv \frac{1}{a}\int f(x)\cdot\psi\left(\frac{x-b}{a}\right)dx$$

Through this process, input signal is converted into the sum total of the wavelet function.

[Eq. 3] (3)

-continued $$f(x) = \sum_{a,b} \langle f, \psi_{a,b} \rangle \cdot \psi_{a,b}(x)$$

In the above equation, "a" denotes the scale of the wavelet function, and "b" the position of the wavelet function. As shown in FIG. 1, as the value "a" is greater, the frequency of the wavelet function $\psi_{a,b}(x)$ is smaller. The position where the wavelet function $\psi_{a,b}(x)$ vibrates moves according to the value of position "b". Thus, Eq. 3 signifies that the input signal f(x) is decomposed into the sum total of the wavelet function $\psi_{a,b}(x)$ having various scales and positions.

A great number of the wavelet functions are known, that allow the above-mentioned conversion. In the field of image processing, orthogonal wavelet and biorthogonal wavelet biorthogonal wavelet are put into common use. The following describes the overview of the conversion calculation of the orthogonal wavelet and biorthogonal wavelet.

Orthogonal wavelet and biorthogonal wavelet functions are defined as follows:

[Eq. 3]

$$\psi_{i,j}(x) = 2^{-i}\psi\left(\frac{x - j \cdot 2^i}{2^i}\right) \quad (4)$$

where "i" denotes a natural number.

Comparison between Eq. 4 and Eq. 1 shows that the value of scale "a" is defined discretely by an i-th power of "2", according to orthogonal wavelet and biorthogonal wavelet. This value "i" is called a level. In practical terms, level "i" is restricted up to finite upper limit N, and input signal is converted as follows:

[Eq. 5]

$$f(x) \equiv S_0 = \sum_j \langle S_0, \psi_{1,j}\rangle \cdot \psi_{1,j}(x) + \sum_j \langle S_0, \psi_{1,j}\rangle \cdot \phi_{1,j}(x) \quad (5)$$

$$\equiv \sum_j W_1(j) \cdot \psi_{1,j}(x) + \sum_j S_1(j) \cdot \phi_{1,j}(x)$$

$$S_{i-1} = \sum_j \langle S_{i-1}, \psi_{1,j}\rangle \cdot \psi_{1,j}(x) + \sum_j \langle S_{i-1}, \psi_{1,j}\rangle \cdot \phi_{1,j}(x) \quad (6)$$

$$\equiv \sum_j W_1(j) \cdot \psi_{1,j}(x) + \sum_j S_1(j) \cdot \phi_{1,j}(x)$$

$$f(x) \equiv S_0 = \sum_{i=1}^N \sum_j W_i(j) \cdot \psi_{1,j}(x) + \sum_j S_N(j) \cdot \phi_{1,j}(x) \quad (7)$$

The second term of Ex. 5 denotes that the low frequency band component of the residue that cannot be represented by the sum total of wavelet function $\psi_{1,j}(x)$ of level 1 is represented in terms of the sum total of scaling function $\phi_{1,j}(x)$. An adequate scaling function in response to the wavelet function is employed (See Non-patent Documents 3 and 4 listed later). This means that input signal $f(x) \equiv S_0$ is decomposed into the high frequency band component $W_1$ and low frequency band component $S_i$ of level 1 by the wavelet transform of level 1 shown in Eq. 5. Since the wavelet function $\psi_{i,j}(x)$ of the minimum traveling unit of the wavelet function $\psi_{i,j}(x)$ is $2^i$, each of the signal volume of high frequency band component $W_1$ and low frequency band component $S_1$ with respect to the signal volume of input signal "$S_0$" is ½. The sum total of the signal volumes $W_1$ and $S_1$ is equal to the signal volume of input signal "$S_0$". The low frequency band component $S_1$ of level 1 is decomposed into high frequency band component $W_2$ and low frequency band component $S_2$ of level 2 by Eq. 6. After that, transform is repeated up to level N, whereby input signal "$S_0$" is decomposed into the sum total of the high frequency band components of levels 1 through N and the sum of the low frequency band components of level N, as shown in FIG. 7.

Here the wavelet transform of level 1 shown in Eq. 6 is known to be computed by filtering, as shown in FIG. 2 (See Non-Patent Documents 3 and 4). In FIG. 2, LPF denotes a low-pass filter and HPF a high-pass filter. An appropriate filter coefficient is determined in response to the wavelet function (See Non-Patent Documents 3 and 4). Symbol 2↓ shows the down sampling where every other samples are removed (thinned out). The wavelet transform of level 1 in the secondary signal such as image signal is computed by the processing of filtering as shown in FIG. 3. In FIG. 3, LPFx, HPFx and 2↓x denote processing in the direction of "x", whereas LPFy, HPFy and 2↓y denote processing in the direction of "y". The low frequency band component $S_{n-1}$ is decomposed into three high frequency band components $Wv_n$, $Wh_n$, $Wd_n$ and one low frequency band component $S_n$ by the wavelet transform of level 1. Each of the signal volumes of $Wv_n$, $Wh_n$, $Wd_n$ and $S_n$ generated by decomposition is ½ that of the $S_{n-1}$ prior to decomposition in both vertical and horizontal directions. The total sum of signal volumes of four components subsequent to decomposition is equal to the signal $S_{n-1}$ prior to decomposition. FIG. 4 is a schematic diagram representing the process of the Input signal $S_0$ being decomposed by the wavelet transform of level 3.

Further, when wavelet inverse transform is applied to $Wv_n$, $Wh_n$, $Wd_n$ and $S_n$ generated by decomposition, the signal $S_{n-1}$ prior to decomposition is known to be re-configured completely. In FIG. 5, LPF' denotes a low-pass filter and HPF' a high-pass filter. In the case of orthogonal wavelet, the same coefficient as that used in the wavelet transform is used as this filter coefficient; whereas in the case of biorthogonal wavelet, the coefficient different from that used in the wavelet transform is used as this filter coefficient. (See the above-mentioned Reference Documents). Further, 2↑ denotes the up-sampling where zero is inserted into every other signals. The LPF'x, HPF'x and 2↑x denote processing in the direction of "x", whereas LPF'y, HPF'y and 2↓y denote processing in the direction of "y".

The following image processing method is proposed as a known technique: Image signals are decomposed into multiple frequency band components by such a orthogonal wavelet and a biorthogonal wavelet, and each frequency band components is edited (data-processed). After that, inverse-transform is applied to configure image signals with reduced noise. According to Patent Document 5, the image signal representing the radiation screen is subjected to wavelet transform, whereby the above-mentioned image signals are decomposed into multiple frequency band components. The specified frequency band component out of the above-mentioned multiple frequency band components is subjected to the processing wherein signal values where the absolute value of each of the above-mentioned signal value is below the specified threshold value is reduced to 0. When inverse wavelet transform is applied to the frequency band component subjected to the above-mentioned processing and other frequency band components, image signals with reduced noise are obtained. In this image processing method, however, when the above-mentioned is applied to color images, the RGB balance close to the edge of the subject is lost, and a false color contour appears. This is very unseemly. In the noise structure of image signals gained by optical reading of the image formed on the color photographic film with a CCD sensor, mottled granular irregularities based on the size of the coloring pigment cloud is predominant, unlike the radiation image. If such a big threshold value as to erase this mottled irregularities is set, the sharpness of the image will be lost, or an artifice will appear. Conversely, when the threshold value is $S_0$ small that the sharpness of the image is maintained, the mottled irregularities will not be erased. For these reasons, application of the technology of Patent Document 5 to a color image does not ensure satisfactory effects.

According to Tokkai 2000-224421, wavelet transform is applied to image signals to decompose the above-mentioned image signals into multiple frequency band components. Noise extraction processing is applied to the specified frequency band components, and noise elimination processing is applied to the above-mentioned specified frequency band components, based on the result of above-mentioned extraction processing, whereby processed frequency band components are obtained. Wavelet transform processing is applied to the above-mentioned processed frequency band components to get the low frequency band component one-step lower (of higher level) than the above-mentioned specified frequency band components. Processed frequency band component is obtained for each frequency band component by repeating the above-mentioned extraction processing wherein the above-mentioned low frequency band component one-step lower is the above-mentioned specified frequency band component, the above-mentioned noise elimination processing and the above-mentioned wavelet transform processing, until a desired frequency band is reached. Image signals with reduced noise are obtained by applying inverse wavelet transform to the above-mentioned processed frequency band component. However, when the above-mentioned technology is applied to color images, RGB balance is lost in the area where mottled irregularities are erased, with the result that false color spots appear. This is very unseemly. Further, noise extraction of low frequency signals and noise elimination processing must be repeated for each one-level transform, imposing a heavy computational load. Further, the medical image assumed in Patent Document 6 is restricted in the type of a subject, and comparatively monotonous images often occur. By contrast, the color photographic image is characterized by the mixed areas of different picture quality—an area where fine structures are closely packed in an image, the flat area, a bright area and a dark area, as in a people portrait against the background of a forest. In such a color image, noise elimination conditions must be changed, based on the area structure captured in perspective. According to the method given in the Patent Document 6, the noise elimination processing condition on the resolution level "n" must be determined according to the information on the above-mentioned resolution of level "n". This makes it difficult to design an algorithm for determining the noise elimination conditions.

Non-Patent Documents 5, 6 and 7 give a detailed explanation to the Dyadic Wavelet used in the present invention. The following gives the overview:

The wavelet function of the Dyadic Wavelet is defined as follows:

[Eq. 6] (8)

$$\psi_{i,j}(x) = 2^{-i}\psi\left(\frac{x-j}{2^i}\right)$$

where "i" denotes a natural number.

Wavelet functions of orthogonal wavelet and biorthogonal wavelet are discretely defined when the minimum traveling unit of the position on level "i" is $2^i$, as described above. By contrast, in the two-term wavelet, the minimum traveling unit of the position is constant, despite level "i". This difference provides the Dyadic Wavelet transform with the following characteristics:

Characteristic 1: The signal volume of each of high frequency band component $W_i$ and low frequency band component $S_i$ generated by the Dyadic Wavelet transform is the same as that of signal $S_{i-1}$ prior to transform.

[Eq. 7] (9)

$$S_{i-1} = \sum_j \langle S_{i-1}, \psi_{i,j} \rangle \cdot \psi_{i,j}(x) + \sum_j \langle S_{i-1}, \phi_{i,j} \rangle \cdot \phi_{i,j}(x)$$
$$\equiv \sum_j W_i(j) \cdot \psi_{i,j}(x) + \sum_j S_i(j) \cdot \phi_{i,j}(x)$$

Characteristic 2: The following relationship is found between the scaling function $\phi_{i,j}(x)$ and wavelet function $\psi_{i,j}(x)$:

[Eq. 8] (10)

$$\psi_{i,j}(x) = \frac{\partial}{\partial x}\phi_{i,j}(x)$$

Thus, the high frequency band component $W_i$ generated by the Dyadic Wavelet transform represents the first differential (gradient) of the low frequency band component $S_i$.

Characteristic 3: With respect to $W_i \cdot \gamma_i$ (hereinafter referred to as "compensated high frequency band component) obtained by multiplying the coefficient $\gamma_i$ (see the above-mentioned Reference Document on Dyadic Wavelet)) determined in response to the level "i" of the Wavelet transform, by high frequency band component, the relationship between levels of the signal intensities of compensated high frequency band components $W_i \cdot \gamma_i$ subsequent to the above-mentioned transform obeys a certain rule, in response to the singularity of the changes of input signals. To put it another way, the signal intensity of the compensated high frequency band component $W_i \cdot \gamma_i$ corresponding to smooth (differentiable) signal changes shown by 1 and 4 of FIG. 6 increases with level number "i"; whereas the signal intensity of the compensated high frequency band component $W_i \cdot \gamma_i$ corresponding to stepwise signal changes shown by 2 of FIG. 6 stays constant independently of the level number "i", and the signal intensity of the compensated high frequency band component $W_i \cdot \gamma_i$ corresponding to functional signal changes shown by 3 of FIG. 6 decreases with increase in level number "i".

Characteristic 4: Unlike the above-mentioned method of orthogonal wavelet and biorthogonal wavelet, the method of Dyadic Wavelet transform on level 1 in the 2-D signals such as image signals is followed as shown in FIG. 7. The low frequency band component $S_{n-1}$ is decomposed into two high frequency band components $Wx_n$, $Wy_n$ and one low frequency band component $S_n$ by the wavelet transform of level 1. Two high frequency band components correspond to components x and y of the change vector $V_n$ in the two dimensions of the low frequency band component $S_n$. The magnitude $M_n$ of the change vector $V_n$ and angle of deflection $A_n$ are given by the following equation:

[Eq. 9]

$$M_n = \sqrt{Wx_n^2 + Wy_n^2} \quad (11)$$

$$A_n = \text{argument } (Wx_n + iWy_n) \quad (12)$$

It has been known that $S_{n-1}$ prior to transform can be re-configured when the Dyadic Wavelet inverse transform shown in FIG. 8 is applied to two high frequency band components $Wx_n$, $Wy_n$ and one low frequency band component $S_n$.

In Patent Document 5, the following method is proposed to eliminate the white noise (Gaussian white noise) superimposed onto the monochrome image using the Dyadic Wavelet.

Step 1: The maximum of high frequency band component on each level is sought, and correspondence of the maximum positions between levels is established.

Step 2: When the absolute values of the associated maxima are reduced with increase in the level number, the maxima are removed.

Step 3: The linkage of remaining maxima on the plane surface is checked, and those having the linkage length in excess of the threshold value are preserved without being removed.

In addition to the above procedures, the following operations are also expounded:

Step 4: All signal values of the high frequency band component on the first level are discarded and signal values are synthesized according to the following method:

<1> The position of the maximum is made the same as that of the maximum on the second level left behind subsequent to the operations of steps 1 through 3.

<2> The magnitude $M_1$ of the first level is determined by extrapolation of intensity between the levels higher than the second level of the magnitude $M_n$ of the change vector defined in Eq. 11 in the above-mentioned position.

<3> The value $A_2$ on the second level of the deflection angle $A_n$ of the change vector defined in Eq. 12 in the above-mentioned position is copied to deflection angle $A_1$ on the first level.

<4> The signal value of the high frequency band component on the first level is synthesized from the $M_1$ and $A_1$ obtained above.

The method proposed above requires a great amount of computation, and much time and labor. Further, noise superimposed on image signals is assumed as white noise. So if this method is applied to the image containing mottled granular noise, as found in the case of the image gained by scanning a silver halide film or less costly DSC image, granular noise elimination will be insufficient or part of the granular noise will be enhanced. Further, if the above-mentioned method is applied to each of the RGB planes of a color image, a new fine granular noise similar to color misregistration will appear, raising another problem.

The documents cited in the above descriptions are listed as follow:

Patent Document 1: Tokkaihei 9-22460
Patent Document 2: Tokkai 2000-215307
Patent Document 3: Tokkai 2001-143068
Patent Document 4: Tokkai 2001-155148
Patent Document 5: Tokkaihei 9-212623
Patent Document 6: Tokkai 2000-224421

Non-Patent Document 1: "Digital Photography" Chapter 2 and 3, published by The Society of Photographic Science and Technology of Japan, Corona Publishing Co., Ltd.

Non-Patent Document 2: "Practical Image Processing learnt in C-language" P54, by Inoue et al., Ohm Publishing Co., Ltd.

Non-Patent Document 3: "Wavelet and Filter Banks" by G. Strang & T. Nguyen, Wellesley-Cambridge Press Non-Patent Document 4: "A wavelet tour of signal processing 2ed." by S. Mallat, Academic Press Non-Patent Document 5: "Singularity detection and processing with wavelets" by S. Mallat and W. L. Hwang, IEEE Trans. Inform. Theory 38 617 (1992)

Non-Patent Document 6: "Characterization of signal from multiscale edges" by S. Mallet and S. Zhong, IEEE Trans. Pattern Anal. Machine Intel. 14 710 (1992)

Non-Patent Document 7: "A wavelet tour of signal processing 2ed." by S. Mallat, Academic Press

SUMMARY OF THE INVENTION

To overcome the abovementioned drawbacks in conventional methods and apparatus, it is an object of the present invention to provide an image processing method, an image processing apparatus, an image processing program and an image recording apparatus characterized by reduced computation loads and capable of suppressing the mottled granular noise contained in color image signals and enhancing the sharpness of the image, wherein shadow on the bridge of the nose or around the eyes is maintained, without noise similar to color misregistration and a smooth expressionless face wearing makeup being produced, and without false color contour appearing close to the edge or false color spot visible on the flat portion.

Accordingly, to overcome the cited shortcomings, the abovementioned object of the present invention can be attained by an image processing method, an image processing apparatus, an image processing program and an image recording apparatus described as follow.

(1) A method for processing image signals representing an original image, the method comprising the steps of: converting the image signals to luminance signals and chrominance signals; applying a Dyadic Wavelet transform processing to at least the luminance signals; suppressing a signal intensity of a high-frequency luminance component at P-th level (P is an integer equal to or greater than 1), when the intensity of the high-frequency luminance component conforms to a specific condition; applying a Dyadic Wavelet inverse-transform processing to transformed and processed signals; and synthesizing processed luminance signals and the chrominance signals with each other to generate processed image signals.

(2) A method for processing image signals representing an original image, the method comprising the steps of: converting the image signals to luminance signals and chrominance signals; applying a Dyadic Wavelet transform processing to at least the luminance signals; suppressing a signal intensity of a high-frequency luminance component at a level equal to or lower than a P-th level (P is an integer equal to or greater than 2), when the intensity of the high-frequency luminance component conforms to a specific condition; applying a Dyadic Wavelet inverse-transform processing to transformed and processed signals; and synthesizing processed luminance signals and the chrominance signals with each other to generate processed image signals.

(3) The method of item 1, wherein the Dyadic Wavelet transform processing at a Q-th level (Q>P) is also applied to the luminance signals, and the specific condition fulfills the relationship of $$Q_h/P_h \leq A_t$$

where, $Q_h$: signal intensity of high-frequency luminance component at Q-th level, $P_h$: signal intensity of high-frequency luminance component at P-th level, $A_t$: first threshold value.

(4) The method of item 3, wherein the specific condition further fulfills the relationships of $$P_{ch+1}/P_{ch} \leq A_t, \text{ and}$$

$$1.2 \geq A_t > 1$$

where, $P_{ch+1}$: signal intensity of compensated high-frequency luminance component at (P+1)-th level, $P_{ch}$: signal intensity of compensated high-frequency luminance component at P-th level.

(5) The method of item 3, wherein the specific condition further fulfills the relationships of $$P_{ch+1}/P_{ch} \leq A_t, \text{ and}$$

$$1.2 \geq A_t > 1$$

where, $P_{ch+1}$: signal intensity of compensated luminance high-frequency component at (P+1)-th level, $P_{ch}$: signal intensity of compensated luminance high-frequency component at P-th level; and wherein $P_h$, representing the signal intensity of the high-frequency luminance component at P-th level, is suppressed to substantially zero, when the specific condition fulfills the relationships of $$P_{ch+1}/P_{ch} \leq B_t, \text{ and}$$

$$1 > B_t \geq 0.8$$

where, $B_t$: second threshold value.

(6) The method of item 2, wherein the Dyadic Wavelet transform processing at a Q-th level (Q>P) is also applied to the luminance signals, and the specific condition fulfills the relationship of $$P_{hl}/P_{hn} \leq A_t$$

where, $P_{hl}$: signal intensity of high-frequency luminance component at a level larger than each of levels equal to or lower than P-th level, $P_{hn}$: signal intensity of high-frequency luminance component at each of levels equal to or lower than P-th level, $A_t$: first threshold value; and wherein the signal intensity of high-frequency luminance component at each of levels equal to or lower than P-th level is suppressed.

(7) The method of item 6, wherein the specific condition further fulfills the relationships of $$P_{chn+1}/P_{chn} \leq A_t, \text{ and}$$

$$1.2 \geq A_t > 1$$

where, $P_{chn+1}$: signal intensity of compensated high-frequency luminance component at (each of levels equal to or lower than P-th level)+1 level, $P_{chn}$: signal intensity of compensated high-frequency luminance component at each of levels equal to or lower than P-th level.

(8) The method of item 6, wherein the specific condition further fulfills the relationships of $$P_{chn+1}/P_{chn} \leq A_t, \text{ and}$$

$$1.2 \geq A_t > 1$$

where, $P_{chn+1}$: signal intensity of compensated high-frequency luminance component at (each of levels equal to or lower than P-th level)+1 level, $P_{chn}$: signal intensity of compensated high-frequency luminance component at each of levels equal to or lower than P-th level; and wherein the signal intensity of high-frequency luminance component at each of levels lower than P-th level is suppressed to substantially zero, when the specific condition fulfills the relationships of $$P_{chn+1}/P_{chn} \leq B_t, \text{ and}$$

$$1 > B_t \geq 0.8$$

where, $B_t$: second threshold value.

(9) The method of item 1, wherein the Dyadic Wavelet transform processing at a P-th level (P≥2) is also applied to the luminance signals, and the specific condition fulfills the relationship of $$P_h/P_{hs} \leq E_t$$

where, $P_h$: signal intensity of high-frequency luminance component at P-th level, $P_{hs}$: signal intensity of high-frequency luminance component lower than P-th level $E_t$: third threshold value; and wherein the Dyadic Wavelet inverse-transform processing is conducted from the P-th level, after suppressing the intensity of the high-frequency luminance component at the P-th level.

(10) The method of item 9, wherein the specific condition further fulfills the relationships of $$P_{ch}/P_{ch-1} \leq A_t, \text{ and}$$

$$1.2 \geq E_t > 1$$

where, $P_{ch}$: signal intensity of compensated high-frequency luminance component at P-th level, $P_{ch-1}$: signal intensity of compensated high-frequency luminance component at (P-1)-th level.

(11) The method of item 9, wherein the specific condition further fulfills the relationships of $$P_{ch}/P_{ch-1} \leq E_t, \text{ and}$$

$$1.2 \geq E_t > 1$$

where, $P_{ch}$: signal intensity of compensated high-frequency luminance component at P-th level, $P_{ch-1}$: signal intensity of compensated high-frequency luminance component at (P-1)-th level; and wherein $P_h$, representing the signal intensity of the high-frequency luminance component at P-th level, is suppressed to substantially zero, when the specific condition fulfills the relationships of $$P_{ch}/P_{ch-1} \leq F_t, \text{ and}$$

$$1 > F_t \geq 0.8$$

where, $F_t$: fourth threshold value.

(12) The method of item 2, wherein the Dyadic Wavelet transform processing at a P-th level is also applied to the luminance signals; and wherein, when the following relationship is fulfilled with respect to at least a high-frequency luminance component at P-th level $$P_h/P_{hs} \leq E_t$$

where, $P_h$: signal intensity of high-frequency luminance component at P-th level,
$P_{hs}$: signal intensity of high-frequency luminance component lower than P-th level
$E_t$: third threshold value,
the Dyadic Wavelet inverse-transform processing is conducted from the P-th level, after suppressing the signal intensity of the high-frequency luminance component at the P-th level.

(13) The method of item 12, wherein, when the following relationship is fulfilled with respect to at least a high-frequency luminance component at P-th level $$P_{ch}/P_{ch-1} \leq A_t, \text{ and}$$

$$1.2 \geq E_t > 1$$

where, $P_{ch}$: signal intensity of compensated high-frequency luminance component at P-th level,
$P_{ch-1}$: signal intensity of compensated high-frequency luminance component at (P−1)-th level,
the signal intensity of the high-frequency luminance component at the P-th level is suppressed.

(14) The method of item 12, wherein, when the following relationship is fulfilled with respect to at least a high-frequency luminance component at P-th level $$P_{ch}/P_{ch-1} \leq A_t, \text{ and}$$

$$1.2 \geq E_t > 1$$

where, $P_{ch}$: signal intensity of compensated high-frequency luminance component at P-th level,
$P_{ch-1}$: signal intensity of compensated high-frequency luminance component at (P−1)-th level,
the signal intensity of the high-frequency luminance component at the P-th level is suppressed; and wherein, when the following relationship is fulfilled with respect to at least a high-frequency luminance component at P-th level $$P_{ch}/P_{ch-1} \leq F_t, \text{ and}$$

$$1 > F_t \geq 0.8$$

where, $P_{ch}$: signal intensity of compensated high-frequency luminance component at P-th level,
$P_{ch-1}$: signal intensity of compensated high-frequency luminance component at (P−1)-th level.
$F_t$: fourth threshold value,
$P_h$, representing the signal intensity of the high-frequency luminance component at P-th level, is suppressed to substantially zero.

(15) The method of item 1, wherein the specific condition is such that an absolute value of the signal intensity of the high-frequency luminance component at P-th level is equal to or smaller than fifth threshold value $C_t$, which is derived from a standard deviation of the signal intensity of the high-frequency luminance component at P-th level.

(16) The method of item 1, wherein the specific condition is such that an absolute value of the signal intensity of the high-frequency luminance component at P-th level is equal to or smaller than sixth threshold value $G_t$, which is derived from a standard deviation of the signal intensity of the high-frequency luminance component at P-th level; and wherein $P_h$, representing the signal intensity of the high-frequency luminance component at P-th level, is suppressed to substantially zero.

(17) The method of item 1, wherein the specific condition is such that an absolute value of the signal intensity of the high-frequency luminance component at P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein $P_h$, representing the signal intensity of the high-frequency luminance component at P-th level, is suppressed to substantially zero, when the absolute value is equal to or smaller than fifth threshold value $C_t$.

(18) The method of item 2, wherein the specific condition is such that an absolute value of the signal intensity of the high-frequency luminance component at each of levels equal to or smaller than P-th level is equal to or smaller than fifth threshold value $C_t$, which is derived from a standard deviation of the signal intensity of the high-frequency luminance component at each of levels equal to or smaller than P-th level.

(19) The method of item 2, wherein the specific condition is such that an absolute value of the signal intensity of the high-frequency luminance component at each of levels equal to or smaller than P-th level is equal to or smaller than sixth threshold value $G_t$, which is derived from a standard deviation of the signal intensity of the high-frequency luminance component at each of levels equal to or smaller than the P-th level; and wherein the signal intensity of the high-frequency luminance component at each of levels equal to or smaller than the P-th level, is suppressed to substantially zero.

(20) The method of item 2, wherein the specific condition is such that an absolute value of the signal intensity of the high-frequency luminance component at each of levels equal to or smaller than the P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein the signal intensity of the high-frequency luminance component at each of levels equal to or smaller than the P-th level, is suppressed to substantially zero, when the absolute value is equal to or smaller than fifth threshold value $C_t$.

(21) The method described in anyone of items 1-20, wherein a sharpness enhancement processing is performed after completing a suppression processing for the signal intensity of the high-frequency luminance component under the specific condition.

(22) The method of item 21, wherein the sharpness enhancement processing is conducted by enhancing signal intensity of high-frequency luminance components, which do not fulfill the specific condition, at a level at which the suppression processing is conducted.

(23) The method described in anyone of items 1-22, wherein a suppression processing for high-frequency component of the chrominance signals is performed.

(24) The method described in anyone of items 1-23, wherein the specific condition for suppressing the signal intensity of the high-frequency luminance component is made to vary depending on characteristics of a low-frequency component of the chrominance signals.

(25) A method for processing image signals representing an original image, the method comprising the steps of: converting the image signals to luminance signals and chrominance signals; applying a Dyadic Wavelet transform processing to at least the luminance signals; suppressing a signal intensity of a high-frequency luminance component at a P-th level (P is an integer equal to or greater than 1), when the intensity of the high-frequency luminance component conforms to a specific condition; applying a Dyadic Wavelet inverse-transform processing to transformed and processed signals; and synthesizing processed luminance signals and the chrominance signals with each other to generate processed image signals; wherein the specific condition is made to vary depending on a low-frequency luminance component.

(26) A method for processing image signals representing an original image, the method comprising the steps of: converting the image signals to luminance signals and chrominance signals; applying a Dyadic Wavelet transform processing to at least the luminance signals; suppressing a signal intensity of a high-frequency luminance component at a level equal to or lower than P-th level, when the intensity of the high-frequency luminance component conforms to a specific condition; applying a Dyadic Wavelet inverse-transform processing to transformed and processed signals; and synthesizing processed luminance signals and the chrominance signals with each other to generate processed image signals; wherein the specific condition is made to vary depending on a difference between signal intensities of low-frequency luminance components.

(27) The method of item 25, wherein the Dyadic Wavelet transform processing at a Q-th level (Q>P) is also applied to the luminance signals, and the specific condition fulfills the relationship of $Q_h/P_h \leq A_t$ where, $Q_h$: signal intensity of high-frequency luminance component at Q-th level,
$P_h$: signal intensity of high-frequency luminance component at P-th level,
$A_t$: first threshold value; and
wherein the Dyadic Wavelet inverse-transform processing is conducted from the P-th level, after suppressing the intensity of the high-frequency luminance component at the P-th level, and further, wherein the first threshold value $A_t$ is made to vary depending on a difference between signal intensities of low-frequency luminance components.

(28) The method of item 27, wherein the specific condition further fulfills the relationships of $P_{ch+1}/P_{ch} \leq A_t$, and $1.5 \geq A_t > 1$ where, $P_{ch+1}$: signal intensity of compensated high-frequency luminance component at (P+1)-th level,
$P_{ch}$: signal intensity of compensated high-frequency luminance component at P-th level.

(29) The method of item 27, wherein the specific condition further fulfills the relationships of $P_{chg}/P_{ch} \leq A_t$, and $1.5 \geq A_t > 1$ where, $P_{chg}$: signal intensity of compensated luminance high-frequency component at a level larger than P-th level,
$P_{ch}$: signal intensity of compensated luminance high-frequency component at P-th level; and
wherein $P_h$, representing the signal intensity of the high-frequency luminance component at P-th level, is suppressed to substantially zero, when the specific condition fulfills the relationships of $P_{ch+1}/P_{ch} \leq B_t$, and $1 > B_t \geq 0.7$ where, $P_{ch+1}$: signal intensity of compensated luminance high-frequency component at (P+1)-th level,
$B_t$: second threshold value.

(30) The method of item 26, wherein the Dyadic Wavelet transform processing at a Q-th level (Q>P) is also applied to the luminance signals, and the specific condition fulfills the relationship of $P_{hl}/P_{hn} \leq A_t$ where, $P_{hl}$: signal intensity of high-frequency luminance component at a level larger than each of levels equal to or lower than P-th level,
$P_{hn}$: signal intensity of high-frequency luminance component at each of levels equal to or lower than P-th level,
$A_t$: first threshold value; and
wherein the Dyadic Wavelet inverse-transform processing is conducted from the P-th level, after suppressing the intensity of the high-frequency luminance component at the P-th level, and further, wherein the first threshold value $A_t$ is made to vary depending on a difference between signal intensities of low-frequency luminance components.

(31) The method of item 30, wherein the specific condition further fulfills the relationships of $P_{chn+1}/P_{chn} \leq A_t$, and $2 \geq A_t > 1$ where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level.

(32) The method of item 30, wherein the specific condition further fulfills the relationships of $P_{chn+1}/P_{chn} \leq A_t$, and $1.5 \geq A_t > 1$ where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level; and wherein the signal intensity of high-frequency luminance component at each of levels lower than P-th level is suppressed to substantially zero, when the specific condition fulfills the relationships of $P_{chn+1}/P_{chn} \leq B_t$, and $1 > B_t \geq 0.7$ where, $B_t$: second threshold value.

(33) The method of item 25, wherein the Dyadic Wavelet transform processing at a P-th level is also applied to the luminance signals, and the specific condition fulfills the relationship of $P_h/P_{hs} \leq E_t$ where, $P_h$: signal intensity of high-frequency luminance component at P-th level,
$P_{hs}$: signal intensity of high-frequency luminance component lower than P-th level
$E_t$: third threshold value; and
wherein the Dyadic Wavelet inverse-transform processing is conducted from the P-th level, after suppressing the intensity of the high-frequency luminance component at the P-th level; and further, wherein the first threshold value $E_t$ is made to vary depending on a difference between signal intensities of low-frequency luminance components.

(34) The method of item 33, wherein the specific condition further fulfills the relationships of $P_{ch}/P_{ch-1} \leq A_t$, and $1.5 \geq E_t > 1$ where, $P_{ch}$: signal intensity of compensated high-frequency luminance component at P-th level,
$P_{ch-1}$: signal intensity of compensated high-frequency luminance component at (P–1)-th level.

(35) The method of item 33, wherein the specific condition further fulfills the relationships of $P_{ch}/P_{ch-1} \leq E_t$, and $1.5 \geq E_t > 1$ where, $P_{ch}$: signal intensity of compensated high-frequency luminance component at P-th level,
$P_{ch-1}$: signal intensity of compensated high-frequency luminance component at (P+1)-th level; and
wherein $P_h$, representing the signal intensity of the high-frequency luminance component at P-th level, is suppressed to substantially zero, when the specific condition fulfills the relationships of $P_{ch}/P_{ch-1} \leq F_t$, and $1 > F_t \geq 0.7$ where, $F_t$: fourth threshold value.

(36) The method of item 26, wherein the Dyadic Wavelet transform processing at a P-th level is also applied to the luminance signals; and wherein, when the following relationship is fulfilled with respect to at least a high-frequency luminance component at P-th level $P_h/P_{hs} \leq E_t$ where, $P_h$: signal intensity of high-frequency luminance component at P-th level,
$P_{hs}$: signal intensity of high-frequency luminance component lower than P-th level
$E_t$: third threshold value,
the Dyadic Wavelet inverse-transform processing is conducted from the P-th level, after suppressing the signal intensity of the high-frequency luminance component at the P-th level; and, wherein the first threshold value $E_t$ is made to vary depending on a difference between signal intensities of low-frequency luminance components.

(37) The method of item 36, wherein, when the following relationship is fulfilled with respect to at least a high-frequency luminance component at P-th level $P_{ch}/P_{ch-1} \leq E_t$, and $1.2 \geq E_t > 1$ where, $P_{ch}$: signal intensity of compensated high-frequency luminance component at P-th level,
$P_{ch-1}$: signal intensity of compensated high-frequency luminance component at (P–1)-th level
the signal intensity of the high-frequency luminance component at the P-th level is suppressed.

(38) The method of item 36, wherein, when the following relationship is fulfilled with respect to at least a high-frequency luminance component at P-th level $P_{ch}/P_{ch-1} \leq E_t$, and $1.5 \geq E_t > 1$ where, $P_{ch}$: signal intensity of compensated high-frequency luminance component at P-th level,
$P_{ch-1}$: signal intensity of compensated high-frequency luminance component at (P–1)-th level
the signal intensity of the high-frequency luminance component at the P-th level is suppressed; and wherein the signal intensity of high-frequency luminance component at the P-th level is suppressed to substantially zero, when the specific condition fulfills the relationships of $P_{ch}/P_{ch-1} \leq F_t$, and $1 > F_t \geq 0.7$ where, $F_t$: fourth threshold value.

(39) The method of item 25, wherein the specific condition is such that an absolute value of the signal intensity of the high-frequency luminance component at P-th level is equal to or smaller than fifth threshold value $C_t$, which is derived from a standard deviation of the signal intensity of the high-frequency luminance component at P-th level; and wherein the fifth threshold value $C_t$ is made to vary depending on a difference between signal intensities of low-frequency luminance components.

(40) The method of item 25, wherein the specific condition is such that an absolute value of the signal intensity of the high-frequency luminance component at P-th level is equal to or smaller than sixth threshold value $G_t$, which is derived from a standard deviation of the signal intensity of the high-frequency luminance component at the P-th level; and wherein the signal intensity of the high-frequency luminance component at the P-th level, is suppressed to substantially zero.

(41) The method of item 25, wherein the specific condition is such that an absolute value of the signal intensity of the high-frequency luminance component at P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein the signal intensity of the high-frequency luminance component at the P-th level, is suppressed to substantially zero, when the absolute value is equal to or smaller than fifth threshold value $C_t$; and wherein both the fifth threshold value $C_t$ and the seventh threshold value $D_t$ are made to vary depending on a difference between signal intensities of low-frequency luminance components.

(42) The method of item 26, wherein the specific condition is such that an absolute value of the signal intensity of the high-frequency luminance component at each of levels equal to or smaller than P-th level is equal to or smaller than fifth threshold value $C_t$, which is derived from a standard deviation of the signal intensity of the high-frequency luminance component at each of levels equal to or smaller than P-th level; and wherein the fifth threshold value $C_t$ is made to vary depending on a difference between signal intensities of low-frequency luminance components.

(43) The method of item 26, wherein the specific condition is such that an absolute value of the signal intensity of the high-frequency luminance component at each of levels equal to or smaller than P-th level is equal to or smaller than sixth threshold value $G_t$, which is derived from a standard deviation of the signal intensity of the high-frequency luminance component at each of levels equal to or smaller than the P-th level; and wherein the signal intensity of the high-frequency luminance component at each of levels equal to or smaller than the P-th level, is suppressed to substantially zero.

(44) The method of item 26, wherein the specific condition is such that an absolute value of the signal intensity of the high-frequency luminance component at each of levels equal to or smaller than the P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein the signal intensity of the high-frequency luminance component at each of levels equal to or smaller than the P-th level, is suppressed to substantially zero, when the absolute value is equal to or smaller than fifth threshold value $C_t$; and wherein both the fifth threshold value $C_t$ and the seventh threshold value $D_t$ are made to vary depending on a difference between signal intensities of low-frequency luminance components.

(45) The method described in anyone of items 25-44, wherein a sharpness enhancement processing is performed after completing a suppression processing for the signal intensity of the high-frequency luminance component under the specific condition.

(46) The method of item 45, wherein the sharpness enhancement processing is conducted by enhancing signal intensity of high-frequency luminance components, which do not fulfill the specific condition, at a level at which the suppression processing is conducted.

(47) The method described in anyone of items 25-46, wherein a suppression processing for high-frequency component of the chrominance signals is performed.

(48) The method described in anyone of items 25-47, wherein the specific condition for suppressing the signal intensity of the high-frequency luminance component is made to vary depending on characteristics of a low-frequency component of the chrominance signals.

(49) The method described in anyone of items 1-48, wherein the image signals, representing the original image, are acquired by scanning a silver-halide film.

(50) The method described in anyone of items 1-49, wherein slight noises are added to the processed image signals.

(51) An apparatus for processing image signals representing an original image, the apparatus comprising: a converting section to convert the image signals to luminance signals and chrominance signals; a Dyadic Wavelet transformer to apply a Dyadic Wavelet transform processing to at least the luminance signals; a suppressing section to suppress a signal intensity of a high-frequency luminance component at P-th level (P is an integer equal to or greater than 1), when the intensity of the high-frequency luminance component conforms to a specific condition; a Dyadic Wavelet inverse-transformer to apply a Dyadic Wavelet inverse-transform processing to transformed and processed signals; and a synthesizing section to synthesize processed luminance signals and the chrominance signals with each other to generate processed image signals.

(52) An apparatus for processing image signals representing an original image, the apparatus comprising: a converting section to convert the image signals to luminance signals and chrominance signals; a Dyadic Wavelet transformer to apply a Dyadic Wavelet transform processing to at least the luminance signals; a suppressing section to suppress a signal intensity of a high-frequency luminance component at a level equal to or lower than a P-th level (P is an integer equal to or greater than 2), when the intensity of the high-frequency luminance component conforms to a specific condition; a Dyadic Wavelet inverse-transformer to apply a Dyadic Wavelet inverse-transform processing to transformed and processed signals; and a synthesizing section to synthesize processed luminance signals and the chrominance signals with each other to generate processed image signals.

(53) The apparatus of item 51, wherein the Dyadic Wavelet transform processing at a Q-th level (Q>P) is also applied to the luminance signals, and the specific condition fulfills the relationship of $$Q_h/P_h \leq A_t$$

where, $Q_h$: signal intensity of high-frequency luminance component at Q-th level,
$P_h$: signal intensity of high-frequency luminance component at P-th level,
$A_t$: first threshold value.

(54) The apparatus of item 53, wherein the specific condition further fulfills the relationships of $$P_{ch+1}/P_{ch} \leq A_t, \text{ and}$$

$$1.2 \geq A_t > 1$$

where, $P_{ch+1}$: signal intensity of compensated high-frequency luminance component at (P+1)-th level,
$P_{ch}$: signal intensity of compensated high-frequency luminance component at P-th level.

(55) The apparatus of item 53, wherein the specific condition further fulfills the relationships of $$P_{ch+1}/P_{ch} \leq A_t, \text{ and}$$

$$1.2 \geq A_t > 1$$

where, $P_{ch+1}$: signal intensity of compensated luminance high-frequency component at (P+1)-th level,
$P_{ch}$: signal intensity of compensated luminance high-frequency component at P-th level; and wherein $P_h$, representing the signal intensity of the high-frequency luminance component at P-th level, is suppressed to substantially zero, when the specific condition fulfills the relationships of $$P_{ch+1}/P_{ch} \leq B_t, \text{ and}$$

$$1 > B_t \geq 0.8$$

where, $B_t$: second threshold value.

(56) The apparatus of item 52, wherein the Dyadic Wavelet transform processing at a Q-th level (Q>P) is also applied to the luminance signals, and the specific condition fulfills the relationship of $$P_{hl}/P_{hn} \leq A_t$$

where, $P_{hl}$: signal intensity of high-frequency luminance component at a level larger than each of levels equal to or lower than P-th level,
  $P_{hn}$: signal intensity of high-frequency luminance component at each of levels equal to or lower than P-th level,
  $A_t$: first threshold value; and
wherein the signal intensity of high-frequency luminance component at each of levels equal to or lower than P-th level is suppressed.

(57) The apparatus of item 56, wherein the specific condition further fulfills the relationships of $$P_{chn+1}/P_{chn} \leq A_t, \text{ and}$$

$$1.2 \geq A_t \geq 1$$

where, $P_{chn+1}$: signal intensity of compensated high-frequency luminance component at (each of levels equal to or lower than P-th level)+1 level,
  $P_{chn}$: signal intensity of compensated high-frequency luminance component at each of levels equal to or lower than P-th level.

(58) The apparatus of item 56, wherein the specific condition further fulfills the relationships of $$P_{chn+1}/P_{chn} \leq A_t, \text{ and}$$

$$1.2 \geq A_t > 1$$

where, $P_{chn+1}$: signal intensity of compensated high-frequency luminance component at (each of levels equal to or lower than P-th level)+1 level,
  $P_{chn}$: signal intensity of compensated high-frequency luminance component at each of levels equal to or lower than P-th level; and
wherein the signal intensity of high-frequency luminance component at each of levels lower than P-th level is suppressed to substantially zero, when the specific condition fulfills the relationships of $$P_{chn+1}/P_{chn} \leq B_t, \text{ and}$$

$$1 > B_t \geq 0.8$$

where, $B_t$: second threshold value.

(59) The apparatus of item 51, wherein the Dyadic Wavelet transform processing at a P-th level (P≥2) is also applied to the luminance signals, and the specific condition fulfills the relationship of $$P_h/P_{hs} \leq E_t$$

where, $P_h$: signal intensity of high-frequency luminance component at P-th level,
  $P_{hs}$: signal intensity of high-frequency luminance component lower than P-th level
  $E_t$: third threshold value; and wherein the Dyadic Wavelet inverse-transform processing is conducted from the P-th level, after suppressing the intensity of the high-frequency luminance component at the P-th level.

(60) The apparatus of item 59, wherein the specific condition further fulfills the relationships of $$P_{ch}/P_{ch-1} \leq A_t, \text{ and}$$

$$1.2 \geq E_t \geq 1$$

where, $P_{ch}$: signal intensity of compensated high-frequency luminance component at P-th level,
  $P_{ch-1}$: signal intensity of compensated high-frequency luminance component at (P−1)-th level.

(61) The apparatus of item 59, wherein the specific condition further fulfills the relationships of $$P_{ch}/P_{ch-1} \leq E_t, \text{ and}$$

$$1.2 \geq E_t > 1$$

where, $P_{ch}$: signal intensity of compensated high-frequency luminance component at P-th level,
  $P_{ch-1}$: signal intensity of compensated high-frequency luminance component at (P−1)-th level; and
wherein $P_h$, representing the signal intensity of the high-frequency luminance component at P-th level, is suppressed to substantially zero, when the specific condition fulfills the relationships of $$P_{ch}/P_{ch-1} \leq F_t, \text{ and}$$

$$1 > F_t \geq 0.8$$

where, $F_t$: fourth threshold value.

(62) The apparatus of item 52, wherein the Dyadic Wavelet transform processing at a P-th level is also applied to the luminance signals; and wherein, when the following relationship is fulfilled with respect to at least a high-frequency luminance component at P-th level $$P_h/P_{hs} \leq E_t$$

where, $P_h$: signal intensity of high-frequency luminance component at P-th level,
  $P_{hs}$: signal intensity of high-frequency luminance component lower than P-th level
  $E_t$: third threshold value,
the Dyadic Wavelet inverse-transform processing is conducted from the P-th level, after suppressing the signal intensity of the high-frequency luminance component at the P-th level.

(63) The apparatus of item 62, wherein, when the following relationship is fulfilled with respect to at least a high-frequency luminance component at P-th level $$P_{ch}/P_{ch-1} \leq A_t, \text{ and}$$

$$1.2 \geq E_t > 1$$

where, $P_{ch}$: signal intensity of compensated high-frequency luminance component at P-th level,
  $P_{ch-1}$: signal intensity of compensated high-frequency luminance component at (P−1)-th level,
  the signal intensity of the high-frequency luminance component at the P-th level is suppressed.

(64) The apparatus of item 62, wherein, when the following relationship is fulfilled with respect to at least a high-frequency luminance component at P-th level $$P_{ch}/P_{ch-1} \leq A_t, \text{ and}$$

$$1.2 \geq E_t \geq 1$$

where, $P_{ch}$: signal intensity of compensated high-frequency luminance component at P-th level,
$P_{ch-1}$: signal intensity of compensated high-frequency luminance component at (P–1)-th level,
the signal intensity of the high-frequency luminance component at the P-th level is suppressed; and wherein, when the following relationship is fulfilled with respect to at least a high-frequency luminance component at P-th level $$P_{ch}/P_{ch-1} \leq F_t, \text{ and}$$

$$1 > F_t \geq 0.8$$

where, $P_{ch}$: signal intensity of compensated high-frequency luminance component at P-th level,
$P_{ch-1}$: signal intensity of compensated high-frequency luminance component at (P–1)-th level.
$F_t$: fourth threshold value,
$P_h$, representing the signal intensity of the high-frequency luminance component at P-th level, is suppressed to substantially zero.

(65) The apparatus of item 51, wherein the specific condition is such that an absolute value of the signal intensity of the high-frequency luminance component at P-th level is equal to or smaller than fifth threshold value $C_t$, which is derived from a standard deviation of the signal intensity of the high-frequency luminance component at P-th level.

(66) The apparatus of item 51, wherein the specific condition is such that an absolute value of the signal intensity of the high-frequency luminance component at P-th level is equal to or smaller than sixth threshold value $G_t$, which is derived from a standard deviation of the signal intensity of the high-frequency luminance component at P-th level; and wherein $P_h$, representing the signal intensity of the high-frequency luminance component at P-th level, is suppressed to substantially zero.

(67) The apparatus of item 51, wherein the specific condition is such that an absolute value of the signal intensity of the high-frequency luminance component at P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein $P_h$, representing the signal intensity of the high-frequency luminance component at P-th level, is suppressed to substantially zero, when the absolute value is equal to or smaller than fifth threshold value $C_t$.

(68) The apparatus of item 52, wherein the specific condition is such that an absolute value of the signal intensity of the high-frequency luminance component at each of levels equal to or smaller than P-th level is equal to or smaller than fifth threshold value $C_t$, which is derived from a standard deviation of the signal intensity of the high-frequency luminance component at each of levels equal to or smaller than P-th level.

(69) The apparatus of item 52, wherein the specific condition is such that an absolute value of the signal intensity of the high-frequency luminance component at each of levels equal to or smaller than P-th level is equal to or smaller than sixth threshold value $G_t$, which is derived from a standard deviation of the signal intensity of the high-frequency luminance component at each of levels equal to or smaller than the P-th level; and wherein the signal intensity of the high-frequency luminance component at each of levels equal to or smaller than the P-th level, is suppressed to substantially zero.

(70) The apparatus of item 52, wherein the specific condition is such that an absolute value of the signal intensity of the high-frequency luminance component at each of levels equal to or smaller than the P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein the signal intensity of the high-frequency luminance component at each of levels equal to or smaller than the P-th level, is suppressed to substantially zero, when the absolute value is equal to or smaller than fifth threshold value $C_t$.

(71) The apparatus described in anyone of items 51-70, wherein a sharpness enhancement processing is performed after completing a suppression processing for the signal intensity of the high-frequency luminance component under the specific condition.

(72) The apparatus of item 71, wherein the sharpness enhancement processing is conducted by enhancing signal intensity of high-frequency luminance components, which do not fulfill the specific condition, at a level at which the suppression processing is conducted.

(73) The apparatus described in anyone of items 51-72, wherein a suppression processing for high-frequency component of the chrominance signals is performed.

(74) The apparatus described in anyone of items 51-73, wherein the specific condition for suppressing the signal intensity of the high-frequency luminance component is made to vary depending on characteristics of a low-frequency component of the chrominance signals.

(75) An apparatus for processing image signals representing an original image, the apparatus comprising: a converting section to convert the image signals to luminance signals and chrominance signals; a Dyadic Wavelet transformer to apply a Dyadic Wavelet transform processing to at least the luminance signals; a suppressing section to suppress a signal intensity of a high-frequency luminance component at P-th level (P is an integer equal to or greater than 1), when the intensity of the high-frequency luminance component conforms to a specific condition; a Dyadic Wavelet inverse-transformer to apply a Dyadic Wavelet inverse-transform processing to transformed and processed signals; and a synthesizing section to synthesize processed luminance signals and the chrominance signals with each other to generate processed image signals; wherein the specific condition is made to vary depending on a low-frequency luminance component.

(76) An apparatus for processing image signals representing an original image, the apparatus comprising: a converting section to convert the image signals to luminance signals and chrominance signals; a Dyadic Wavelet transformer to apply a Dyadic Wavelet transform processing to at least the luminance signals; a suppressing section to suppress a signal intensity of a high-frequency luminance component at a level equal to or lower than P-th level, when the intensity of the high-frequency luminance component conforms to a specific condition; a Dyadic Wavelet inverse-transformer to apply a Dyadic Wavelet inverse-transform processing to transformed and processed signals; and a synthesizing section to synthesize processed luminance signals and the chrominance signals with each other to generate processed image signals; wherein the specific condition is made to vary depending on a difference between signal intensities of low-frequency luminance components.

(77) The apparatus of item 75, wherein the Dyadic Wavelet transform processing at a Q-th level (Q>P) is also applied to the luminance signals, and the specific condition fulfills the relationship of $$Q_h/P_h \leq A_t$$

where, $Q_h$: signal intensity of high-frequency luminance component at Q-th level,
$P_h$: signal intensity of high-frequency luminance component at P-th level,
$A_t$: first threshold value; and
wherein the Dyadic Wavelet inverse-transform processing is conducted from the P-th level, after suppressing the intensity of the high-frequency luminance component at the P-th level, and further, wherein the first threshold value $A_t$ is made to vary depending on a difference between signal intensities of low-frequency luminance components.

(78) The apparatus of item 77, wherein the specific condition further fulfills the relationships of $$P_{ch+1}/P_{ch} \leq A_t, \text{ and}$$

$$1.5 \geq A_t > 1$$

where, $P_{ch+1}$: signal intensity of compensated high-frequency luminance component at (P+1)-th level,
$P_{ch}$: signal intensity of compensated high-frequency luminance component at P-th level.

(79) The apparatus of item 77, wherein the specific condition further fulfills the relationships of $$P_{chg}/P_{ch} \leq A_t, \text{ and}$$

$$1.5 \geq A_t > 1$$

where, $P_{chg}$: signal intensity of compensated luminance high-frequency component at a level larger than P-th level,
$P_{ch}$: signal intensity of compensated luminance high-frequency component at P-th level; and
wherein $P_h$, representing the signal intensity of the high-frequency luminance component at P-th level, is suppressed to substantially zero, when the specific condition fulfills the relationships of $$P_{ch+1}/P_{ch} \leq B_t, \text{ and}$$

$$1 > B_t \geq 0.7$$

where, $P_{ch+1}$: signal intensity of compensated luminance high-frequency component at (P+1)-th level,
$B_t$: second threshold value.

(80) The apparatus of item 76, wherein the Dyadic Wavelet transform processing at a Q-th level (Q>P) is also applied to the luminance signals, and the specific condition fulfills the relationship of $$P_{hl}/P_{hn} \leq A_t$$

where, $P_{hl}$: signal intensity of high-frequency luminance component at a level larger than each of levels equal to or lower than P-th level,
$P_{hn}$: signal intensity of high-frequency luminance component at each of levels equal to or lower than P-th level,
$A_t$: first threshold value; and
wherein the Dyadic Wavelet inverse-transform processing is conducted from the P-th level, after suppressing the intensity of the high-frequency luminance component at the P-th level, and further, wherein the first threshold value $A_t$ is made to vary depending on a difference between signal intensities of low-frequency luminance components.

(81) The apparatus of item 80, wherein the specific condition further fulfills the relationships of $$P_{chn+1}/P_{chn} \leq A_t, \text{ and}$$

$$2 \geq A_t > 1$$

where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level.

(82) The apparatus of item 80, wherein the specific condition further fulfills the relationships of $$P_{chn+1}/P_{chn} \leq A_t, \text{ and}$$

$$1.5 \geq A_t > 1$$

where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level; and
wherein the signal intensity of high-frequency luminance component at each of levels lower than P-th level is suppressed to substantially zero, when the specific condition fulfills the relationships of $$P_{chn+1}/P_{chn} \leq B_t, \text{ and}$$

$$1 > B_t \geq 0.7$$

where, $B_t$: second threshold value.

(83) The apparatus of item 75, wherein the Dyadic Wavelet transform processing at a P-th level is also applied to the luminance signals, and the specific condition fulfills the relationship of $$P_h/P_{hs} \leq E_t$$

where, $P_h$: signal intensity of high-frequency luminance component at P-th level,
$P_{hs}$: signal intensity of high-frequency luminance component lower than P-th level
$E_t$: third threshold value; and
wherein the Dyadic Wavelet inverse-transform processing is conducted from the P-th level, after suppressing the intensity of the high-frequency luminance component at the P-th level; and further, wherein the first threshold value $E_t$ is made to vary depending on a difference between signal intensities of low-frequency luminance components.

(84) The apparatus of item 83, wherein the specific condition further fulfills the relationships of $$P_{ch}/P_{ch-1} \leq A_t, \text{ and}$$

$$1.5 \geq E_t > 1$$

where, $P_{ch}$: signal intensity of compensated high-frequency luminance component at P-th level,
$P_{ch-1}$: signal intensity of compensated high-frequency luminance component at (P−1)-th level.

(85) The apparatus of item 83, wherein the specific condition further fulfills the relationships of $P_{ch}/P_{ch-1} \leq E_t$, and $1.5 \geq E_t > 1$ where, $P_{ch}$: signal intensity of compensated high-frequency luminance component at P-th level,
$P_{ch-1}$: signal intensity of compensated high-frequency luminance component at (P−1)-th level; and
wherein $P_h$ representing the signal intensity of the high-frequency luminance component at P-th level, is suppressed to substantially zero, when the specific condition fulfills the relationships of $P_{ch}/P_{ch-1} \leq F_t$, and $1 > F_t \geq 0.7$ where, $F_t$: fourth threshold value.

(86) The apparatus of item 76, wherein the Dyadic Wavelet transform processing at a P-th level is also applied to the luminance signals; and wherein, when the following relationship is fulfilled with respect to at least a high-frequency luminance component at P-th level $P_h/P_{hs} \leq E_t$ where, $P_h$: signal intensity of high-frequency luminance component at P-th level,
$P_{hs}$: signal intensity of high-frequency luminance component lower than P-th level
$E_t$: third threshold value,
the Dyadic Wavelet inverse-transform processing is conducted from the P-th level, after suppressing the signal intensity of the high-frequency luminance component at the P-th level; and, wherein the first threshold value $E_t$ is made to vary depending on a difference between signal intensities of low-frequency luminance components.

(87) The apparatus of item 86, wherein, when the following relationship is fulfilled with respect to at least a high-frequency luminance component at P-th level $P_{ch}/P_{ch-1} \leq E_t$, and $1.2 \geq E_t > 1$ where, $P_{ch}$: signal intensity of compensated high-frequency luminance component at P-th level,
$P_{ch-1}$: signal intensity of compensated high-frequency luminance component at (P−1)-th level
the signal intensity of the high-frequency luminance component at the P-th level is suppressed.

(88) The apparatus of item 86, wherein, when the following relationship is fulfilled with respect to at least a high-frequency luminance component at P-th level $P_{ch}/P_{ch-1} \leq E_t$, and $1.5 \geq E_t > 1$ where, $P_{ch}$: signal intensity of compensated high-frequency luminance component at P-th level,
$P_{ch-1}$: signal intensity of compensated high-frequency luminance component at (P−1)-th level
the signal intensity of the high-frequency luminance component at the P-th level is suppressed; and wherein the signal intensity of high-frequency luminance component at the P-th level is suppressed to substantially zero, when the specific condition fulfills the relationships of $P_{ch}/P_{ch-1} \leq F_t$, and $1 > F_t \geq 0.7$ where, $F_t$: fourth threshold value.

(89) The apparatus of item 75, wherein the specific condition is such that an absolute value of the signal intensity of the high-frequency luminance component at P-th level is equal to or smaller than fifth threshold value $C_t$, which is derived from a standard deviation of the signal intensity of the high-frequency luminance component at P-th level; and wherein the fifth threshold value $C_t$ is made to vary depending on a difference between signal intensities of low-frequency luminance components.

(90) The apparatus of item 75, wherein the specific condition is such that an absolute value of the signal intensity of the high-frequency luminance component at P-th level is equal to or smaller than sixth threshold value $G_t$, which is derived from a standard deviation of the signal intensity of the high-frequency luminance component at the P-th level; and wherein the signal intensity of the high-frequency luminance component at the P-th level, is suppressed to substantially zero.

(91) The apparatus of item 75, wherein the specific condition is such that an absolute value of the signal intensity of the high-frequency luminance component at P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein the signal intensity of the high-frequency luminance component at the P-th level, is suppressed to substantially zero, when the absolute value is equal to or smaller than fifth threshold value $C_t$; and wherein both the fifth threshold value $C_t$ and the seventh threshold value $D_t$ are made to vary depending on a difference between signal intensities of low-frequency luminance components.

(92) The apparatus of item 76, wherein the specific condition is such that an absolute value of the signal intensity of the high-frequency luminance component at each of levels equal to or smaller than P-th level is equal to or smaller than fifth threshold value $C_t$, which is derived from a standard deviation of the signal intensity of the high-frequency luminance component at each of levels equal to or smaller than P-th level; and wherein the fifth threshold value $C_t$ is made to vary depending on a difference between signal intensities of low-frequency luminance components.

(93) The apparatus of item 76, wherein the specific condition is such that an absolute value of the signal intensity of the high-frequency luminance component at each of levels equal to or smaller than P-th level is equal to or smaller than sixth threshold value $G_t$, which is derived from a standard deviation of the signal intensity of the high-frequency luminance component at each of levels equal to or smaller than the P-th level; and wherein the signal intensity of the high-frequency luminance component at each of levels equal to or smaller than the P-th level, is suppressed to substantially zero.

(94) The apparatus of item 76, wherein the specific condition is such that an absolute value of the signal intensity of the high-frequency luminance component at each of levels equal to or smaller than the P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein the signal intensity of the high-frequency luminance component at each of levels equal to or smaller than the P-th level, is suppressed to substantially zero, when the absolute value is equal to or smaller than fifth threshold value $C_t$; and wherein both the fifth threshold value $C_t$ and the seventh threshold value $D_t$ are made to vary depending on a difference between signal intensities of low-frequency luminance components.

(95) The apparatus described in anyone of items 75-94, wherein a sharpness enhancement processing is performed after completing a suppression processing for the signal intensity of the high-frequency luminance component under the specific condition.

(96) The apparatus of item 95, wherein the sharpness enhancement processing is conducted by enhancing signal intensity of high-frequency luminance components, which do not fulfill the specific condition, at a level at which the suppression processing is conducted.

(97) The apparatus described in anyone of items 75-96, wherein a suppression processing for high-frequency component of the chrominance signals is performed.

(98) The apparatus described in anyone of items 75-97, wherein the specific condition for suppressing the signal intensity of the high-frequency luminance component is made to vary depending on characteristics of a low-frequency component of the chrominance signals.

(99) The apparatus described in anyone of items 51-98, wherein the image signals, representing the original image, are acquired by scanning a silver-halide film.

(100) The apparatus described in anyone of items 51-99, wherein slight noises are added to the processed image signals.

(101) A computer program for executing image-processing operations to process image signals representing an original image, the computer program comprising the functional steps of: converting the image signals to luminance signals and chrominance signals; applying a Dyadic Wavelet transform processing to at least the luminance signals; suppressing a signal intensity of a high-frequency luminance component at P-th level (P is an integer equal to or greater than 1), when the intensity of the high-frequency luminance component conforms to a specific condition; applying a Dyadic Wavelet inverse-transform processing to transformed and processed signals; and synthesizing processed luminance signals and the chrominance signals with each other to generate processed image signals.

(102) A computer program for executing image-processing operations to process image signals representing an original image, the computer program comprising the functional steps of: converting the image signals to luminance signals and chrominance signals; applying a Dyadic Wavelet transform processing to at least the luminance signals; suppressing a signal intensity of a high-frequency luminance component at a level equal to or lower than a P-th level (P is an integer equal to or greater than 2), when the intensity of the high-frequency luminance component conforms to a specific condition; applying a Dyadic Wavelet inverse-transform processing to transformed and processed signals; and synthesizing processed luminance signals and the chrominance signals with each other to generate processed image signals.

(103) The computer program of item 101, wherein the Dyadic Wavelet transform processing at a Q-th level (Q>P) is also applied to the luminance signals, and the specific condition fulfills the relationship of $Q_h/P_h \leq A_t$ where, $Q_h$: signal intensity of high-frequency luminance component at Q-th level,
$P_h$: signal intensity of high-frequency luminance component at P-th level,
$A_t$: first threshold value.

(104) The computer program of item 103, wherein the specific condition further fulfills the relationships of $P_{ch+1}/P_{ch} \leq A_t$, and $1.2 \geq A_t \geq 1$ where, $P_{ch+1}$: signal intensity of compensated high-frequency luminance component at (P+1)-th level,
$P_{ch}$: signal intensity of compensated high-frequency luminance component at P-th level.

(105) The computer program of item 103, wherein the specific condition further fulfills the relationships of $P_{ch+1}/P_{ch} \leq A_t$, and $1.2 \geq A_t \geq 1$ where, $P_{ch+1}$: signal intensity of compensated luminance high-frequency component at (P+1)-th level,
$P_{ch}$: signal intensity of compensated luminance high-frequency component at P-th level; and
wherein $P_h$, representing the signal intensity of the high-frequency luminance component at P-th level, is suppressed to substantially zero, when the specific condition fulfills the relationships of $P_{ch+1}/P_{ch} \leq B_t$, and $1 > B_t \geq 0.8$ where, $B_t$: second threshold value.

(106) The computer program of item 102, wherein the Dyadic Wavelet transform processing at a Q-th level (Q>P) is also applied to the luminance signals, and the specific condition fulfills the relationship of $P_{hl}/P_{hn} \leq A_t$ where, $P_{hl}$: signal intensity of high-frequency luminance component at a level larger than each of levels equal to or lower than P-th level,
$P_{hn}$: signal intensity of high-frequency luminance component at each of levels equal to or lower than P-th level,
$A_t$: first threshold value; and
wherein the signal intensity of high-frequency luminance component at each of levels equal to or lower than P-th level is suppressed.

(107) The computer program of item 106, wherein the specific condition further fulfills the relationships of $P_{chn+1}/P_{chn} \leq A_t$, and $1.2 \geq A_t \geq 1$ where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level.

(108) The computer program of item 106, wherein the specific condition further fulfills the relationships of $P_{chn+1}/P_{chn} \leq A_t$, and $1.2 \geq A_t \geq 1$ where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level; and
wherein the signal intensity of high-frequency luminance component at each of levels lower than P-th level is suppressed to substantially zero, when the specific condition fulfills the relationships of $P_{chn+1}/P_{chn} \leq B_t$, and $1 > B_t \geq 0.8$ where, $B_t$: second threshold value.

(109) The computer program of item 101, wherein the Dyadic Wavelet transform processing at a P-th level ($P \geq 2$) is also applied to the luminance signals, and the specific condition fulfills the relationship of $P_h/P_{hs} \leq E_t$ where, $P_h$: signal intensity of high-frequency luminance component at P-th level,
$P_{hs}$: signal intensity of high-frequency luminance component lower than P-th level
$E_t$: third threshold value; and
wherein the Dyadic Wavelet inverse-transform processing is conducted from the P-th level, after suppressing the intensity of the high-frequency luminance component at the P-th level.

(110) The computer program of item 109, wherein the specific condition further fulfills the relationships of $P_{ch}/P_{ch-1} \leq A_t$, and $1.2 \geq E_t \geq 1$ where, $P_{ch}$: signal intensity of compensated high-frequency luminance component at P-th level,
$P_{ch-1}$: signal intensity of compensated high-frequency luminance component at (P−1)-th level.

(111) The computer program of item 109, wherein the specific condition further fulfills the relationships of $P_{ch}/P_{ch-1} \leq E_t$, and $1.2 \geq E_t \geq 1$ where, $P_{ch}$: signal intensity of compensated high-frequency luminance component at P-th level,
$P_{ch-1}$: signal intensity of compensated high-frequency luminance component at (P−1)-th level; and
wherein $P_h$, representing the signal intensity of the high-frequency luminance component at P-th level, is suppressed to substantially zero, when the specific condition fulfills the relationships of $P_{ch}/P_{ch-1} \leq F_t$, and $1 > F_t \geq 0.8$ where, $F_t$: fourth threshold value.

(112) The computer program of item 102, wherein the Dyadic Wavelet transform processing at a P-th level is also applied to the luminance signals; and wherein, when the following relationship is fulfilled with respect to at least a high-frequency luminance component at P-th level $P_h/P_{hs} \leq E_t$ where, $P_h$: signal intensity of high-frequency luminance component at P-th level,
$P_{hs}$: signal intensity of high-frequency luminance component lower than P-th level
$E_t$: third threshold value,
the Dyadic Wavelet inverse-transform processing is conducted from the P-th level, after suppressing the signal intensity of the high-frequency luminance component at the P-th level.

(113) The computer program of item 112, wherein, when the following relationship is fulfilled with respect to at least a high-frequency luminance component at P-th level $P_{ch}/P_{ch-1} \leq A_t$, and $1.2 \geq E_t \geq 1$ where, $P_{ch}$: signal intensity of compensated high-frequency luminance component at P-th level,
$P_{ch-1}$: signal intensity of compensated high-frequency luminance component at (P−1)-th level,
the signal intensity of the high-frequency luminance component at the P-th level is suppressed.

(114) The computer program of item 112, wherein, when the following relationship is fulfilled with respect to at least a high-frequency luminance component at P-th level $P_{ch}/P_{ch-1} \leq A_t$, and $1.2 \geq E_t \geq 1$ where, $P_{ch}$: signal intensity of compensated high-frequency luminance component at P-th level,
$P_{ch-1}$: signal intensity of compensated high-frequency luminance component at (P−1)-th level,
the signal intensity of the high-frequency luminance component at the P-th level is suppressed; and wherein, when the following relationship is fulfilled with respect to at least a high-frequency luminance component at P-th level $P_{ch}/P_{ch-1} \leq F_t$, and $1 > F_t \geq 0.8$ where, $P_{ch}$: signal intensity of compensated high-frequency luminance component at P-th level,
$P_{ch-1}$: signal intensity of compensated high-frequency luminance component at (P−1)-th level.
$F_t$: fourth threshold value,
$P_h$, representing the signal intensity of the high-frequency luminance component at P-th level, is suppressed to substantially zero.

(115) The computer program of item 101, wherein the specific condition is such that an absolute value of the signal intensity of the high-frequency luminance component at P-th level is equal to or smaller than fifth threshold value $C_t$, which is derived from a standard deviation of the signal intensity of the high-frequency luminance component at P-th level.

(116) The computer program of item 101, wherein the specific condition is such that an absolute value of the signal intensity of the high-frequency luminance component at P-th level is equal to or smaller than sixth threshold value $G_t$, which is derived from a standard deviation of the signal intensity of the high-frequency luminance component at P-th level; and wherein $P_h$, representing the signal intensity of the high-frequency luminance component at P-th level, is suppressed to substantially zero.

(117) The computer program of item 101, wherein the specific condition is such that an absolute value of the signal intensity of the high-frequency luminance component at P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein $P_h$, representing the signal intensity of the high-frequency luminance component at P-th level, is suppressed to substantially zero, when the absolute value is equal to or smaller than fifth threshold value $C_t$.

(118) The computer program of item 102, wherein the specific condition is such that an absolute value of the signal intensity of the high-frequency luminance component at each of levels equal to or smaller than P-th level is equal to or smaller than fifth threshold value $C_t$, which is derived from a standard deviation of the signal intensity of the high-frequency luminance component at each of levels equal to or smaller than P-th level.

(119) The computer program of item 102, wherein the specific condition is such that an absolute value of the signal intensity of the high-frequency luminance component at each of levels equal to or smaller than P-th level is equal to or smaller than sixth threshold value $G_t$, which is derived from a standard deviation of the signal intensity of the high-frequency luminance component at each of levels equal to or smaller than the P-th level; and wherein the signal intensity of the high-frequency luminance component at each of levels equal to or smaller than the P-th level, is suppressed to substantially zero.

(120) The computer program of item 102, wherein the specific condition is such that an absolute value of the signal intensity of the high-frequency luminance component at each of levels equal to or smaller than the P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein the signal intensity of the high-frequency luminance component at each of levels equal to or smaller than the P-th level, is suppressed to substantially zero, when the absolute value is equal to or smaller than fifth threshold value $C_t$.

(121) The computer program described in anyone of items 101-120, wherein a sharpness enhancement processing is performed after completing a suppression processing for the signal intensity of the high-frequency luminance component under the specific condition.

(122) The computer program of item 121, wherein the sharpness enhancement processing is conducted by enhancing signal intensity of high-frequency luminance components, which do not fulfill the specific condition, at a level at which the suppression processing is conducted.

(123) The computer program described in anyone of items 101-122, wherein a suppression processing for high-frequency component of the chrominance signals is performed.

(124) The computer program described in anyone of items 101-123, wherein the specific condition for suppressing the signal intensity of the high-frequency luminance component is made to vary depending on characteristics of a low-frequency component of the chrominance signals.

(125) A computer program for executing image-processing operations to process image signals representing an original image, the computer program comprising the functional steps of: converting the image signals to luminance signals and chrominance signals; applying a Dyadic Wavelet transform processing to at least the luminance signals; suppressing a signal intensity of a high-frequency luminance component at a P-th level (P is an integer equal to or greater than 1), when the intensity of the high-frequency luminance component conforms to a specific condition; applying a Dyadic Wavelet inverse-transform processing to transformed and processed signals; and synthesizing processed luminance signals and the chrominance signals with each other to generate processed image signals; wherein the specific condition is made to vary depending on a low-frequency luminance component.

(126) A computer program for executing image-processing operations to process image signals representing an original image, the computer program comprising the functional steps of: converting the image signals to luminance signals and chrominance signals; applying a Dyadic Wavelet transform processing to at least the luminance signals; suppressing a signal intensity of a high-frequency luminance component at a level equal to or lower than P-th level, when the intensity of the high-frequency luminance component conforms to a specific condition; applying a Dyadic Wavelet inverse-transform processing to transformed and processed signals; and synthesizing processed luminance signals and the chrominance signals with each other to generate processed image signals; wherein the specific condition is made to vary depending on a difference between signal intensities of low-frequency luminance components.

(127) The computer program of item 125, wherein the Dyadic Wavelet transform processing at a Q-th level (Q>P) is also applied to the luminance signals, and the specific condition fulfills the relationship of $$Q_h/P_h \leq A_t$$

where, $Q_h$: signal intensity of high-frequency luminance component at Q-th level, $P_h$: signal intensity of high-frequency luminance component at P-th level, $A_t$: first threshold value; and wherein the Dyadic Wavelet inverse-transform processing is conducted from the P-th level, after suppressing the intensity of the high-frequency luminance component at the P-th level, and further, wherein the first threshold value $A_t$ is made to vary depending on a difference between signal intensities of low-frequency luminance components.

(128) The computer program of item 127, wherein the specific condition further fulfills the relationships of $$P_{ch+1}/P_{ch} \leq A_t, \text{ and}$$

$$1.5 \geq A_t > 1$$

where, $P_{ch+1}$: signal intensity of compensated high-frequency luminance component at (P+1)-th level, $P_{ch}$: signal intensity of compensated high-frequency luminance component at P-th level.

(129) The computer program of item 127, wherein the specific condition further fulfills the relationships of $P_{chg}/P_{ch} \leq A_t$, and $1.5 \geq A_t > 1$ where, $P_{chg}$: signal intensity of compensated luminance high-frequency component at a level larger than P-th level,
  $P_{ch}$: signal intensity of compensated luminance high-frequency component at P-th level; and
wherein $P_h$, representing the signal intensity of the high-frequency luminance component at P-th level, is suppressed to substantially zero, when the specific condition fulfills the relationships of $P_{ch+1}/P_{ch} \leq B_t$, and $1 > B_t \geq 0.7$ where, $P_{ch+1}$: signal intensity of compensated luminance high-frequency component at (P+1)-th level,
  $B_t$: second threshold value.
(130) The computer program of item 126, wherein the Dyadic Wavelet transform processing at a Q-th level (Q>P) is also applied to the luminance signals, and the specific condition fulfills the relationship of $P_{hl}/P_{hn} \leq A_t$ where, $P_{hl}$: signal intensity of high-frequency luminance component at a level larger than each of levels equal to or lower than P-th level,
  $P_{hn}$: signal intensity of high-frequency luminance component at each of levels equal to or lower than P-th level,
  $A_t$: first threshold value; and
wherein the Dyadic Wavelet inverse-transform processing is conducted from the P-th level, after suppressing the intensity of the high-frequency luminance component at the P-th level, and further, wherein the first threshold value $A_t$ is made to vary depending on a difference between signal intensities of low-frequency luminance components.
(131) The computer program of item 130, wherein the specific condition further fulfills the relationships of $P_{chn+1}/P_{chn} \leq A_t$, and $2 \geq A_t > 1$ where, $P_{chn+1}$: signal intensity of compensated high-frequency luminance component at (each of levels equal to or lower than P-th level)+1 level,
  $P_{chn}$: signal intensity of compensated high-frequency luminance component at each of levels equal to or lower than P-th level.
(132) The computer program of item 130, wherein the specific condition further fulfills the relationships of $P_{chn+1}/P_{chn} \leq A_t$, and $1.5 \geq A_t > 1$ where, $P_{chn+1}$: signal intensity of compensated high-frequency luminance component at (each of levels equal to or lower than P-th level)+1 level,
  $P_{chn}$: signal intensity of compensated high-frequency luminance component at each of levels equal to or lower than P-th level; and
wherein the signal intensity of high-frequency luminance component at each of levels lower than P-th level is suppressed to substantially zero, when the specific condition fulfills the relationships of $P_{chn+1}/P_{chn} \leq B_t$, and $1 > B_t \geq 0.7$ where, $B_t$: second threshold value.
(133) The computer program of item 125, wherein the Dyadic Wavelet transform processing at a P-th level is also applied to the luminance signals, and the specific condition fulfills the relationship of $P_h/P_{hs} \leq E_t$ where, $P_h$: signal intensity of high-frequency luminance component at P-th level,
  $P_{hs}$: signal intensity of high-frequency luminance component lower than P-th level
  $E_t$: third threshold value; and
wherein the Dyadic Wavelet inverse-transform processing is conducted from the P-th level, after suppressing the intensity of the high-frequency luminance component at the P-th level; and further, wherein the first threshold value $E_t$ is made to vary depending on a difference between signal intensities of low-frequency luminance components.
(134) The computer program of item 133, wherein the specific condition further fulfills the relationships of $P_{ch}/P_{ch-1} \leq A_t$, and $1.5 \geq E_t > 1$ where, $P_{ch}$: signal intensity of compensated high-frequency luminance component at P-th level,
  $P_{ch-1}$: signal intensity of compensated high-frequency luminance component at (P−1)-th level.
(135) The computer program of item 133, wherein the specific condition further fulfills the relationships of $P_{ch}/P_{ch-1} \leq E_t$, and $1.5 \geq E_t > 1$ where, $P_{ch}$: signal intensity of compensated high-frequency luminance component at P-th level,
  $P_{ch-1}$: signal intensity of compensated high-frequency luminance component at (P−1)-th level; and
wherein $P_h$, representing the signal intensity of the high-frequency luminance component at P-th level, is suppressed to substantially zero, when the specific condition fulfills the relationships of $P_{ch}/P_{ch-1} \leq F_t$, and $1 > F_t \geq 0.7$ where, $F_t$: fourth threshold value.
(136) The computer program of item 126, wherein the Dyadic Wavelet transform processing at a P-th level is also applied to the luminance signals; and wherein, when the following relationship is fulfilled with respect to at least a high-frequency luminance component at P-th level $P_h/P_{hs} \leq E_t$ where, $P_h$: signal intensity of high-frequency luminance component at P-th level,
  $P_{hs}$: signal intensity of high-frequency luminance component lower than P-th level
  $E_t$: third threshold value,
the Dyadic Wavelet inverse-transform processing is conducted from the P-th level, after suppressing the signal intensity of the high-frequency luminance component at the P-th level; and, wherein the first threshold value $E_t$ is made to vary depending on a difference between signal intensities of low-frequency luminance components.

(137) The computer program of item 136, wherein, when the following relationship is fulfilled with respect to at least a high-frequency luminance component at P-th level $P_{ch}/P_{ch-1} \leq E_t$, and $1.2 \geq E_t > 1$ where, $P_{ch}$: signal intensity of compensated high-frequency luminance component at P-th level,
$P_{ch-1}$: signal intensity of compensated high-frequency luminance component at (P−1)-th level
the signal intensity of the high-frequency luminance component at the P-th level is suppressed.

(138) The computer program of item 136, wherein, when the following relationship is fulfilled with respect to at least a high-frequency luminance component at P-th level $P_{ch}/P_{ch-1} \leq E_t$, and $1.5 \geq E_t > 1$ where, $P_{ch}$: signal intensity of compensated high-frequency luminance component at P-th level,
$P_{ch-1}$: signal intensity of compensated high-frequency luminance component at (P−1)-th level
the signal intensity of the high-frequency luminance component at the P-th level is suppressed; and wherein the signal intensity of high-frequency luminance component at the P-th level is suppressed to substantially zero, when the specific condition fulfills the relationships of $P_{ch}/P_{ch-1} \leq F_t$, and $1 > F_t \geq 0.7$ where, $F_t$: fourth threshold value.

(139) The computer program of item 125, wherein the specific condition is such that an absolute value of the signal intensity of the high-frequency luminance component at P-th level is equal to or smaller than fifth threshold value $C_t$, which is derived from a standard deviation of the signal intensity of the high-frequency luminance component at P-th level; and wherein the fifth threshold value $C_t$ is made to vary depending on a difference between signal intensities of low-frequency luminance components.

(140) The computer program of item 125, wherein the specific condition is such that an absolute value of the signal intensity of the high-frequency luminance component at P-th level is equal to or smaller than sixth threshold value $G_t$, which is derived from a standard deviation of the signal intensity of the high-frequency luminance component at the P-th level; and wherein the signal intensity of the high-frequency luminance component at the P-th level, is suppressed to substantially zero.

(141) The computer program of item 125, wherein the specific condition is such that an absolute value of the signal intensity of the high-frequency luminance component at P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein the signal intensity of the high-frequency luminance component at the P-th level, is suppressed to substantially zero, when the absolute value is equal to or smaller than fifth threshold value $C_t$; and wherein both the fifth threshold value $C_t$ and the seventh threshold value $D_t$ are made to vary depending on a difference between signal intensities of low-frequency luminance components.

(142) The computer program of item 126, wherein the specific condition is such that an absolute value of the signal intensity of the high-frequency luminance component at each of levels equal to or smaller than P-th level is equal to or smaller than fifth threshold value $C_t$, which is derived from a standard deviation of the signal intensity of the high-frequency luminance component at each of levels equal to or smaller than P-th level; and wherein the fifth threshold value $C_t$ is made to vary depending on a difference between signal intensities of low-frequency luminance components.

(143) The computer program of item 126, wherein the specific condition is such that an absolute value of the signal intensity of the high-frequency luminance component at each of levels equal to or smaller than P-th level is equal to or smaller than sixth threshold value $G_t$, which is derived from a standard deviation of the signal intensity of the high-frequency luminance component at each of levels equal to or smaller than the P-th level; and wherein the signal intensity of the high-frequency luminance component at each of levels equal to or smaller than the P-th level, is suppressed to substantially zero.

(144) The computer program of item 126, wherein the specific condition is such that an absolute value of the signal intensity of the high-frequency luminance component at each of levels equal to or smaller than the P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein the signal intensity of the high-frequency luminance component at each of levels equal to or smaller than the P-th level, is suppressed to substantially zero, when the absolute value is equal to or smaller than fifth threshold value $C_t$; and wherein both the fifth threshold value $C_t$ and the seventh threshold value $D_t$ are made to vary depending on a difference between signal intensities of low-frequency luminance components.

(145) The computer program described in anyone of items 125-144, wherein a sharpness enhancement processing is performed after completing a suppression processing for the signal intensity of the high-frequency luminance component under the specific condition.

(146) The computer program of item 145, wherein the sharpness enhancement processing is conducted by enhancing signal intensity of high-frequency luminance components, which do not fulfill the specific condition, at a level at which the suppression processing is conducted.

(147) The computer program described in anyone of items 125-146, wherein a suppression processing for high-frequency component of the chrominance signals is performed.

(148) The computer program described in anyone of items 125-147, wherein the specific condition for suppressing the signal intensity of the high-frequency luminance component is made to vary depending on characteristics of a low-frequency component of the chrominance signals.

(149) The computer program described in anyone of items 101-148, wherein the image signals, representing the original image, are acquired by scanning a silver-halide film.

(150) The computer program described in anyone of items 101-149, wherein slight noises are added to the processed image signals.
(151) An apparatus for recording an image based on a processed image signals onto a recording medium, the apparatus comprising: an image-processing section to process image signals representing an original image, so as to generate the processed image signals; and an image-recording section to record the image, based on the processed image signals generated by the image-processing section, onto the recording medium; wherein the image-processing section includes: a converting section to convert the image signals to luminance signals and chrominance signals; a Dyadic Wavelet transformer to apply a Dyadic Wavelet transform processing to at least the luminance signals; a suppressing section to suppress a signal intensity of a high-frequency luminance component at P-th level (P is an integer equal to or greater than 1), when the intensity of the high-frequency luminance component conforms to a specific condition; a Dyadic Wavelet inverse-transformer to apply a Dyadic Wavelet inverse-transform processing to transformed and processed signals; and a synthesizing section to synthesize processed luminance signals and the chrominance signals with each other to generate the processed image signals.
(152) An apparatus for recording an image based on a processed image signals onto a recording medium, the apparatus comprising: an image-processing section to process image signals representing an original image, so as to generate the processed image signals; and an image-recording section to record the image, based on the processed image signals generated by the image-processing section, onto the recording medium; wherein the image-processing section includes: a converting section to convert the image signals to luminance signals and chrominance signals; a Dyadic Wavelet transformer to apply a Dyadic Wavelet transform processing to at least the luminance signals; a suppressing section to suppress a signal intensity of a high-frequency luminance component at a level equal to or lower than a P-th level (P is an integer equal to or greater than 2), when the intensity of the high-frequency luminance component conforms to a specific condition; a Dyadic Wavelet inverse-transformer to apply a Dyadic Wavelet inverse-transform processing to transformed and processed signals; and a synthesizing section to synthesize processed luminance signals and the chrominance signals with each other to generate the processed image signals.
(153) The apparatus of item 151, wherein the Dyadic Wavelet transform processing at a Q-th level (Q>P) is also applied to the luminance signals, and the specific condition fulfills the relationship of $Q_h/P_h \leq A_t$ where, $Q_h$: signal intensity of high-frequency luminance component at Q-th level,
$P_h$: signal intensity of high-frequency luminance component at P-th level,
$A_t$: first threshold value.
(154) The apparatus of item 153, wherein the specific condition further fulfills the relationships of $P_{ch+1}/P_{ch} \leq A_t$, and $1.2 \geq A_t \geq 1$ where, $P_{ch+1}$: signal intensity of compensated high-frequency luminance component at (P+1)-th level,
$P_{ch}$: signal intensity of compensated high-frequency luminance component at P-th level.
(155) The apparatus of item 153, wherein the specific condition further fulfills the relationships of $P_{ch+1}/P_{ch} \leq A_t$, and $1.2 \geq A_t \geq 1$ where, $P_{Ch+1}$: signal intensity of compensated luminance high-frequency component at (P+1)-th level,
$P_{ch}$: signal intensity of compensated luminance high-frequency component at P-th level; and
wherein $P_h$, representing the signal intensity of the high-frequency luminance component at P-th level, is suppressed to substantially zero, when the specific condition fulfills the relationships of $P_{ch+1}/P_{ch} \leq B_t$, and $1 \geq B_t \geq 0.8$ where, $B_t$: second threshold value.
(156) The apparatus of item 152, wherein the Dyadic Wavelet transform processing at a Q-th level (Q>P) is also applied to the luminance signals, and the specific condition fulfills the relationship of $P_{hl}/P_{hn} \leq A_t$ where, $P_{hl}$: signal intensity of high-frequency luminance component at a level larger than each of levels equal to or lower than P-th level,
$P_{hn}$: signal intensity of high-frequency luminance component at each of levels equal to or lower than P-th level,
$A_t$: first threshold value; and
wherein the signal intensity of high-frequency luminance component at each of levels equal to or lower than P-th level is suppressed.
(157) The apparatus of item 156, wherein the specific condition further fulfills the relationships of $P_{chn+1}/P_{chn} \leq A_t$, and $1.2 \geq A_t \geq 1$ where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level.
(158) The apparatus of item 156, wherein the specific condition further fulfills the relationships of $P_{chn+1}/P_{chn} \leq A_t$, and $1.2 \geq A_t \geq 1$ where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level; and
wherein the signal intensity of high-frequency luminance component at each of levels lower than P-th level is suppressed to substantially zero, when the specific condition fulfills the relationships of $P_{chn+1}/P_{chn} \leq B_t$, and $1 > B_t \geq 0.8$ where, $B_t$: second threshold value.

(159) The apparatus of item 151, wherein the Dyadic Wavelet transform processing at a P-th level (P≧2) is also applied to the luminance signals, and the specific condition fulfills the relationship of $P_h/P_{hs} \leq E_t$ where, $P_h$: signal intensity of high-frequency luminance component at P-th level,
$P_{hs}$: signal intensity of high-frequency luminance component lower than P-th level
$E_t$: third threshold value; and
wherein the Dyadic Wavelet inverse-transform processing is conducted from the P-th level, after suppressing the intensity of the high-frequency luminance component at the P-th level.

(160) The apparatus of item 159, wherein the specific condition further fulfills the relationships of $P_{ch}/P_{ch-1} \leq A_t$, and $1.2 \geq E_t \geq 1$ where, $P_{ch}$: signal intensity of compensated high-frequency luminance component at P-th level,
$P_{ch-1}$: signal intensity of compensated high-frequency luminance component at (P−1)-th level.

(161) The apparatus of item 159, wherein the specific condition further fulfills the relationships of $P_{ch}/P_{ch-1} \leq E_t$, and $1.2 \geq E_t \geq 1$ where, $P_{ch}$: signal intensity of compensated high-frequency luminance component at P-th level,
$P_{ch-1}$: signal intensity of compensated high-frequency luminance component at (P−1)-th level; and
wherein $P_h$, representing the signal intensity of the high-frequency luminance component at P-th level, is suppressed to substantially zero, when the specific condition fulfills the relationships of $P_{ch}/P_{ch-1} \leq F_t$, and $1 > F_t \geq 0.8$ where, $F_t$: fourth threshold value.

(162) The apparatus of item 152, wherein the Dyadic Wavelet transform processing at a P-th level is also applied to the luminance signals; and wherein, when the following relationship is fulfilled with respect to at least a high-frequency luminance component at P-th level $P_h/P_{hs} \leq E_t$ where, $P_h$: signal intensity of high-frequency luminance component at P-th level,
$P_{hs}$: signal intensity of high-frequency luminance component lower than P-th level
$E_t$: third threshold value,
the Dyadic Wavelet inverse-transform processing is conducted from the P-th level, after suppressing the signal intensity of the high-frequency luminance component at the P-th level.

(163) The apparatus of item 162, wherein, when the following relationship is fulfilled with respect to at least a high-frequency luminance component at P-th level $P_{ch}/P_{ch-1} \leq A_t$, and $1.2 \geq E_t \geq 1$ where, $P_{ch}$: signal intensity of compensated high-frequency luminance component at P-th level,
$P_{ch-1}$: signal intensity of compensated high-frequency luminance component at (P−1)-th level,
the signal intensity of the high-frequency luminance component at the P-th level is suppressed.

(164) The apparatus of item 162, wherein, when the following relationship is fulfilled with respect to at least a high-frequency luminance component at P-th level $P_{ch}/P_{ch-1} \leq A_t$, and $1.2 \geq E_t \geq 1$ where, $P_{ch}$: signal intensity of compensated high-frequency luminance component at P-th level,
$P_{ch-1}$: signal intensity of compensated high-frequency luminance component at (P−1)-th level,
the signal intensity of the high-frequency luminance component at the P-th level is suppressed; and wherein, when the following relationship is fulfilled with respect to at least a high-frequency luminance component at P-th level $P_{ch}/P_{ch-1} \leq F_t$, and $1 > F_t \geq 0.8$ where, $P_{ch}$: signal intensity of compensated high-frequency luminance component at P-th level,
$P_{ch-1}$: signal intensity of compensated high-frequency luminance component at (P−1)-th level.
$F_t$: fourth threshold value,
$P_h$, representing the signal intensity of the high-frequency luminance component at P-th level, is suppressed to substantially zero.

(165) The apparatus of item 151, wherein the specific condition is such that an absolute value of the signal intensity of the high-frequency luminance component at P-th level is equal to or smaller than fifth threshold value $C_t$, which is derived from a standard deviation of the signal intensity of the high-frequency luminance component at P-th level.

(166) The apparatus of item 151, wherein the specific condition is such that an absolute value of the signal intensity of the high-frequency luminance component at P-th level is equal to or smaller than sixth threshold value $G_t$, which is derived from a standard deviation of the signal intensity of the high-frequency luminance component at P-th level; and wherein $P_h$, representing the signal intensity of the high-frequency luminance component at P-th level, is suppressed to substantially zero.

(167) The apparatus of item 151, wherein the specific condition is such that an absolute value of the signal intensity of the high-frequency luminance component at P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein $P_h$, representing the signal intensity of the high-frequency luminance compo- (168) The apparatus of item 152, wherein the specific condition is such that an absolute value of the signal intensity of the high-frequency luminance component at each of levels equal to or smaller than P-th level is equal to or smaller than fifth threshold value $C_t$, which is derived from a standard deviation of the signal intensity of the high-frequency luminance component at each of levels equal to or smaller than P-th level.

(169) The apparatus of item 152, wherein the specific condition is such that an absolute value of the signal intensity of the high-frequency luminance component at each of levels equal to or smaller than P-th level is equal to or smaller than sixth threshold value $G_t$, which is derived from a standard deviation of the signal intensity of the high-frequency luminance component at each of levels equal to or smaller than the P-th level; and wherein the signal intensity of the high-frequency luminance component at each of levels equal to or smaller than the P-th level, is suppressed to substantially zero.

(170) The apparatus of item 152, wherein the specific condition is such that an absolute value of the signal intensity of the high-frequency luminance component at each of levels equal to or smaller than the P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein the signal intensity of the high-frequency luminance component at each of levels equal to or smaller than the P-th level, is suppressed to substantially zero, when the absolute value is equal to or smaller than fifth threshold value $C_t$.

(171) The apparatus described in anyone of items 151-170, wherein a sharpness enhancement processing is performed after completing a suppression processing for the signal intensity of the high-frequency luminance component under the specific condition.

(172) The apparatus of item 171, wherein the sharpness enhancement processing is conducted by enhancing signal intensity of high-frequency luminance components, which do not fulfill the specific condition, at a level at which the suppression processing is conducted.

(173) The apparatus described in anyone of items 151-172, wherein a suppression processing for high-frequency component of the chrominance signals is performed.

(174) The apparatus described in anyone of items 151-173, wherein the specific condition for suppressing the signal intensity of the high-frequency luminance component is made to vary depending on characteristics of a low-frequency component of the chrominance signals.

(175) An apparatus for recording an image based on a processed image signals onto a recording medium, the apparatus comprising: an image-processing section to process image signals representing an original image, so as to generate the processed image signals; and an image-recording section to record the image, based on the processed image signals generated by the image-processing section, onto the recording medium; wherein the image-processing section includes: a converting section to convert the image signals to luminance signals and chrominance signals; a Dyadic Wavelet transformer to apply a Dyadic Wavelet transform processing to at least the luminance signals; a suppressing section to suppress a signal intensity of a high-frequency luminance component at P-th level (P is an integer equal to or greater than 1), when the intensity of the high-frequency luminance component conforms to a specific condition; a Dyadic Wavelet inverse-transformer to apply a Dyadic Wavelet inverse-transform processing to transformed and processed signals; and a synthesizing section to synthesize processed luminance signals and the chrominance signals with each other to generate the processed image signals; and wherein the specific condition is made to vary depending on a low-frequency luminance component.

(176) An apparatus for recording an image based on a processed image signals onto a recording medium, the apparatus comprising: an image-processing section to process image signals representing an original image, so as to generate the processed image signals; and an image-recording section to record the image, based on the processed image signals generated by the image-processing section, onto the recording medium; wherein the image-processing section includes: a converting section to convert the image signals to luminance signals and chrominance signals; a Dyadic Wavelet transformer to apply a Dyadic Wavelet transform processing to at least the luminance signals; a suppressing section to suppress a signal intensity of a high-frequency luminance component at a level equal to or lower than P-th level, when the intensity of the high-frequency luminance component conforms to a specific condition; a Dyadic Wavelet inverse-transformer to apply a Dyadic Wavelet inverse-transform processing to transformed and processed signals; and a synthesizing section to synthesize processed luminance signals and the chrominance signals with each other to generate the processed image signals; and wherein the specific condition is made to vary depending on a difference between signal intensities of low-frequency luminance components.

(177) The apparatus of item 175, wherein the Dyadic Wavelet transform processing at a Q-th level (Q>P) is also applied to the luminance signals, and the specific condition fulfills the relationship of $Q_h/P_h \leq A_t$ where, $Q_h$: signal intensity of high-frequency luminance component at Q-th level, $P_h$: signal intensity of high-frequency luminance component at P-th level, $A_t$: first threshold value; and wherein the Dyadic Wavelet inverse-transform processing is conducted from the P-th level, after suppressing the intensity of the high-frequency luminance component at the P-th level, and further, wherein the first threshold value $A_t$ is made to vary depending on a difference between signal intensities of low-frequency luminance components.

(178) The apparatus of item 177, wherein the specific condition further fulfills the relationships of $P_{ch+1}/P_{ch} \leq A_t$, and $1.5 \geq A_t > 1$ where, $P_{ch+1}$: signal intensity of compensated high-frequency luminance component at (P+1)-th level, $P_{ch}$: signal intensity of compensated high-frequency luminance component at P-th level.

(179) The apparatus of item 177, wherein the specific condition further fulfills the relationships of $$P_{chg}/P_{ch} \leq A_t, \text{ and}$$

$$1.5 \geq A_t > 1$$

where, $P_{chg}$: signal intensity of compensated luminance high-frequency component at a level larger than P-th level,
$P_{ch}$: signal intensity of compensated luminance high-frequency component at P-th level; and
wherein $P_h$, representing the signal intensity of the high-frequency luminance component at P-th level, is suppressed to substantially zero, when the specific condition fulfills the relationships of $$P_{ch+1}/P_{ch} \leq B_t, \text{ and}$$

$$1 > B_t \geq 0.7$$

where, $P_{ch+1}$: signal intensity of compensated luminance high-frequency component at (P+1)-th level,
$B_t$: second threshold value.
(180) The apparatus of item 176, wherein the Dyadic Wavelet transform processing at a Q-th level (Q>P) is also applied to the luminance signals, and the specific condition fulfills the relationship of $$P_{hl}/P_{hn} \leq A_t$$

where, $P_{hl}$: signal intensity of high-frequency luminance component at a level larger than each of levels equal to or lower than P-th level,
$P_{hn}$: signal intensity of high-frequency luminance component at each of levels equal to or lower than P-th level,
$A_t$: first threshold value; and
wherein the Dyadic Wavelet inverse-transform processing is conducted from the P-th level, after suppressing the intensity of the high-frequency luminance component at the P-th level, and further, wherein the first threshold value $A_t$ is made to vary depending on a difference between signal intensities of low-frequency luminance components.
(181) The apparatus of item 180, wherein the specific condition further fulfills the relationships of $$P_{chn+1}/P_{chn} \leq A_t, \text{ and}$$

$$2 \geq A_t > 1$$

where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level.
(182) The apparatus of item 180, wherein the specific condition further fulfills the relationships of $$P_{chn+1}/P_{chn} \leq A_t, \text{ and}$$

$$1.5 \geq A_t > 1$$

where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level; and
wherein the signal intensity of high-frequency luminance component at each of levels lower than P-th level is suppressed to substantially zero, when the specific condition fulfills the relationships of $$P_{chn+1}/P_{chn} \leq B_t, \text{ and}$$

$$1 > B_t \geq 0.7$$

where, $B_t$: second threshold value.
(183) The apparatus of item 175, wherein the Dyadic Wavelet transform processing at a P-th level is also applied to the luminance signals, and the specific condition fulfills the relationship of $$P_h/P_{hs} \leq E_t$$

where, $P_h$: signal intensity of high-frequency luminance component at P-th level,
$P_{hs}$: signal intensity of high-frequency luminance component lower than P-th level
$E_t$: third threshold value; and
wherein the Dyadic Wavelet inverse-transform processing is conducted from the P-th level, after suppressing the intensity of the high-frequency luminance component at the P-th level; and further, wherein the first threshold value $E_t$ is made to vary depending on a difference between signal intensities of low-frequency luminance components.
(184) The apparatus of item 183, wherein the specific condition further fulfills the relationships of $$P_{ch}/P_{ch-1} \leq A_t, \text{ and}$$

$$1.5 \geq E_t > 1$$

where, $P_{ch}$: signal intensity of compensated high-frequency luminance component at P-th level,
$P_{ch-1}$: signal intensity of compensated high-frequency luminance component at (P−1)-th level.
(185) The apparatus of item 183, wherein the specific condition further fulfills the relationships of $$P_{ch}/P_{ch-1} \leq E_t, \text{ and}$$

$$1.5 \geq E_t > 1$$

where, $P_{ch}$: signal intensity of compensated high-frequency luminance component at P-th level,
$P_{ch-1}$: signal intensity of compensated high-frequency luminance component at (P−1)-th level; and
wherein $P_h$, representing the signal intensity of the high-frequency luminance component at P-th level, is suppressed to substantially zero, when the specific condition fulfills the relationships of $$P_{ch}/P_{ch-1} \leq F_t, \text{ and}$$

$$1 > F_t \geq 0.7$$

where, $F_t$: fourth threshold value.
(186) The apparatus of item 176, wherein the Dyadic Wavelet transform processing at a P-th level is also applied to the luminance signals; and wherein, when the following relationship is fulfilled with respect to at least a high-frequency luminance component at P-th level $$P_h/P_{hs} \leq E_t$$

where, $P_h$: signal intensity of high-frequency luminance component at P-th level,
$P_{hs}$: signal intensity of high-frequency luminance component lower than P-th level
$E_t$: third threshold value,
the Dyadic Wavelet inverse-transform processing is conducted from the P-th level, after suppressing the signal intensity of the high-frequency luminance component at the P-th level; and, wherein the first threshold value $E_t$ is made to vary depending on a difference between signal intensities of low-frequency luminance components.

(187) The apparatus of item 186, wherein, when the following relationship is fulfilled with respect to at least a high-frequency luminance component at P-th level $P_{ch}/P_{ch-1} \leq E_t$, and $1.2 \geq E_t > 1$ where, $P_{ch}$: signal intensity of compensated high-frequency luminance component at P-th level,
$P_{ch-1}$: signal intensity of compensated high-frequency luminance component at (P−1)-th level
the signal intensity of the high-frequency luminance component at the P-th level is suppressed.

(188) The apparatus of item 186, wherein, when the following relationship is fulfilled with respect to at least a high-frequency luminance component at P-th level $P_{ch}/P_{ch-1} \leq E_t$, and $1.5 \geq E_t > 1$ where, $P_{ch}$: signal intensity of compensated high-frequency luminance component at P-th level,
$P_{ch-1}$: signal intensity of compensated high-frequency luminance component at (P−1)-th level
the signal intensity of the high-frequency luminance component at the P-th level is suppressed; and wherein the signal intensity of high-frequency luminance component at the P-th level is suppressed to substantially zero, when the specific condition fulfills the relationships of $P_{ch}/P_{ch-1} \leq F_t$, and $1 > F_t \geq 0.7$ where, $F_t$: fourth threshold value.

(189) The apparatus of item 175, wherein the specific condition is such that an absolute value of the signal intensity of the high-frequency luminance component at P-th level is equal to or smaller than fifth threshold value $C_t$, which is derived from a standard deviation of the signal intensity of the high-frequency luminance component at P-th level; and wherein the fifth threshold value $C_t$ is made to vary depending on a difference between signal intensities of low-frequency luminance components.

(190) The apparatus of item 175, wherein the specific condition is such that an absolute value of the signal intensity of the high-frequency luminance component at P-th level is equal to or smaller than sixth threshold value $G_t$, which is derived from a standard deviation of the signal intensity of the high-frequency luminance component at the P-th level; and wherein the signal intensity of the high-frequency luminance component at the P-th level, is suppressed to substantially zero.

(191) The apparatus of item 175, wherein the specific condition is such that an absolute value of the signal intensity of the high-frequency luminance component at P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein the signal intensity of the high-frequency luminance component at the P-th level, is suppressed to substantially zero, when the absolute value is equal to or smaller than fifth threshold value $C_t$; and wherein both the fifth threshold value $C_t$ and the seventh threshold value $D_t$ are made to vary depending on a difference between signal intensities of low-frequency luminance components.

(192) The apparatus of item 176, wherein the specific condition is such that an absolute value of the signal intensity of the high-frequency luminance component at each of levels equal to or smaller than P-th level is equal to or smaller than fifth threshold value $C_t$, which is derived from a standard deviation of the signal intensity of the high-frequency luminance component at each of levels equal to or smaller than P-th level; and wherein the fifth threshold value $C_t$ is made to vary depending on a difference between signal intensities of low-frequency luminance components.

(193) The apparatus of item 176, wherein the specific condition is such that an absolute value of the signal intensity of the high-frequency luminance component at each of levels equal to or smaller than P-th level is equal to or smaller than sixth threshold value $G_t$, which is derived from a standard deviation of the signal intensity of the high-frequency luminance component at each of levels equal to or smaller than the P-th level; and wherein the signal intensity of the high-frequency luminance component at each of levels equal to or smaller than the P-th level, is suppressed to substantially zero.

(194) The apparatus of item 176, wherein the specific condition is such that an absolute value of the signal intensity of the high-frequency luminance component at each of levels equal to or smaller than the P-th level is equal to or smaller than seventh threshold value $D_t$, which is equal to or larger than fifth threshold value $C_t$, and both fifth threshold value $C_t$ and seventh threshold value $D_t$ are derived from a standard deviation of the signal intensity of the high-frequency luminance component at P-th level; and wherein the signal intensity of the high-frequency luminance component at each of levels equal to or smaller than the P-th level, is suppressed to substantially zero, when the absolute value is equal to or smaller than fifth threshold value $C_t$; and wherein both the fifth threshold value $C_t$ and the seventh threshold value $D_t$ are made to vary depending on a difference between signal intensities of low-frequency luminance components.

(195) The apparatus described in anyone of items 175-194, wherein a sharpness enhancement processing is performed after completing a suppression processing for the signal intensity of the high-frequency luminance component under the specific condition.

(196) The apparatus of item 195, wherein the sharpness enhancement processing is conducted by enhancing signal intensity of high-frequency luminance components, which do not fulfill the specific condition, at a level at which the suppression processing is conducted.

(197) The apparatus described in anyone of items 175-196, wherein a suppression processing for high-frequency component of the chrominance signals is performed.

(198) The apparatus described in anyone of items 175-197, wherein the specific condition for suppressing the signal intensity of the high-frequency luminance component is made to vary depending on characteristics of a low-frequency component of the chrominance signals.

(199) The apparatus described in anyone of items 151-198, wherein the image signals, representing the original image, are acquired by scanning a silver-halide film.

(200) The apparatus described in anyone of items 151-199, wherein slight noises are added to the processed image signals.

In the present invention, conversion of image signals into luminance signals and chrominance signals means conversion of the three-color intensity signals (R, G and B) of the original image, for example, into the YIQ base, HSV base and YUV base well known among those skilled in the art, or XYZ base of the CIE1931 color system and L*a*b* base or L*u*v* base recommended by CIE1976 in conformity to such standards as sRGB and NTSC. For separation between luminance signals and chrominance signals, a sufficient effect can be gained even if the transform is not complete from the viewpoint of the science of color. For example, the embodiment includes the case of conversion wherein the average value of RGB is taken as luminance signals and two axes orthogonal to this axis are used as chrominance signals, as disclosed in the embodiment of Tokkaisho 1988-26783.

FIG. 9 shows the concept of Dyadic Wavelet conversion processing according to the present invention. Dyadic Wavelet transform of level N is applied to input signals $S_0$. Signal intensity suppression processing is applied to the resultant high and low frequency band components, based on the specific condition to be described later. After that, the Dyadic Wavelet transform of level N is applied to generate output signals. In FIG. 9, LPF denotes a low-pass filter and HPF a high-pass filter. LPF' denotes a low-pass filter for inverse transform and HPF' a high-pass for inverse transform filter. These filter coefficients are determined as appropriate in conformity to the wavelet function. (See Non-Patent Documents 5, 6 and 7). Further, the LPFx, HPFx, LPF'x, HPF' x denote processing in the direction of "x", whereas LPFy, HPFy, LPF' y and HPF' y denote processing in the direction of "y". In the Dyadic Wavelet the filter coefficient is different on each level. The filter coefficient on level n to be used is the one gained by inserting $2^{n-1}-1$ zeros between coefficients of level 1. (See Non-Patent Documents 5, 6 and 7).

The image-processing method, the image-processing apparatus, the image-processing program and the image-recording apparatus, according to the first invention of the present invention, can be attained by the invention described in anyone of items 1, 51, 101 and 151. As the result of studies made by the present inventors, it has been revealed that the level, where a greatest amount of granular noise on the image is observed, differs according to the type of an input image. Accordingly, for a given level according to the present invention, it is important to select the level where a greatest amount of granular noise on the image is observed. It is preferable to determine it in conformity to the type of the input image (DSC resolution, ISO sensitivity of silver halide film, scanner resolution, etc.). For example, when the silver halide film having a size of 135 mm on the order of ISO 200 through 400 is scanned at a resolution of 40 through 70 pixels/mm, it is preferred to adopt P=2. In the case of a silver halide film, a given level P can be determined, for example, through automatic reading of ISO sensitivity from a latent image barcode. In the case of DSC, it can be determined by referring to the manufacturer's name, model name and various types of information related to image resolution contained in the existing tag information or the like specified in various types of general-purpose image format represented by JPEG, TIFF and Exif. It can also be determined by manual inputting of an operator. However, the present invention is not restricted to any one of these methods. The amount of suppression of signal intensity is preferred to be about ⅔ or less. It is more preferred to be ½ or less. Without being constant, the amount of suppression can vary in response to the relationship between signal intensity and specific condition. The present invention provides a means of image processing that is capable of suppressing the mottled granular noise contained in color image signals, wherein shadow on the bridge of the nose or around the eyes is maintained, without noise similar to color misregistration and a smooth expressionless face wearing makeup being produced, and without false color contour appearing close to the edge or false color spot visible on the flat portion.

The image-processing method, the image-processing apparatus, the image-processing program and the image-recording apparatus, according to the second invention, can be attained by the invention described in anyone of items 2, 52, 102 and 152. In FIG. 9, input signal $S_0$ is assumed as a luminance signal. When high frequency band components $Wx_p, W(x_{p-x}) \ldots$ and $Wy_p, W(y_{p-x}) \ldots$ on each level equal to or below a given level P ($2 \leq P \leq N$) satisfy a certain condition, signal intensity on each level is suppressed. Then inverse transform is applied. A given level P is determined by the type of an input image, similarly to the first invention. When the level with the greatest amount of noise has a frequency spanning between levels 2 and 3, for example, P=3 is adopted, without processing applied on level 1. It is preferred that suppression processing under specific conditions be applied to luminance high frequency band components ($Wx_2, Wx_3, Wy_2, Wy_3$) on levels 3 and 2. When there are multiple types of noise having different frequencies, for example, when shot noise, etc. appears on level 1 with a less expensive DSC and mottle, etc. due to image interpolation has turned into a frequency intermediate between levels 2 and 3, P=3 is adopted. In this case, it is preferred that suppression processing be applied to all the luminance high frequency band components on levels 1, 2 and 3. A given level P and the level above level P to which processing is applied may be determined by automatic reading of ISO sensitivity from a latent image barcode in the case of a silver halide film, as described above. In the case of DSC, it can be determined by referring to the manufacturer's name, model name and various types of information related to image resolution contained in the existing tag information or the like specified in various types of general-purpose image format represented by JPEG, TIFF and Exif. It can also be determined by manual inputting of an operator. However, the present invention is not restricted to any one of these methods. The embodiment of the present invention provides a means of applying intended image processing even if granular noise to be suppressed on the image is present on multiple different levels.

The image-processing method, the image-processing apparatus, the image-processing program and the image-recording apparatus, according to the third invention, can be attained by the invention described in anyone of items 3, 53, 103 and 153. When P=2, for example, comparison is made between signal intensity of each pixel of the $Wx_2$ and that of the pixel at the position corresponding to $Wx_2$ of $Wx_Q$ (Q>2). If the conditions of not exceeding the threshold value are satisfied, the signal intensity of the pixel of $Wx_2$ is suppressed. This procedure also applies to the case of $Wy_2$.

The image-processing method, the image-processing apparatus, the image-processing program and the image-recording apparatus, according to the fourth invention, can be attained by the invention described in anyone of items 4, 54, 104 and 154. The compensated high frequency band components are obtained by multiplying the high frequency band component by the coefficient $\gamma_i$ determined in response to level i of wavelet transform, as described above. In the case of P=2, comparison is made between signal intensity *γ2 of each pixel of the $Wx_2$ and that *γ3 of the pixel at the position corresponding to $Wx_2$ of $Wx_3$. If the conditions of not exceeding the threshold value A are satisfied, the signal intensity of the pixel of $Wx_2$ is suppressed. This procedure also applies to the case of $Wy_2$. As a result of studies made by the present inventors, it has been revealed that, when the threshold value A is set at a value greater than 1 without exceeding 1.2, the majority of granular noise on the image can be removed. If the threshold value A is set at a value greater than 1.2, the image will be blurred. This must be avoided. It is preferred that this value be set in the range from 1.05 through 1.1. In the present invention, comparison is made between the compensated high frequency band components on the P-th level and P+1-th level. Generation of compensated high frequency band components is not the object of the present invention. To put it another way, it is possible to make comparison in terms of luminance high frequency band components, by multiplying threshold value A by compensation value γ. It is sufficient if arithmetic comparison as the major objective of the present invention is valid. In the present invention, it is sufficient that Dyadic Wavelet transform is performed up to the level P+1.

The image-processing method, the image-processing apparatus, the image-processing program and the image-recording apparatus, according to the fifth invention, can be attained by the invention described in anyone of items 5, 55, 105 and 155. As a result of studies made by the present inventors, it has been revealed that the embodiment of the present invention removes almost all granular noise on the image. Since it has been shown that, if the value is threshold value B or less, an image noise occurs, noise is completely eliminated by setting the signal intensity at practically zero. If the value does not exceed threshold value A (and not less than threshold value B), an image noise may occur, but an image noise is very likely to occur, but it could be an image factor other than noise. Accordingly, it is desirable to suppress signal intensity without reducing it to zero. Further, the possibility of producing an image noise is higher when located between threshold values A and B, being closer to threshold value B. Accordingly, it is preferred to increase the level of suppression as it is closer to threshold value B. Generally, processing of suppressing output signals at a value not exceeding a certain threshold value with respect to input signals is referred to as "coring". Details of coring are given in the Tokugan 2001-329205. In the present invention, processing of non-linear coring is most preferable.

The image-processing method, the image-processing apparatus, the image-processing program and the image-recording apparatus, according to the sixth invention, can be attained by the invention described in anyone of items 6, 56, 106 and 156. Example, when P=3 and one wishes to apply signal processing on the levels 3 and 2, comparison is made between signal intensity of each pixel of the $Wx_3$ and that of the pixel at the position corresponding to $Wx_3$ of $Wx_Q$ (Q>3). If the conditions of not exceeding the threshold value are satisfied, the signal intensity of the pixel of $Wx_3$ is suppressed. Comparison is made between signal intensity of each pixel of the $Wx_2$ and that of the pixel at the position corresponding to $Wx_2$ of $Wx_{Q1}$ ($Q \geq Q_1 > 2$). If the conditions of not exceeding the threshold value are satisfied, the signal intensity of the pixel of $Wx_2$ is suppressed. This procedure also applies to the case of $Wy_3$ and $Wy_2$. Here the threshold value for each level is set independently, but the same threshold value can be used. The signal intensity can be suppressed in a constant volume or at a constant ratio, but the volume and ratio of suppression can be increased as the value is separated from the threshold value in the direction of getting smaller.

The image-processing method, the image-processing apparatus, the image-processing program and the image-recording apparatus, according to the seventh invention, can be attained by the invention described in anyone of items 7, 57, 107 and 157. Here compensated high frequency band component is obtained by multiplying the high frequency band component by the coefficient $γ_i$ determined in response to the level i of wavelet transform as described above. For example, when P=3 and one wishes to apply signal processing on the levels 3 and 1, comparison is made between signal intensity *γ3 of each pixel of the $Wx_3$ and signal intensity *γ4 of the pixel at the position corresponding to $Wx_3$ of $Wx_4$. If the conditions of not exceeding the threshold value A are satisfied, the signal intensity of the pixel of $Wx_3$ is suppressed. Comparison is made between signal intensity *γ1 of each pixel of the $Wx_1$ and signal intensity *γ2 of the pixel at the position corresponding to $Wx_1$ of $Wx_2$. If the conditions of not exceeding the threshold value A are satisfied, the signal intensity of the pixel of $Wx_1$ is suppressed. This procedure also applies to the case of $Wy_1$ and $Wy_3$. As a result of studies made by the present inventors, it has been revealed that the embodiment of the present invention removes almost all granular noise on the image, even if granular noise on the screen to be suppressed is present on multiple different levels. If the threshold value A is set at a value greater than 1.2, the image will be blurred. This must be avoided. It is preferred that this value be set in the range from 1.05 through 1.1. Here the threshold value for each level is greater than 1 without exceeding 1.2 and is set independently, but the same threshold value can be used. In the present invention, comparison is made by using compensated luminance high frequency band component on each level, but generation of compensated high frequency band components is not the object of the present invention. To put it another way, it is possible to make comparison in terms of luminance high frequency band components, by multiplying threshold value A by compensation value γ. It is sufficient if arithmetic comparison as the major objective of the present invention is valid. In the present invention, it is sufficient that Dyadic Wavelet transform is performed up to the level P+1.

The image-processing method, the image-processing apparatus, the image-processing program and the image-recording apparatus, according to the eighth invention, can be attained by the invention described in anyone of items 8, 58, 108 and 158. As a result of studies made by the present inventors, it has been revealed that the embodiment of the present invention removes almost all granular noise on the image even if granular noise to be suppressed on the screen is present on multiple different levels. It has been made clear that, when the value does not exceed the threshold value, an image noise occurs. Accordingly, noise is completely eliminated by setting the signal intensity at practically zero. If the value does not exceed threshold value A (and not less than threshold value B), an image noise is very likely to occur, but it could be an image factor other than noise. Accordingly, it is desirable to suppress signal intensity without reducing it to zero. Further, the possibility of producing an image noise is higher when located between threshold values A and B, being closer to threshold value B. Accordingly, it is preferred to increase the level of suppression as it is closer to threshold value B. Here the threshold values A and B for each level are set independently, but the same threshold value can be used.

The image-processing method, the image-processing apparatus, the image-processing program and the image-recording apparatus, according to the ninth invention, can be attained by the invention described in anyone of items 9, 59, 109 and 159. For example, when P=3 and comparison is made between signal intensity of each pixel of the $Wx_3$ and signal intensity $*\gamma 3$ of the pixel at the position corresponding to $Wx_3$ of $Wx_R$ (where R=1 or 2). When the conditions of not exceeding the threshold value A are satisfied, the signal intensity of the pixel of $Wx_3$ is suppressed. This procedure also applies to the case of $Wy_3$. The present invention differs from the third invention in that comparison of the luminance high frequency band component on the level P is made with that on the level lower than P or with that on the level higher. As a result of studies made by the present inventors, it has been revealed that the same effect can be obtained from them in removing image noise. When R=1 and $WX_R$ as described above, however, the effect is slightly inferior, so $P \geq 3$ and $P \geq 2$ are more preferable. The signal intensity can be suppressed in a constant volume or at a constant ratio, but the volume and ratio of suppression can be increased as the value is separated from the threshold value in the direction of getting smaller According to the present invention, when signal processing on level P is performed, it is sufficient that the Dyadic Wavelet transform is performed up to level P. Therefore, processing speed is higher than that when the Dyadic Wavelet transform is performed up to level Q (where Q>P). and this is more preferred.

The image-processing method, the image-processing apparatus, the image-processing program and the image-recording apparatus, according to the tenth invention, can be attained by the invention described in anyone of items 10, 60, 110 and 160. Here compensated high frequency band component is obtained by multiplying the high frequency band component by the coefficient $\gamma_i$ determined in response to the level i of wavelet transform as described above. For example, when P=3, comparison is made between signal intensity $*\gamma 3$ of each pixel of the $Wx_3$ and signal intensity $*\gamma 2$ of the pixel at the position corresponding to $Wx_3$ of $Wx_2$. If the conditions of not exceeding the threshold value E are satisfied, the signal intensity of the pixel of $Wx_3$ is suppressed. This procedure also applies to the case of $Wy_3$. As a result of studies made by the present inventors, it has been revealed that almost all granular noise on the image can be eliminated when the threshold value E is set at a value greater than 1 without exceeding 1.2. If the threshold value E is set at a value greater than 1.2, the image will be blurred. This must be avoided. It is preferred that this value be set in the range from 1.05 through 1.1. In the present invention, comparison is made of compensated luminance high frequency band component on levels P and P−1, but generation of compensated high frequency band components is not the object of the present invention. To put it another way, it is possible to make comparison in terms of luminance high frequency band components, by multiplying threshold value A by compensation value γ. It is sufficient if arithmetic comparison as the major objective of the present invention is valid. The present invention differs from the fourth invention in that comparison of the luminance high frequency band component on the level P is made with that on the level P−1 or with that on the level P+1. As a result of studies made by the present inventors, it has been revealed that the same effect can be obtained from them in removing image noise. When the first level is used for this comparison, namely, in the case of P=2, however, the effect is slightly inferior, so $P \geq 3$ is more preferable. According to the present invention, when signal processing on level P is performed, it is sufficient that the Dyadic Wavelet transform is performed up to level P. Therefore, processing speed is higher than that when the Dyadic Wavelet transform is performed up to level Q (where Q>P). and this is more preferred.

The image-processing method, the image-processing apparatus, the image-processing program and the image-recording apparatus, according to the eleventh invention, can be attained by the invention described in anyone of items 11, 61, 111 and 161. As a result of studies made by the present inventors, it has been revealed that the embodiment of the present invention removes almost all granular noise on the image. Since it has been made clear that, when the value does not exceed the threshold value E, it has been shown clearly that an image noise occurs, noise is completely eliminated by setting the signal intensity at practically zero. If the value does not exceed threshold value A (and not less than threshold value B), an image noise is very likely to occur, but it could be an image factor other than noise. Accordingly, it is desirable to suppress signal intensity without reducing it to zero. Further, the possibility of producing an image noise is higher when located between threshold values E and F, being closer to threshold value F. Therefore, it is preferred to increase the level of suppression as it is closer to threshold value F. The present invention differs from the fifth invention in that comparison of the luminance high frequency band component on the level P is made with that on the level P−1 or with that on the level P+1. As a result of studies made by the present inventors, it has been revealed that the same effect can be obtained from them in removing image noise. When the first level is used for this comparison, namely, in the case of P=2, however, the effect is slightly inferior, so $P \geq 3$ is more preferable. According to the present invention, when signal processing on level P is performed, it is sufficient that the Dyadic Wavelet transform is performed up to level P. Therefore, processing speed is higher than that when the Dyadic Wavelet transform is performed up to level Q (where Q>P), and this is more preferred.

The image-processing method, the image-processing apparatus, the image-processing program and the image-recording apparatus, according to the twelfth invention, can be attained by the invention described in anyone of items 12, 62, 112 and 162. For example, when P=3 and one wishes to apply signal processing on the levels 3 and 2, comparison is made between signal intensity of each pixel of the $Wx_3$ and signal intensity of the pixel at the position corresponding to $Wx_3$ of $Wx_R$ (where R=1 or 2). If the conditions of not exceeding the threshold value are satisfied, the signal intensity of the pixel of $Wx_3$ is suppressed. This procedure also applies to the case of $Wy_3$. For $Wx_2$ and $Wy_2$, when comparison is made between $Wx_2$ and $Wy_2$, and the conditions of not exceeding the threshold value are satisfied, the signal intensity of $Wx_2$ and $Wy_2$ may be suppressed. When comparison is made between $Wx_3$ and $Wy_3$, and the conditions of not exceeding the threshold value are satisfied, the signal intensity of $Wx_2$ and $Wy_2$ may be suppressed. Both methods can be used in combination. (However, if one wishes to apply signal processing on level 1, comparison is restricted that with the level higher than level 1, since there is no level lower than level). The present invention differs from the sixth invention in that comparison of the luminance high frequency band component on the level P is made with that on the level P−1 or with that on the level P+1. There is no particular restriction on the level lower than P. As a result of studies made by the present inventors, it has been revealed that the same effect can be obtained from them in removing image noise. The signal intensity can be suppressed in a constant volume or at a constant ratio, but the volume and ratio of suppression can be increased as the value is separated from the threshold value in the direction of getting smaller. According to the present invention, when signal processing on the level lower than level P is performed, it is sufficient that the Dyadic Wavelet transform is performed up to level P. Therefore, processing speed is higher than that when the Dyadic Wavelet transform is performed up to level Q (where Q>P), and this is more preferred.

The image-processing method, the image-processing apparatus, the image-processing program and the image-recording apparatus, according to the thirteenth invention, can be attained by the invention described in anyone of items 13, 63, 113 and 163. Here compensated high frequency band component is obtained by multiplying the high frequency band component by the coefficient $\gamma_i$ determined in response to the level i of wavelet transform as described above. For example, when P=3 and one wishes to apply signal processing on the levels 3 and 2, comparison is made between signal intensity $*\gamma 3$ of each pixel of the $Wx_3$ and signal intensity $*\gamma 2$ of the pixel at the position corresponding to $Wx_3$ of $Wx_2$. If the conditions of not exceeding the threshold value E are satisfied, the signal intensity of the pixel of $Wx_3$ is suppressed. This procedure also applies to the case of $Wy_3$. For $Wx_2$ and $Wy_2$, when comparison is made between $Wx_1$ and $Wy_1$, and the conditions of not exceeding the threshold value are satisfied, the signal intensity of $Wx_2$ and $Wy_2$ may be suppressed. When comparison is made between $Wx_3$ and $Wy_3$, and the conditions of not exceeding the threshold value are satisfied, the signal intensity of $Wx_2$ and $Wy_2$ may be suppressed. Both methods can be used in combination. The present invention differs from the sixth invention in that comparison of the luminance high frequency band component on the level P is made with that on the level P−1 or with that on the level P+1. There is no particular restriction on the level lower than P. As a result of studies made by the present inventors, it has been revealed that the same effect can be obtained from them in removing image noise. According to the present invention, when signal processing on the level lower than level P is performed, it is sufficient that the Dyadic Wavelet transform is performed up to level P. Therefore, processing speed is higher than that when the Dyadic Wavelet transform is performed up to level Q (where Q>P), and this is more preferred. As a result of studies made by the present inventors, it has been revealed that the embodiment of the present invention removes almost all granular noise on the image even if granular noise to be suppressed on the screen is present on multiple different levels. If the threshold value E is set at a value greater than 1.2, the image will be blurred. This must be avoided. It is preferred that this value be set in the range from 1.05 through 1.1. In the present invention, comparison is made of compensated luminance high frequency band component on each level, but generation of compensated high frequency band components is not the object of the present invention. To put it another way, it is possible to make comparison in terms of luminance high frequency band components, by multiplying threshold value A by compensation value γ. It is sufficient if arithmetic comparison as the major objective of the present invention is valid.

The image-processing method, the image-processing apparatus, the image-processing program and the image-recording apparatus, according to the fourteenth invention, can be attained by the invention described in anyone of items 14, 64, 114 and 164. The fourteenth invention differs from the eighth invention in that comparison of the luminance high frequency band component on the level P is made with that on the level P−1 or with that on the level P+1. There is no particular restriction on the level lower than P. As a result of studies made by the present inventors, it has been revealed that the same effect can be obtained from them in removing image noise. According to the present invention, when signal processing on the level lower than level P is performed, it is sufficient that the Dyadic Wavelet transform is performed up to level P. Therefore, processing speed is higher than that when the Dyadic Wavelet transform is performed up to level Q (where Q>P), and this is more preferred. As a result of studies made by the present inventors, it has been revealed that the embodiment of the present invention removes almost all granular noise on the image even if granular noise to be suppressed on the screen is present on multiple different levels. Since it has been made clear that, when the value does not exceed the threshold value F, it has been shown clearly that an image noise occurs, noise is completely eliminated by setting the signal intensity at practically zero. If the value does not exceed threshold value E (and not less than threshold value F), an image noise is very likely to occur, but it could be an image factor other than noise. Accordingly, it is desirable to suppress signal intensity without reducing it to zero. Further, the possibility of producing an image noise is higher when located between threshold values E and F, being closer to threshold value F. Accordingly, it is preferred to increase the level of suppression as it is closer to threshold value F.

The image-processing method, the image-processing apparatus, the image-processing program and the image-recording apparatus, according to the fifteenth invention, can be attained by the invention described in anyone of items 15, 65, 115 and 165. For example, when P=2, the standard deviation of signal intensity is computed from all pixels of $Wx_2$, and the threshold value C is determined by the standard deviation value. The signal intensity of each pixel of $Wx_2$ is compared with the threshold value C. If the condition of not exceeding the threshold value is satisfied, the signal intensity of the pixel of $Wx_2$ is suppressed. This procedure also applies to the case of $Wy_2$. As a result of studies made by the present inventors, it has been revealed that, in the actual color image, threshold value C is preferred to have a standard deviation of approximately *0.9 through *1.3, more preferably *1.0 through *1.2. It this value is *1.3 or more, a blurred image will appear, and this must be avoided. The signal intensity can be suppressed in a constant volume or at a constant ratio, but the volume and ratio of suppression can be increased as the value is separated from the threshold value in the direction of getting smaller. According to the fifteenth invention, it has been made clear that the fourth invention and tenth invention provide almost the same effects. In the present invention, the threshold value C is determined using the standard deviation. For example, the average value of the signal intensities, median or mode may be used to determine the threshold value. However, as a result of studies on various types of image scenes, it has been shown that use of the standard deviation provides the best result for the purpose of the present invention.

The image-processing method, the image-processing apparatus, the image-processing program and the image-recording apparatus, according to the sixteenth invention, can be attained by the invention described in anyone of items 16, 66, 116 and 166. As a result of studies on various types of image scenes by the present inventors, it has been shown that threshold value G is preferred to have a standard deviation of approximately *0.7 through *1.1, more preferably, *0.8 through *1.0. According to the sixteenth invention, it has been made clear that the fourth invention and tenth invention provide almost the same effects. In the present invention, the threshold value C is determined using the standard deviation C. For example, the average value of the signal intensities, median or mode may be used to determine the threshold value. However, as a result of studies on various types of image scenes, it has been shown that use of the standard deviation provides the best result for the purpose of the present invention.

The image-processing method, the image-processing apparatus, the image-processing program and the image-recording apparatus, according to the seventeenth invention, can be attained by the invention described in anyone of items 17, 67, 117 and 167. As a result of studies on various types of image scenes by the present inventors, it has been shown that threshold value C is preferred to have a standard deviation of approximately *0.5 through *0.8, and threshold value D is preferred to be have a standard deviation of approximately *1.1 through *1.4. When the value does not exceed the threshold value C, it has been shown clearly that an image noise occurs. So noise is completely eliminated by setting the signal intensity at practically zero. If the value does not exceed threshold value D (and not less than threshold value C), an image noise is very likely to occur, but it could be an image factor other than noise. Accordingly, it is desirable to suppress signal intensity without reducing it to zero. Further, the possibility of producing an image noise is higher when located between threshold values C and D, being closer to threshold value C. Therefore, it is preferred to increase the level of suppression as it is closer to threshold value B. According to the seventeenth invention, it has been made clear that the fifth invention and eleventh invention provide almost the same effects. In the present invention, the threshold value C is determined using the standard deviation. For example, the average value of the signal intensities, median or mode may be used to determine the threshold value. However, as a result of studies on various types of image scenes, it has been shown that use of the standard deviation provides the best result for the purpose of the present invention.

The image-processing method, the image-processing apparatus, the image-processing program and the image-recording apparatus, according to the eighteenth invention, can be attained by the invention described in anyone of items 18, 68, 118 and 168. For example, when P=3 and one wishes to apply signal processing on the level 2, the standard deviation of signal intensity is calculated from all pixels of $Wx_3$, and threshold value C is determined by the standard deviation. Comparison is made between signal intensity of each pixel of the $Wx_3$ and threshold value C. If the conditions of not exceeding the threshold value are satisfied, the signal intensity of the pixel of $Wx_3$ is suppressed. This procedure also applies to the case of $Wy_3$, $Wx_2$ and $Wy_2$. As a result of studies made by the present inventors, it has been revealed that, in the actual color image, threshold value C is preferred to have a standard deviation of approximately *0.9 through *1.3, more preferably *1.0 through *1.2. If this value is *1.3 or more, a blurred image will appear, and this must be avoided. Here the threshold value for each level is set independently, but the same threshold value may be used. The signal intensity can be suppressed in a constant volume or at a constant ratio, but the volume and ratio of suppression can be increased as the value is separated from the threshold value in the direction of getting smaller. According to the embodiment of the eighteenth invention, it has been made clear that the seventh invention and thirteenth invention provide almost the same effects. In the present invention, the threshold value C is determined using the standard deviation. For example, the average value of the signal intensities, median or mode may be used to determine the threshold value. However, as a result of studies on various types of image scenes, it has been shown that use of the standard deviation provides the best result for the purpose of the present invention.

The image-processing method, the image-processing apparatus, the image-processing program and the image-recording apparatus, according to the nineteenth invention, can be attained by the invention described in anyone of items 19, 69, 119 and 169. As a result of studies on various types of color image scenes by the present inventors, it has been shown that threshold value G is preferred to have a standard deviation of approximately *0.7 through *1.1, more preferably, *0.8 through *1.0. Here the threshold value for each level is set independently, but the same threshold value may be used. According to the embodiment of the nineteenth invention, it has been made clear that the seventh invention and thirteenth invention provide almost the same effects. In the present invention, the threshold value C is determined using the standard deviation. For example, the average value of the signal intensities, median or mode may be used to determine the threshold value. However, as a result of studies on various types of image scenes, it has been shown that use of the standard deviation provides the best result for the purpose of the present invention.

The image-processing method, the image-processing apparatus, the image-processing program and the image-recording apparatus, according to the twentieth invention, can be attained by the invention described in anyone of items 20, 70, 120 and 170. The image-processing method, the image-processing apparatus, the image-processing program and the image-recording apparatus, according to the tenth invention, can be attained by the invention described in anyone of items 10, 60, 110 and 160. As a result of studies on various types of color image scenes by the present inventors, it has been shown that threshold value C is preferred to have a standard deviation of approximately *0.5 through *0.8, and threshold value D is preferred to have a standard deviation of approximately *1.1 through *1.4. When the value does not exceed the threshold value C, it has been shown clearly that an image noise occurs. So noise is completely eliminated by setting the signal intensity at practically zero. If the value does not exceed threshold value D (and not less than threshold value C), an image noise is very likely to occur, but it could be an image factor other than noise. Accordingly, it is desirable to suppress signal intensity without reducing it to zero. Further, the possibility of producing an image noise is higher when located between threshold values C and D, being closer to threshold value C. Therefore, it is preferred to increase the level of suppression as it is closer to threshold value B. Here the threshold value for each level is set independently, but the same threshold value may be used. According to the embodiment of the twentieth invention, it has been made clear that the eighth and fourteenth invention provide almost the same effects. In the present invention, the threshold value C is determined using the standard deviation. For example, the average value of the signal intensities, median or mode may be used to determine the threshold value. However, as a result of studies on various types of image scenes, it has been shown that use of the standard deviation provides the best result for the purpose of the present invention.

The image-processing method, the image-processing apparatus, the image-processing program and the image-recording apparatus, according to the twenty-first invention, can be attained by the invention described in anyone of items 21, 71, 121 and 171. It is possible to apply the method of extracting the contour component and add it using a high-pass filter such as known Laplacian filter, Sobel filter and Huckel filter, or the sharpness enhancement method using an un-sharp mask. Detailed explanation of such known sharpness enhancement method is given in "Practical image processing learnt in C-language" (by M. Inoue, N. Yagi, M Hayashi, H. Nakasu, K. Mitani, M. Okui, Ohm Publishing Co., Ltd.), for example. A preferred method for sharpness enhancement processing according to the present invention is to increase the signal intensity of luminance high frequency band component, thereby re-configuring luminance signals using Dyadic Wavelet inverse transform. As a result of studies made by the present inventors, it has been shown that a signal intensity of approximately *1.2 through *1.7 is preferable as the level of increase. It is also preferred to increase the signal intensity of the luminance high frequency band components of the level where suppression processing has been applied, but a signal intensity of approximately *1.1 through *1.3 is preferable as the level of increase.

The image-processing method, the image-processing apparatus, the image-processing program and the image-recording apparatus, according to the twenty-second invention, can be attained by the invention described in anyone of items 22, 72, 122 and 172. As a result of studies made by the present inventors, it has been shown that approximately *1.2 through *1.7 is preferable as the level of increase. The embodiment of the twenty-second invention allows sharpness to be enhanced without the granular noise being deteriorated.

The image-processing method, the image-processing apparatus, the image-processing program and the image-recording apparatus, according to the twenty-third invention, can be attained by the invention described in anyone of items 23, 73, 123 and 173. If an original image has a big color misalignment, misalignment cannot be corrected by mere suppression of luminance high frequency band components in same cases. As a result of studies made by the present inventors, it has been shown that color misalignment can be eliminated by suppression of the high frequency band components of chrominance signals. To extract the high frequency band components of chrominance signals, it is possible to use the above-mentioned known methods of high-pass filter, orthogonal wavelet and biorthogonal wavelet. The most preferred method for the present invention is to apply Dyadic Wavelet transform to luminance signals to generate the high frequency band components of chrominance signals, and to apply suppression after that.

The image-processing method, the image-processing apparatus, the image-processing program and the image-recording apparatus, according to the 24th invention, can be attained by the invention described in anyone of items 24, 74, 124 and 174. In a specific subject such as the human face, skin or blue sky, granular noise is conspicuous. This requires an increase in the amount of suppression of luminance high frequency band components wherever possible. This problem is solved by an embodiment of the present invention in such a way that, when colors of the luminance high frequency band components represent the characteristics of specific areas of human skin and sky color, the specific condition for suppressing the luminance high frequency band components of the pixel at the corresponding position is changed, thereby eliminating a greater amount of granular noise. The luminance low frequency band components can be obtained by using the known method, but the method of using the Dyadic Wavelet transform is preferred in the present invention.

The image-processing method, the image-processing apparatus, the image-processing program and the image-recording apparatus, according to the 25th invention, can be attained by the invention described in anyone of items 25, 75, 125 and 175. In the general image, granular noise is more conspicuous on the darker portion of the image (portion of lower luminance). This requires the removal of the luminance high frequency band components from the darker portion of the image to the greatest extent possible. The present invention solves this problem in such a way that the specific condition for suppressing the luminance high frequency band components of the pixel at the corresponding position is changed, in conformity to the difference in the signal intensity of luminance low frequency band components as an embodiment of the present invention, thereby eliminating a greater amount of granular noise. Further, the present invention improves image processing technique of suppressing the mottled granular noise contained in color image signals, wherein shadow on the face and around the bridge of the nose or the eyes is maintained, without noise similar to color misregistration and a smooth expressionless face wearing makeup being produced, and without false color contour appearing close to the edge or false color spot visible on the flat portion—this is an object of the present invention. For a given level, it is important to select the level where a greatest amount of granular noise on the image is observed. It is preferable to determine it in conformity to the type of the input image (DSC resolution, ISO sensitivity of silver halide film, scanner resolution, etc.). For example, when the silver halide film having a size of 135 mm on the order of ISO 200 through 400 is scanned at a resolution of 40 through 70 pixels/mm, it is preferred to adopt P=2. In the case of a silver halide film, a given level P can be determined, for example, through automatic reading of ISO sensitivity from a latent image barcode. In the case of DSC, it can be determined by referring to the manufacturer's name, model name and various types of information related to image resolution contained in the existing tag information or the like specified in various types of general-purpose image format represented by JPEG, TIFF and Exif. It can also be determined by manual inputting of an operator. However, the present invention is not restricted to any one of these methods. The low frequency band components ($S_1$ through $S_n$ in FIG. 9) obtained by applying Dyadic Wavelet transform to luminance signals in the present invention can be used as the luminance low frequency band components used in the present invention. There is no restriction on the level to be used. Almost the same effect can be obtained by using low frequency band components of any level for high frequency band components on the level P. However, use of the same level is preferred.

The image-processing methods, the image-processing apparatus, the image-processing programs and the image-recording apparatus, according to the 26th -48th inventions, can be attained by the invention described in items 26-48, 76-98, 126-148 and 176-198, and make it possible to derive further desirable effects from the 2nd-24th inventions (described in items 2-24, 52-74, 102-124 and 152-174).

With respect to the 1st-48th inventions (described in items 1-48, 51-98, 101-148 and 151-198), there is no restriction on the sequence of the process of performing the Dyadic Wavelet up to a predetermined level and the process of applying signal processing to the luminance high frequency band components of a specific level. However, it is preferred to apply signal processing to the luminance high frequency band components on a specific level after applying Dyadic Wavelet transform up to the required level.

The image-processing method, the image-processing apparatus, the image-processing program and the image-recording apparatus, according to the 49th invention, can be attained by the invention described in anyone of items 49, 99, 149 and 199. A silver halide film is defined as a color negative film or color reversal film. Color image of the color negative film or color reversal film is photoelectrically converted into transmitted light intensity signals through a light receiving element such as a line CCD sensor or area CCD sensor by the known film scanning apparatus. The obtained transmitted light intensity signals are amplified by an amplifier and are converted into digital signals by an analog-to-digital converter. Then signals are then subjected to compensation for noise elimination inherent to the light receiving element such as dark-time fixed pattern noise compensation and shading compensation, and are further subjected to calibration processing of compensating for the individual difference of the apparatus caused by the variations in characteristics of optical parts such as a light receiving sensor, color decomposition filter, light source lamp and lamp. Transmitted light intensity signals having been compensated are then converted into density signals by logarithmic transform, etc. These density signals are fed to the processing condition evaluation section, where processing conditions for image processing are calculated. Based on these processing conditions, the density signals are converted into image signals having been subjected to color balance and gradation compensation and negative/positive reversion. The image signals, having been subjected to color balance and gradation compensation and negative/positive reversion and created in this process, are preferred to be used as image signals representing the original image of the present invention. The process of obtaining image signals representing the original image from the silver halide film and the process of image processing according to the present invention can be carried out in one and the same apparatus having both functions, Alternatively, they can be carried out in separate apparatuses. When two processes are carried out in separate apparatuses. The image signal representing the original image is sent to the apparatus implementing the present invention, through a communications line or medium such as CD-ROM. In this case the data can be transferred according to the known image file format. However, it is preferred that a compression or reversible compression format be used, and the number of quantized bits be greater than that of the quantized bits of the image file to be outputted by the apparatus for implementing the present inventors.

The image-processing method, the image-processing apparatus, the image-processing program and the image-recording apparatus, according to the 50th invention, can be attained by the invention described in anyone of items 50, 100, 150 and 200. Some image viewers have a preference for a half-tone photographic image. To meet this preference, the method of adding week noise to the image signal is used in some cases. The present inventors provides the method of getting a half-tone photographic image without deteriorating the granular noise, by adding weak noise to the processed image signal.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 1:
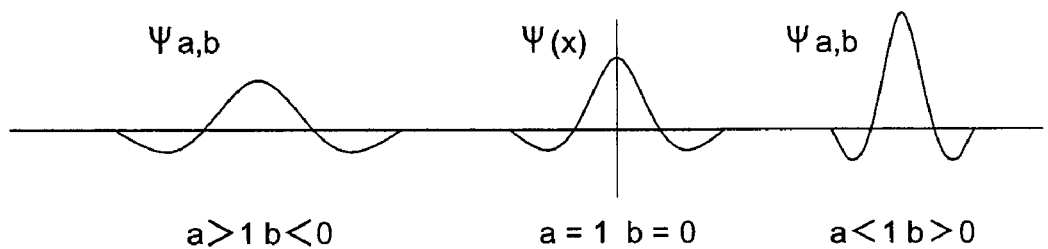
FIG. 1 is a diagram representing a wavelet transform function.
Figure 2:
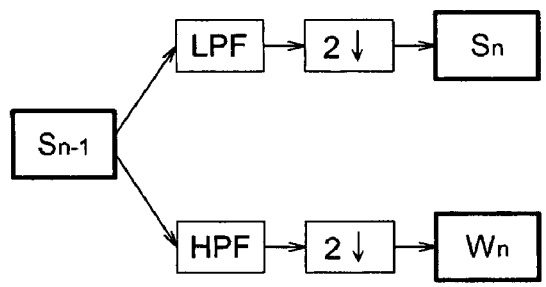
FIG. 2 is a diagram representing a prior art wavelet transform system of level 1.
Figure 3:
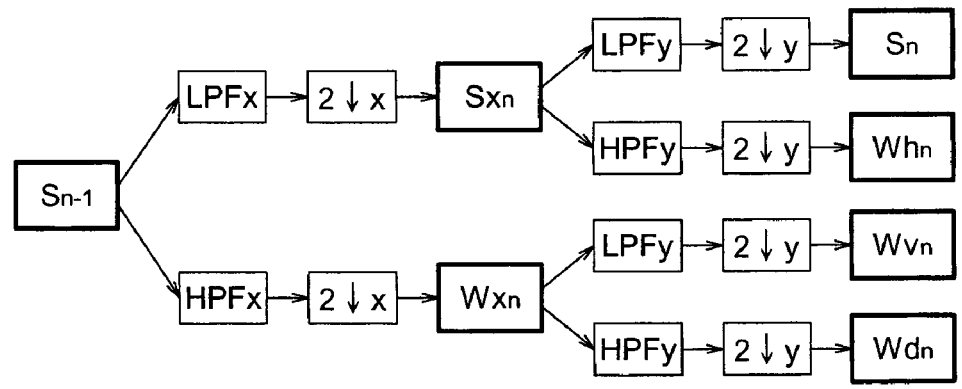
FIG. 3 is a diagram representing a filter processing system.
Figure 4:
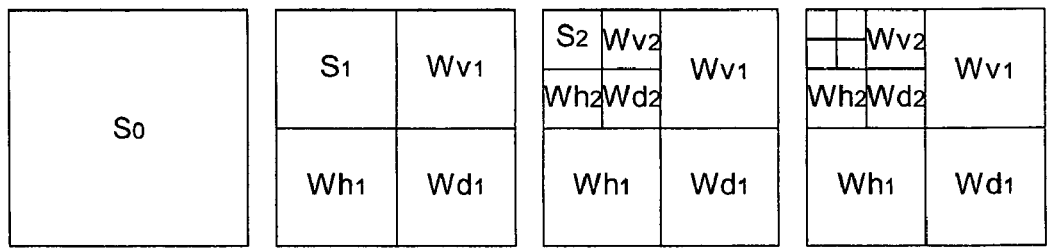
FIG. 4 is a diagram representing a prior art wavelet transform system of level 3.
Figure 5:
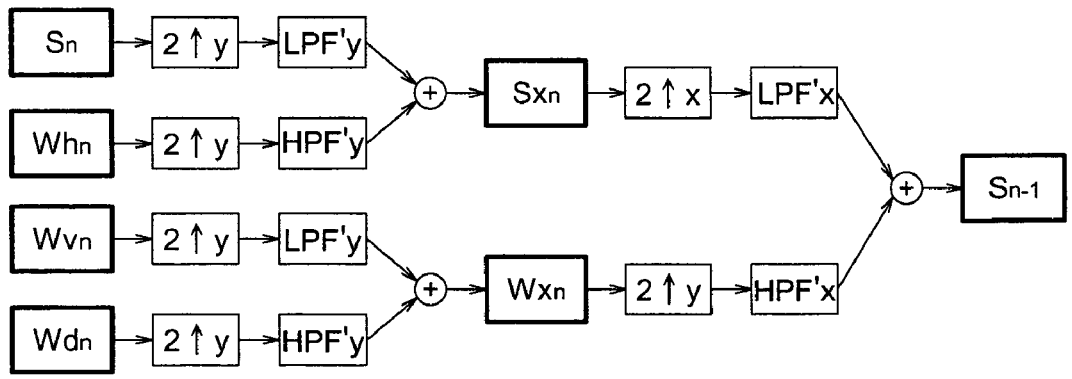
FIG. 5 is a diagram representing a filter processing system.
Figure 6:
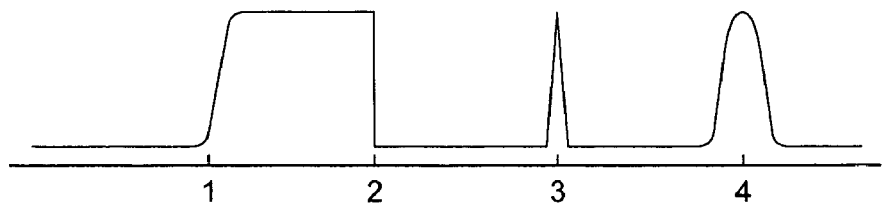
FIG. 6 is a diagram representing a Dyadic Wavelet transform system.
Figure 7:
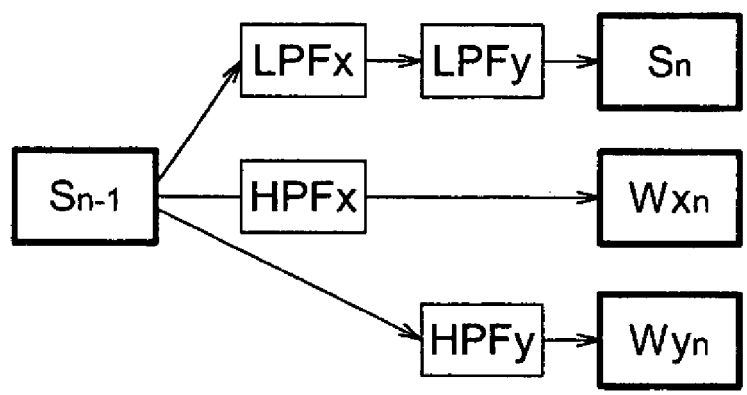
FIG. 7 is a diagram representing a Dyadic Wavelet transform system of level 1.
Figure 8:
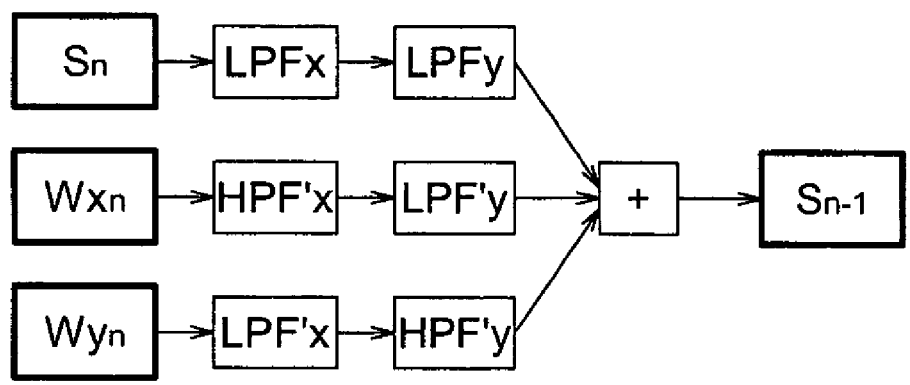
FIG. 8 is a diagram representing a Dyadic Wavelet inverse transform system.
Figure 9:
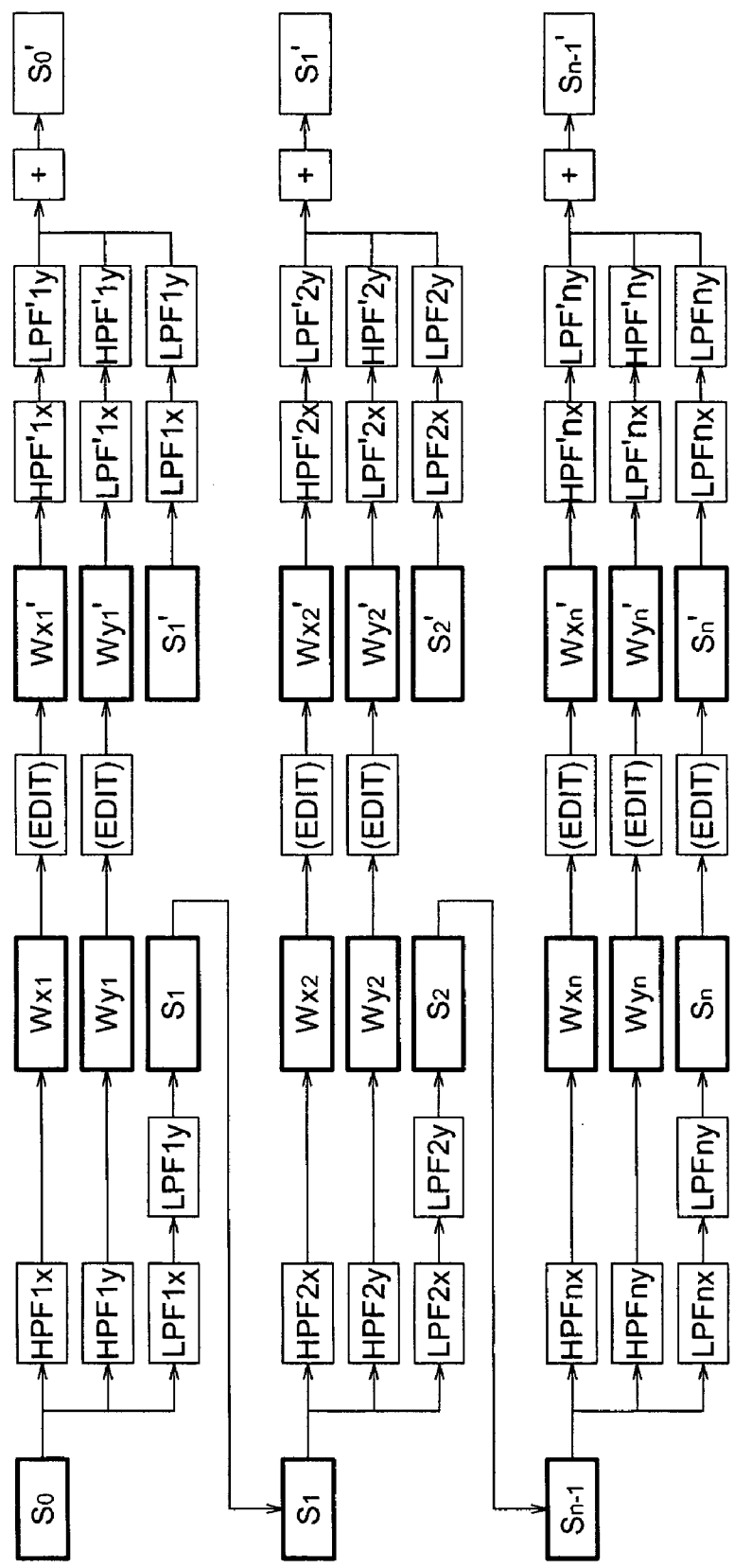
FIG. 9 is a diagram representing a Dyadic Wavelet transform system of the present invention.
Figure 10:
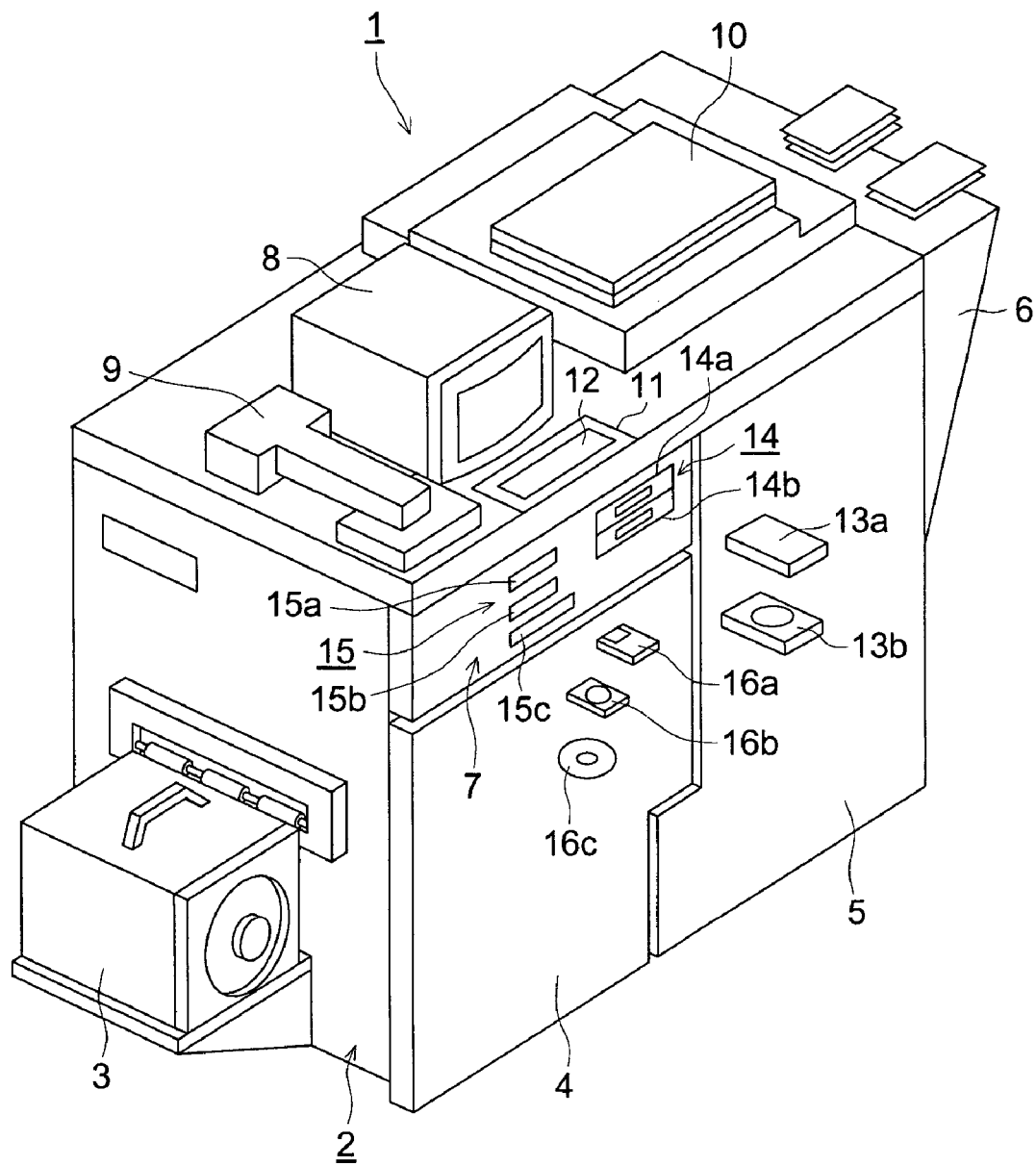
FIG. 10 is a diagram representing an image recording apparatus as an embodiment of the present invention.

With reference to the diagrams, the following describes the preferred specific embodiments of an image processing method, an image processing apparatus, an image processing program and an image recording apparatus according to the present invention:

FIG. 10 is a diagram representing an image recording apparatus as an embodiment of the present invention; Here an image recording apparatus 1 is exemplified by an apparatus for creating a print by exposing and developing a photographic material, however, without being restricted thereto, it can be any apparatus if it is capable of creating a print based on image information. For example, a print creating apparatus such as an inkjet printer, thermal printer, thermal printer or dye-sublimation printer will do.

The image recording apparatus 1 as an embodiment of the present invention has a magazine loading section 3 mounted on the left side of the main unit 2. The main unit 2 incorporates an exposure processing section 4 for exposing a photographic material as a recording medium, and a print creating section 5 for creating a print by applying development processing to the exposed photographic material and drying it. The created print is fed to a tray 6 installed on the right side of the main unit 2. The main unit 2 further incorporates a control section 7 installed above the exposure processing section 4.

A CRT 8 is mounted on the main unit 2. This CRT 8 constitutes display means for displaying on the screen the image of the image information where a print is to be created. A film scanning section 9 as a transparent document reader is installed on the left of the CRT 8.

A photographic material is a document read from the film scanning section 9 and a reflected document input apparatus 10. The photographic material includes a color negative film and a color reversal film. Frame image information photographed by an analog camera is recorded, and can be conversed into digital information by the film scanner of the film scanning section 9 to be used as frame image information. Further, when the photographic material is color paper, it can be made into frame image information by the reflected document input apparatus 10.

An image reading section 14 is provided on the control section of the main unit 2. The image reading section 14 is provided with a floppy (R) disk adaptor 14*b* to allow a PC card 13*a* and a floppy (R) disk 13*b* to be inserted therein. The PC card 13*a* has a memory storing multiplying pieces of frame image information photographed by a digital camera. The floppy (R) disk 13*b* stores multiplying pieces of frame image information photographed by a digital camera, for example.

An operation section 11 is installed on the front of the CRT 8, and is provided with an information input means 12, which is composed of a touch panel, for example.

The recording medium storing the frame image information of the present invention other than that mentioned above includes a multi-media card, memory stick MD data and CD-ROM.

The operation section 11, CRT 8, film scanning section 9, reflected document input apparatus 10 and image reading section 14 are integrally mounted on the main unit 2 to constitute the apparatus. One or more of them can be installed separately from the main unit 2.

An image write section 15 is installed on the control section 7 of the main unit 2. The image write section 15 is equipped with a floppy disk adaptor 15*a*, a MO adaptor 15*b* and an optical disk adaptor 15*c* to allow a floppy disk 16*a*, a MO 16*b* and an optical disk 16*c* to be inserted therein, whereby image information can be written into an image recording medium.

The control section 7 is equipped with communications means (not illustrated). It receives an image signal representing an photographed image and a print command directly from another computer in the facility or a remote computer via the Internet. This provides a function of a so-called network printer.

Figure 11:
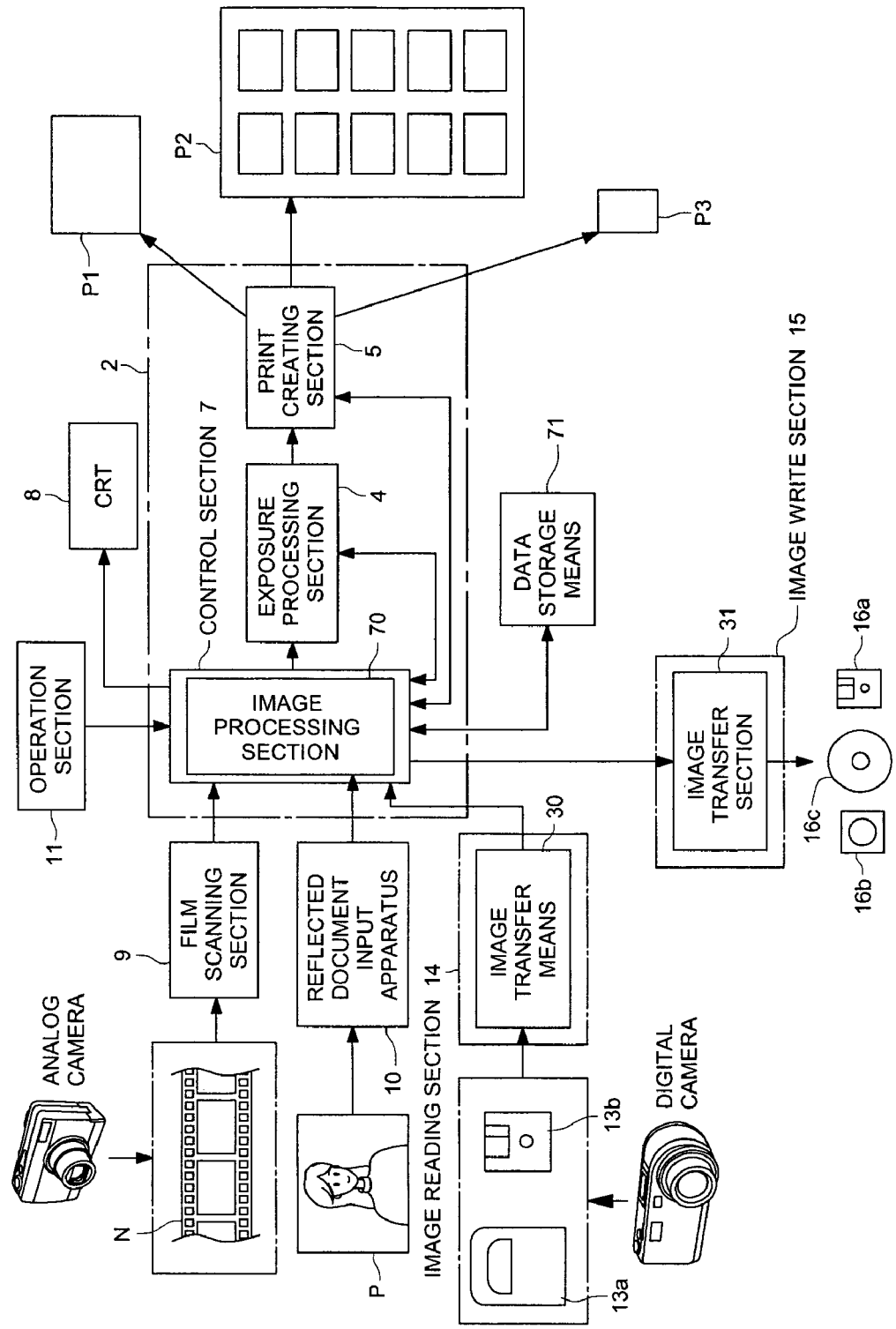
FIG. 11 is a schematic diagram representing the configuration of an image recording apparatus as an embodiment of the present invention.

FIG. 11 is a schematic diagram representing the configuration of an image recording apparatus. The control section 7 of the image recording apparatus 1 reads document information from the film scanning section 9 and reflected document input apparatus 10 based on the command information from the information input means 12, and gets the image information, which is displayed on the CRT 8.

The image recording apparatus 1 has data storage means 71. The data storage means 71 stores image information and its corresponding order information (information on the number of prints to be created and from the image of which frame these prints are to be created, or the information on print size). Such pieces of information are stored one after another. The frame image data from the developed negative film N obtained by developing the negative film photographed by an analog camera is inputted from the film scanning section 9. The frame image data from the print P obtained by printing the frame image on photographic paper and developing it is inputted from the reflected document input apparatus 10.

The control section 7 has an image processing section 70, and image processing of present invention is applied to image signals by the image processing section 70, whereby image information for exposure is sent to the exposure processing section 4. In the exposure processing section 4, image exposure is applied to the photographic material. This photographic material is fed to the print creating section 5. The photographic material exposed by the print creating section 5 is developed and dried to create prints P1, P2 and P3. Print P1 is available in service size, high-vision size and panorama size, while print P2 is available in A4-sized and P3 is available in the size of a visiting card.

The image recording apparatus 1 comprises an image reading section 14 that reads and transfers the frame image information of the PC card 13*a* and floppy (R) disk 13*b* where a photograph taken by a digital camera is stored. This image reading section 14 is equipped with a PC card adaptor, a floppy (R) disk adaptor, etc. as image transfer means 30. The PC card adaptor 14*a* is inserted into the PC card 13*a*, or the floppy (R) disk 13*b* is inserted into the floppy (R) disk adaptor 14*b*. Frame image information stored in the PC card 13*a* and floppy (R) disk 13*b* is read out and is sent to the control section 7 composed of a microcomputer. A PC card reader, PC card slot, etc. are used as PC card adaptor 14*a*.

The image write section 15 is equipped with a floppy disk adaptor 15*a*, MO adaptor 15*b* and optical disk adaptor 15*c* as image transfer sections 31 to allow the floppy disk 16*a*, MO 16*b* and optical disk 16*c* to be inserted therein, in such a way that image information can be written in an image recording medium.

Using the communications means (not illustrated) connected to the image processing section 70, the image signal representing the photographed image subsequent to application of image processing according to the present invention and accompanying order information can be sent to another computer in the facility or a remote computer via the Internet.

As described above, the image recording apparatus 1 comprises:

image input means for capturing the image of various types of digital media and the image information obtained by multisegment metering of an image document;

image processing means for processing the image information of the input image captured by this image input means in such a way as to "suppress the mottled granular noise contained in color image signals and to enhance the sharpness of the image, wherein shadow on the bridge of the nose or around the eyes on the face is maintained, without noise similar to color misregistration and a smooth expressionless face wearing makeup being produced, and without false color contour appearing close to the edge or false color spot visible on the flat portion";

image output means for displaying the processed image, outputting it from a printer or writing it to an image recording medium;

means for sending image signals and accompanying order information to another computer in the facility through a communications line or a remote computer via the Internet. Here the image input means comprises;

an image reading section 14 for capturing information on various types of digital medium image, a film scanning section 9 for capturing image information obtained by multisegment metering of an image document, a reflected document input apparatus 10, and communications means (not illustrated).

The image processing section 70 is provided with image processing means for applying image processing in such a way as to "suppress the mottled granular noise contained in color image signals and to enhance the sharpness of the image, wherein shadow on the bridge of the nose or around the eyes on the face is maintained, without noise similar to color misregistration and a smooth expressionless face wearing makeup being produced, and without false color contour appearing close to the edge or false color spot visible on the flat portion". The image output means comprises a CRT 8, exposure processing section 4 for outputting a print, print creating section 5 image write section 15 and communications means (not illustrated).

Figure 12:
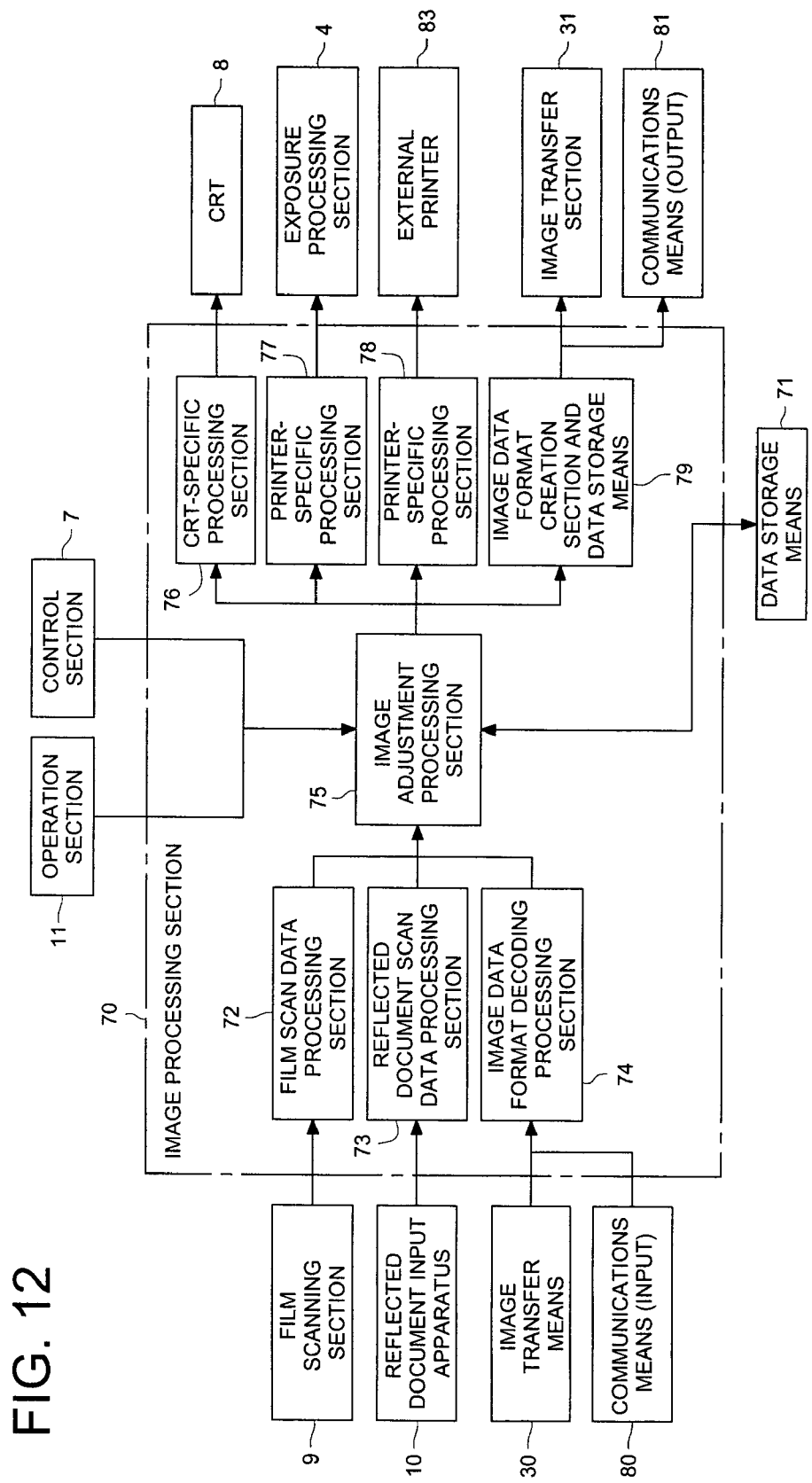
FIG. 12 is a diagram representing a schematic diagram representing the configuration of image processing apparatus of an image recording apparatus as an embodiment of the present invention.

FIG. 12 is a diagram representing a schematic diagram representing the configuration of image processing section 70. The image signal inputted from the film scanning section 9 is subjected to calibration inherent to the film scanner, negative/positive reversing in the case of a negative document, gray balance adjustment and contrast adjustment at the film scan data processing section 72, and is fed to an image adjustment processing section 75. Film size and type of negative/positive, as well as ISO sensitivity, manufacturer's name, information on the main subject and information on photographic conditions (for example, information described in APS), optically or magnetically recorded on the film, are also sent to the image adjustment processing section 75.

The image signal inputted from the reflected document input apparatus maintenance 10 is subjected to calibration inherent to the film scanner, negative/positive reversing in the case of a negative document, gray balance adjustment and contrast adjustment at the image data format decoding processor 73, and is sent to the image adjustment processing section 75.

The image signal inputted from the image transfer means 30 and communications means 80 undergoes decompression of a compressed symbol and conversion of color signal representation method, as required, according to the data format of the signal at the image data format decoding processing section 74, and is converted into the data format suitable for computation in the image processing section. Then the image signal is sent to the image adjustment processing section 75. Further, DSC's manufacturer's name, model name, information on the main subject and information on photographic conditions obtained from the header information and tag information of the image signal are also sent to the image adjustment processing section 75.

In addition, the information on the main subject gained from the film scanning section 9, reflected document input apparatus 10, image transfer means 30 and communications means 80, as well as the information on photographing conditions, can be sent to the above-mentioned image adjustment processing section 75 from the operation section 11 in the form capable of supplementing and replenishing such information.

Designation on the output image size is inputted from the operation section 11. In addition, if there is designation on the size of the output signal sent to the communications means 80, or designation on the size of the output signal embedded in the header information or tag information of the image signal obtained by the image transfer means 30, image data format decoding processing section 74 detects such information and transfers it to the image adjustment processing section.

Based on the command of the operation section and control section, the image adjustment processing section 75 applies such image processing as granular noise elimination to the image signal obtained from the film scanning section 9, reflected document input apparatus 10, image transfer means 30, communications means 80 and template processing section (not illustrated), in the manner to be described later. Then the image adjustment processing section 75 sends processed image signals to a CRT-specific processing section, printer-specific processing section, image data format creation section and data storage means. The image adjustment processing section 75 can be composed of a computer or logic circuit operated by a program.

CRT-specific processing section 76 applies such processing as change in the number of pixels and color matching to the image signal received from the image adjustment processing section 75, as required, and sends to the CRT 8 the signal for display synthesized with the information requiring display such as control information.

The printer-specific processing section 78 applies such printer-specific processing as calibration, color matching and change in the number of pixels, as required. The image signal is then sent to the exposure processing section 4. When an external printer such as a large-format inkjet printer is to be connected with the image recording apparatus 1 as an embodiment of the present invention, a printer-specific processing section 78 is provided for each of the printer to be connected, thereby applying such processing as calibration specific to an appropriate printer, color matching and change in the number of pixels.

In the image data format creation section and data storage means 79 apply such processing to the image signal received from the image adjustment processing section 75, as required, as to convert the format into various types of general-purpose image format represented by JPEG, TIFF and Exif. Then the image signal is sent to the image transfer section 31 and communications means 81.

Classification of film scan data processing section 72, reflected document scan data processing section 73, image data format decoding processing section 74, image adjustment processing section 75, CRT-specific processing section 76, printer-specific processing sections 77 and 78, and image data format creation section and data storage means 79 is provided to assist understanding of the functions of the image processing section 70 of the present invention. Each of them need not be realized as a physically independent device. It can be realized, for example, as classification of types of software processing in a single CPU.

Figure 13:
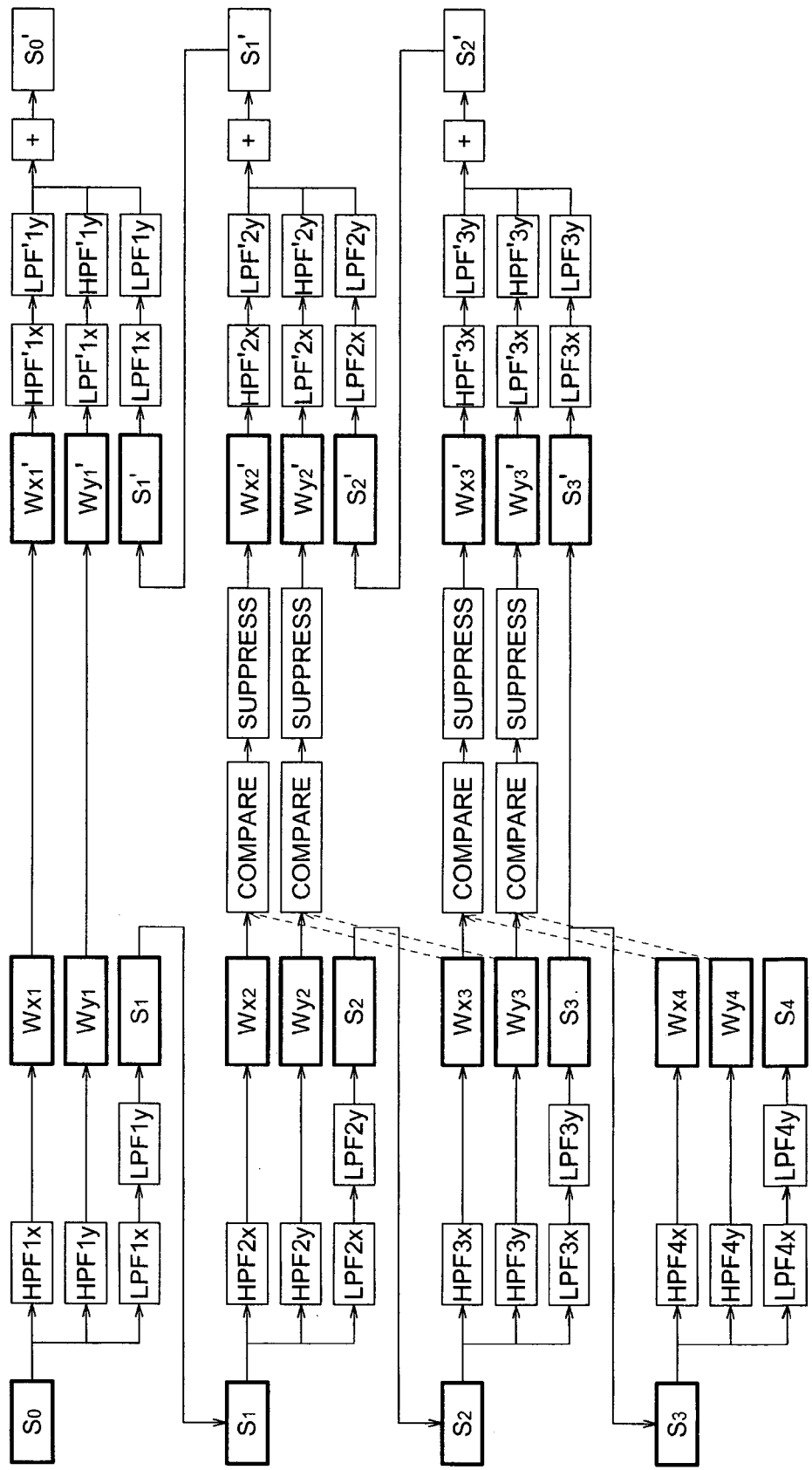
FIG. 13 is a system block diagram representing the internal processing of an image processing adjustment section.

FIG. 13 is a system block diagram representing the internal processing of an image adjustment processing section 75 in FIG. 12. In this example, luminance high frequency band components on the second and third levels are compared with that one level higher, whereby signal processing is performed. RGB color image signals are decomposed into luminance signals and chrominance signals in advance (not illustrated). Assuming the luminance signal as $S_0$, luminance high frequency band component $Wx_1$ in the direction x on the first level is obtained by the high-pass filter HPF1x in the direction x with respect to $S_0$; luminance high frequency band component $Wy_1$ in the direction y on the first level is gained by the high-pass filter HPF1y in the direction y; and luminance low frequency band component $S_1$ in the direction y on the first level is secured by the low-pass filters LPF1x and LPF1y in the directions x and y.

Then the $Wx_1$, $Wx_1$ and $S_2$ on the second level is obtained by HPF2x, HPF2y, LPF2x and LPF2y filters applied to $S_1$. In a like manner, Dyadic Wavelet transform is performed up to the fourth level. Then comparison is made between the pixels at the position corresponding to $Wx_3$ and $Wx_4$. If the value does not exceed the threshold value, the signal intensity of $Wx_3$ is suppressed. After comparison has been made for all pixels of $Wx_3$, the same procedure is applied to $Wy_3$. Then the same procedure is applied to $Xx_2$ and $Wy_2$. The following describes the process of inverse transform: Inverse transform is applied to the processed luminance high frequency band component $Wx_3'$ in the direction x on the third level by the high-pass filter for inverse transform HPF' $3x$ and low-pass filter for inverse transform FPF' $3y$; inverse transform is applied to the processed luminance high frequency band component $Wy_3'$ in the direction y on the third level by the low-pass filter for inverse transform LPF' $3x$ and high-pass filter for inverse transform HPF' $3y$; and inverse transform is applied to the luminance low frequency band component $S_2$ on the third level by the low-pass filters for inverse transform LPF' $3x$ and LPF' $3y$; whereby these three components are synthesized to get the processed luminance low frequency band components $S_2'$ on the second level. In a like manner, inverse transform is applied to those on the second and first levels to get a processed luminance signal $S_0'$. This is followed by the step of converting processed luminance signal and chrominance signal into the RGB signals (not illustrated) to get the processed color image signals.

The filter having a coefficient given in Table 1 is used as a filter used in this example.

TABLE 1

| n  | HPF1 | LPF1  | HPF'1     | LPF'1     |
|----|------|-------|-----------|-----------|
| −3 |      |       |           | 0.0078125 |
| −2 |      |       | 0.054685  | 0.046875  |
| −1 |      | 0.125 | 0.171875  | 0.1171875 |
| 0  | −2.0 | 0.375 | −0.171875 | 0.65625   |
| 1  | 2.0  | 0.375 | −0.054685 | 0.1171875 |
| 2  |      | 0.125 | −0.0078125| 0.046875  |
| 3  |      |       |           | 0.0078125 |

In the Dyadic Wavelet, filter coefficient differs according to each level. A coefficient obtained by inserting $2^{n-1} - 1$ zeros between coefficients of filters on level 1 is used as a filter coefficient on level "n". (See the above-mentioned Reference).

A coefficient given in Table 2 is used as the compensation coefficient $\gamma_i$ determined in response to the level "i" of the Dyadic Wavelet transform.

TABLE 2

| i | γ          |
|---|------------|
| 1 | 0.66666667 |
| 2 | 0.89285714 |
| 3 | 0.97087379 |
| 4 | 0.99009901 |
| 5 | 1          |

The image photographed by the Konica color NEW CENTURIA 800 (ISO with a size of 35 mm) was processed by an image processing apparatus having a configuration of the present system block diagram, where the image was scanned at a resolution of 61 pixels/mm. A level where suppression processing was applied was set to the first and second levels. Further, two threshold values on the first level were set to 1.02 and 0.83, and those on the second level were set to 1.15 and 0.95. When the value was reduced below the lower threshold value on each level, signal intensity was suppressed to zero. When the value was between the higher and lower threshold values, signal intensity was suppressed, and the rate of suppression was increased as the value was closer to the lower threshold value. The image processed by the present embodiment showed almost no adverse effect due to artifact due to image processing or feeling of a smooth expressionless face, as compared to the image not yet processed. Further, the processed image had almost no mottled granular noise.

Figure 14:
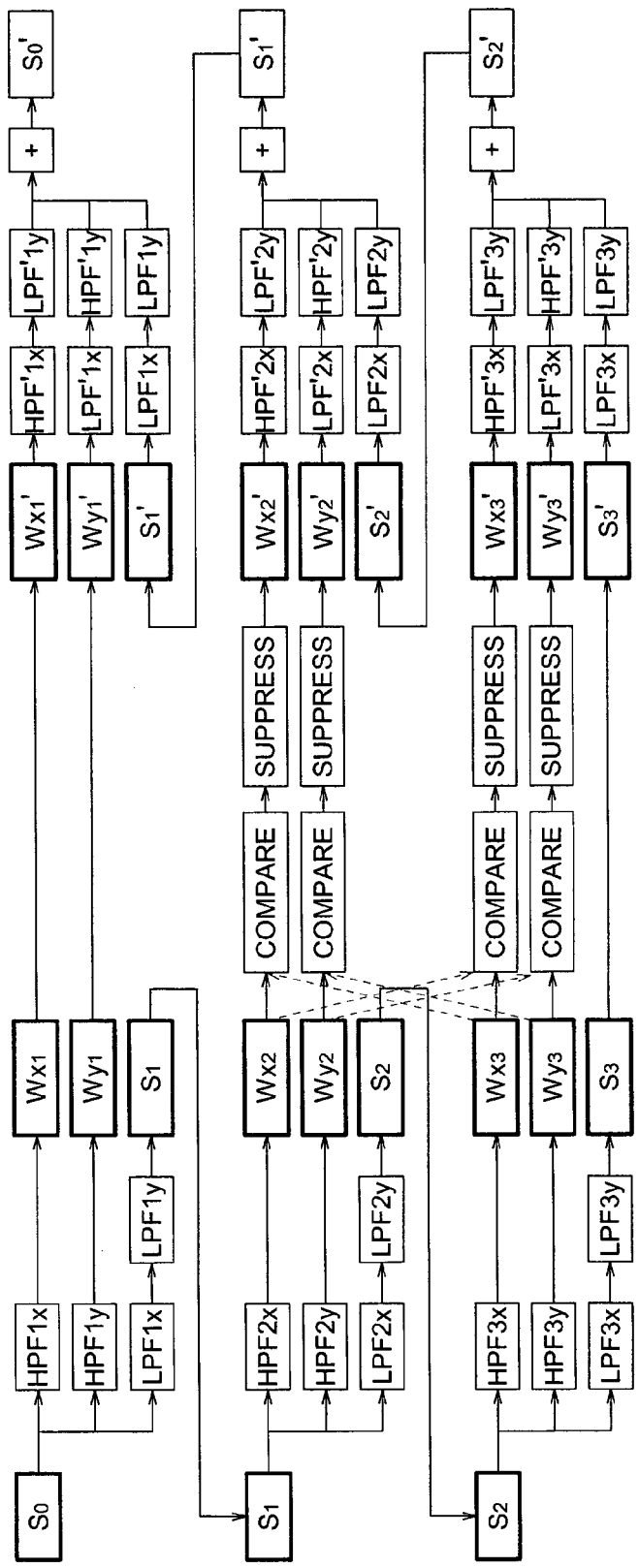
FIG. 14 is a system diagram representing another embodiment of the internal processing of an image processing adjustment section.

FIG. 14 is a system diagram representing another embodiment of the internal processing of an image adjustment processing section 75 shown in FIG. 12. In this example, suppression processing is applied to luminance high frequency band components on the second and third levels. The components on the second level are compared with those one level higher, and those on the third level are compared with those one level lower, according to this example. Unlike the example shown in FIG. 13, after Dyadic Wavelet is applied up to the third level, comparison was made for each level. Further, after suppression processing is completed, processed image signals were gained by the Dyadic Wavelet inverse transform. Almost the same image processing effect as that given in FIG. 13 is gained. In addition, higher processing speed is achieved.

Figure 15:
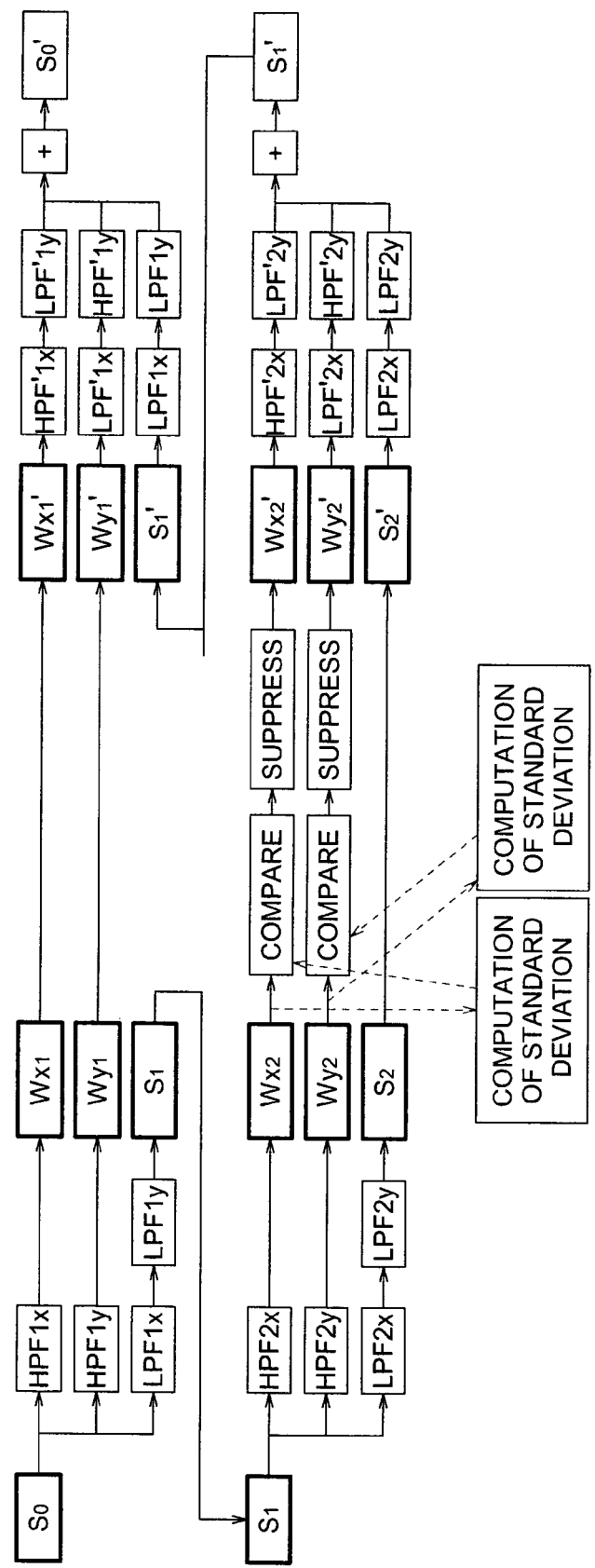
FIG. 15 is a diagram representing another embodiment of the internal processing of an image processing adjustment section.

FIG. 15 is a system block diagram representing another embodiment of the internal processing of an image adjustment processing section 75 shown in FIG. 12. In this example, suppression processing is applied to the luminance high frequency band component on the second level. Signal processing is carried out by comparison with the standard deviation of the luminance high frequency band component on the second level, according to this example. After Dyadic Wavelet transform has been completed up to the second level, the standard deviation is calculated from the luminance high frequency band component of each of $Wx_2$ and $Wy_2$, thereby determining the threshold value. This is following by the step of comparison and suppression processing is carried out. Here, configuration is designed in such a way that, after the luminance high frequency band component having been suppressed is passed through the inverse transform filter, sharpness enhancement processing is applied. The same effect is exhibited, even before the component is passed through the inverse transform filter. Sharpness enhancement described so far is implemented by multiplying the signal intensity of the pixel not yet processed (pixel of the signal intensity greater than the threshold value) by 1.4. After that, Dyadic Wavelet inverse transform is applied to get the processed image signal. Here, sharpness enhancement processing may be applied to the luminance high frequency band component on the first level (not illustrated); however, the preferred scaling factor is approximately 1.1.

Figure 16:
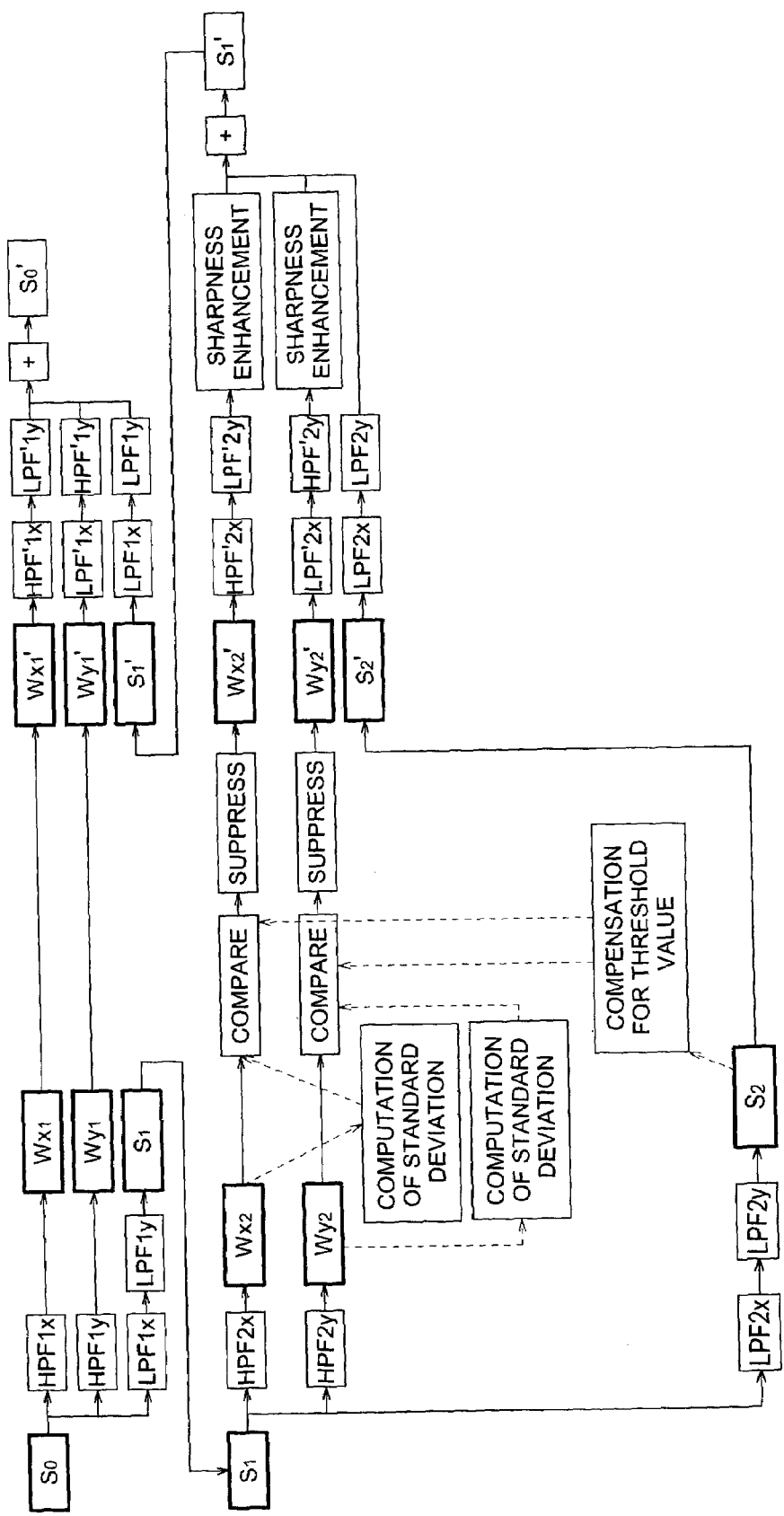
FIG. 16 is a diagram representing another embodiment of the internal processing of an image processing adjustment section.

FIG. 16 is a system block diagram representing another embodiment of the internal processing of an image adjustment processing section 75 shown in FIG. 12. In this example, when suppression processing is applied to the luminance high frequency band component on the second level using the threshold value determined by the standard deviation, comparison is made and suppression processing is performed by changing the threshold value according to the difference in signal intensity of the luminance low frequency band component on the same level. Similarly to the case of FIG. 15, after completion of the Dyadic Wavelet transform up to the second level, the standard deviation is computed from the luminance high frequency band component for each of $Wx_2$ and $Wy_2$, thereby determining the threshold value. Reference is made to the signal intensity of the luminance low frequency band component of the pixel at the corresponding position, with respect to the luminance high frequency band component. If the signal intensity is low (luminance is low), compensation is made to increase the threshold value. The amount of compensation for threshold value is approximately 40% in terms of the minimum through maximum luminance. After completion of suppression processing according to the threshold value compensated for each pixel, the Dyadic Wavelet inverse transform is performed to get a processed image signal.

The invention described in the Claims has made it possible to suppress the mottled granular noise contained in color image signals and to enhance the sharpness of the image, wherein shadow on the bridge of the nose or around the eyes on the face is maintained, without noise similar to color misregistration and a smooth expressionless face wearing makeup being produced, and without false color contour appearing close to the edge or false color spot visible on the flat portion. Further, this invention provides an image processing method, an image processing apparatus, an image processing program and an image recording apparatus characterized by reduced computation loads.

Disclosed embodiment can be varied by a skilled person without departing from the spirit and scope of the invention.

What is claimed is:

1. A method for processing image signals representing an original image, said method comprising the steps of:
   converting said image signals to luminance signals and chrominance signals;
   applying a Dyadic Wavelet transform processing to at least said luminance signals;
   suppressing a signal intensity of a high-frequency luminance component at P-th level (P is an integer equal to or greater than 1), when said intensity of said high-frequency luminance component conforms to a specific condition;
   applying a Dyadic Wavelet inverse-transform processing to transformed and processed signals; and
   synthesizing processed luminance signals and said chrominance signals with each other to generate processed image signals.

2. The method of claim 1,
wherein said Dyadic Wavelet transform processing at a Q-th level (Q>P) is also applied to said luminance signals, and said specific condition fulfills the relationship of $Q_h/P_h \leq A_t$ where, $Q_h$: signal intensity of high-frequency luminance component at Q-th level,
$P_h$: signal intensity of high-frequency luminance component at P-th level,
$A_t$: first threshold value.

3. The method of claim 2,
wherein said specific condition further fulfills the relationships of $P_{ch+1}/P_{ch} \leq A_t$, and $1.2 \geq A_t > 1$ where, $P_{ch+1}$: signal intensity of compensated high-frequency luminance component at (P+1)-th level,
$P_{ch}$: signal intensity of compensated high-frequency luminance component at P-th level.

4. The method of claim 2,
wherein said specific condition further fulfills the relationships of $P_{ch+1}/P_{ch} \leq A_t$, and $1.2 \geq A_t > 1$ where, $P_{ch+1}$: signal intensity of compensated luminance high-frequency component at (P+1)-th level,
$P_{ch}$: signal intensity of compensated luminance high-frequency component at P-th level; and wherein $P_h$, representing said signal intensity of said high-frequency luminance component at P-th level, is suppressed to substantially zero, when said specific condition fulfills the relationships of $P_{ch+1}/P_{ch} \leq B_t$, and $1 > B_t \geq 0.8$ where, $B_t$: second threshold value.

5. The method of claim 1,
wherein said Dyadic Wavelet transform processing at a P-th level (P≧2) is also applied to said luminance signals, and said specific condition fulfills the relationship of $P_h/P_{hs} \leq E_t$ where, $P_h$: signal intensity of high-frequency luminance component at P-th level,
$P_{hs}$: signal intensity of high-frequency luminance component lower than P-th level
$E_t$: third threshold value; and wherein said Dyadic Wavelet inverse-transform processing is conducted from said P-th level, after suppressing said intensity of said high-frequency luminance component at said P-th level.

6. The method of claim 5,
wherein said specific condition further fulfills the relationships of $P_{ch}/P_{ch-1} \leq A_t$, and $1.2 \geq E_t > 1$ where, $P_{ch}$: signal intensity of compensated high-frequency luminance component at P-th level,
$P_{ch-1}$: signal intensity of compensated high-frequency luminance component at (P−1)-th level.

7. The method of claim 5,
wherein said specific condition further fulfills the relationships of $P_{ch}/P_{ch-1} \leq E_t$, and $1.2 \geq E_t > 1$ where, $P_{ch}$: signal intensity of compensated high-frequency luminance component at P-th level,
$P_{ch-1}$: signal intensity of compensated high-frequency luminance component at (P−1)-th level; and wherein $P_h$, representing said signal intensity of said high-frequency luminance component at P-th level, is suppressed to substantially zero, when said specific condition fulfills the relationships of $P_{ch}/P_{ch-1} \leq F_t$, and $1 > F_t \geq 0.8$ where, $F_t$: fourth threshold value.

8. The method of claim 1,
wherein said specific condition is such that an absolute value of said signal intensity of said high-frequency luminance component at P-th level is equal to or smaller than fifth threshold value $C_t$, which is derived from a standard deviation of said signal intensity of said high-frequency luminance component at P-th level.

9. The method of claim 1,
wherein said specific condition is such that an absolute value of said signal intensity of said high-frequency luminance component at P-th level is equal to or smaller than sixth threshold value $G_t$, which is derived from a standard deviation of said signal intensity of said high-frequency luminance component at P-th level; and
wherein $P_h$, representing said signal intensity of said high-frequency luminance component at P-th level, is suppressed to substantially zero.

10. The method of claim 1,
wherein said specific condition is such that an absolute value of said signal intensity of said high-frequency luminance component at P-th level is equal to or smaller than seventh threshold value $D_t$, which is equal to or larger than fifth threshold value $C_t$, and both fifth threshold value $C_t$ and seventh threshold value $D_t$ are derived from a standard deviation of said signal intensity of said high-frequency luminance component at P-th level; and
wherein $P_h$, representing said signal intensity of said high-frequency luminance component at P-th level, is suppressed to substantially zero, when said absolute value is equal to or smaller than fifth threshold value $C_t$.

11. The method of claim 1,
wherein a sharpness enhancement processing is performed after completing a suppression processing for said signal intensity of said high-frequency luminance component under said specific condition.

12. The method of claim 11,
wherein said sharpness enhancement processing is conducted by enhancing signal intensity of high-frequency luminance components, which do not fulfill said specific condition, at a level at which said suppression processing is conducted.

13. The method of claim 1,
wherein a suppression processing for high-frequency component of said chrominance signals is performed.

14. The method of claim 1,
wherein said specific condition for suppressing said signal intensity of said high-frequency luminance component is made to vary depending on characteristics of a low-frequency component of said chrominance signals.

15. The method of claim 1,
wherein said image signals, representing said original image, are acquired by scanning a silver-halide film.

16. The method of claim 1,
wherein slight noises are added to said processed image signals.

17. A method for processing image signals representing an original image, said method comprising the steps of:
converting said image signals to luminance signals and chrominance signals;
applying a Dyadic Wavelet transform processing to at least said luminance signals;
suppressing a signal intensity of a high-frequency luminance component at a level equal to or lower than a P-th level (P is an integer equal to or greater than 2), when said intensity of said high-frequency luminance component conforms to a specific condition;
applying a Dyadic Wavelet inverse-transform processing to transformed and processed signals; and
synthesizing processed luminance signals and said chrominance signals with each other to generate processed image signals.

18. The method of claim 17,
wherein said Dyadic Wavelet transform processing at a Q-th level (Q>P) is also applied to said luminance signals, and said specific condition fulfills the relationship of $P_{hl}/P_{hn} \leq A_t$ where, $P_{hl}$: signal intensity of high-frequency luminance component at a level larger than each of levels equal to or lower than P-th level,
$P_{hn}$: signal intensity of high-frequency luminance component at each of levels equal to or lower than P-th level,
$A_t$: first threshold value; and
wherein said signal intensity of high-frequency luminance component at each of levels equal to or lower than P-th level is suppressed.

19. The method of claim 18,
wherein said specific condition further fulfills the relationships of $P_{chn+1}/P_{chn} \leq A_t$, and $1.2 \geq A_t > 1$ where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level.

20. The method of claim 18,
wherein said specific condition further fulfills the relationships of $P_{chn+1}/P_{chn} \leq A_t$, and $1.2 \geq A_t > 1$ where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level; and
wherein said signal intensity of high-frequency luminance component at each of levels lower than P-th level is suppressed to substantially zero, when said specific condition fulfills the relationships of $$P_{chn+1}/P_{chn} \leq B_t, \text{ and}$$

$$1 > B_t \geq 0.8$$

where, $B_t$: second threshold value.

21. The method of claim 17,
wherein said Dyadic Wavelet transform processing at a P-th level is also applied to said luminance signals; and
wherein, when the following relationship is fulfilled with respect to at least a high-frequency luminance component at P-th level $$P_h/P_{hs} \leq E_t$$

where, $P_h$: signal intensity of high-frequency luminance component at P-th level,
$P_{hs}$: signal intensity of high-frequency luminance component lower than P-th level
$E_t$: third threshold value,
said Dyadic Wavelet inverse-transform processing is conducted from said P-th level, after suppressing said signal intensity of said high-frequency luminance component at said P-th level.

22. The method of claim 21,
wherein, when the following relationship is fulfilled with respect to at least a high-frequency luminance component at P-th level $$P_{ch}/P_{ch-1} \leq A_t, \text{ and}$$

$$1.2 \geq E_t > 1$$

where, $P_{ch}$: signal intensity of compensated high-frequency luminance component at P-th level,
$P_{ch-1}$: signal intensity of compensated high-frequency luminance component at (P−1)-th level,
said signal intensity of said high-frequency luminance component at said P-th level is suppressed.

23. The method of claim 21,
wherein, when the following relationship is fulfilled with respect to at least a high-frequency luminance component at P-th level $$P_{ch}/P_{ch-1} \leq A_t, \text{ and}$$

$$1.2 \geq E_t > 1$$

where, $P_{ch}$: signal intensity of compensated high-frequency luminance component at P-th level,
$P_{ch-1}$: signal intensity of compensated high-frequency luminance component at (P−1)-th level,
said signal intensity of said high-frequency luminance component at said P-th level is suppressed; and
wherein, when the following relationship is fulfilled with respect to at least a high-frequency luminance component at P-th level $$P_{ch}/P_{ch-1} \leq F_t, \text{ and}$$

$$1 > F_t \geq 0.8$$

where, $P_{ch}$: signal intensity of compensated high-frequency luminance component at P-th level,
$P_{ch-1}$: signal intensity of compensated high-frequency luminance component at (P−1)-th level,
$F_t$: fourth threshold value,
$P_h$, representing said signal intensity of said high-frequency luminance component at P-th level, is suppressed to substantially zero.

24. The method of claim 17,
wherein said specific condition is such that an absolute value of said signal intensity of said high-frequency luminance component at each of levels equal to or smaller than P-th level is equal to or smaller than fifth threshold value $C_t$, which is derived from a standard deviation of said signal intensity of said high-frequency luminance component at each of levels equal to or smaller than P-th level.

25. The method of claim 17,
wherein said specific condition is such that an absolute value of said signal intensity of said high-frequency luminance component at each of levels equal to or smaller than P-th level is equal to or smaller than sixth threshold value $G_t$, which is derived from a standard deviation of said signal intensity of said high-frequency luminance component at each of levels equal to or smaller than said P-th level; and
wherein said signal intensity of said high-frequency luminance component at each of levels equal to or smaller than said P-th level, is suppressed to substantially zero.

26. The method of claim 17,
wherein said specific condition is such that an absolute value of said signal intensity of said high-frequency luminance component at each of levels equal to or smaller than said P-th level is equal to or smaller than seventh threshold value $D_t$, which is equal to or larger than fifth threshold value $C_t$, and both fifth threshold value $C_t$ and seventh threshold value $D_t$ are derived from a standard deviation of said signal intensity of said high-frequency luminance component at P-th level; and
wherein said signal intensity of said high-frequency luminance component at each of levels equal to or smaller than said P-th level, is suppressed to substantially zero, when said absolute value is equal to or smaller than fifth threshold value $C_t$.

27. A method for processing image signals representing an original image, said method comprising the steps of:
converting said image signals to luminance signals and chrominance signals;
applying a Dyadic Wavelet transform processing to at least said luminance signals;
suppressing a signal intensity of a high-frequency luminance component at a P-th level (P is an integer equal to or greater than 1), when said intensity of said high-frequency luminance component conforms to a specific condition;
applying a Dyadic Wavelet inverse-transform processing to transformed and processed signals; and
synthesizing processed luminance signals and said chrominance signals with each other to generate processed image signals;
wherein said specific condition is made to vary depending on a low-frequency luminance component.

28. The method of claim 27,
wherein said Dyadic Wavelet transform processing at a Q-th level (Q>P) is also applied to said luminance signals, and said specific condition fulfills the relationship of $$Q_h/P_h \leq A_t$$

where, $Q_h$: signal intensity of high-frequency luminance component at Q-th level, $P_h$: signal intensity of high-frequency luminance component at P-th level, $A_t$: first threshold value; and wherein said Dyadic Wavelet inverse-transform processing is conducted from said P-th level, after suppressing said intensity of said high-frequency luminance component at said P-th level, and further, wherein said first threshold value $A_t$ is made to vary depending on a difference between signal intensities of low-frequency luminance components.

29. The method of claim 28, wherein said specific condition further fulfills the relationships of $P_{ch+1}/P_{ch} \leq A_t$, and $1.5 \geq A_t > 1$ where, $P_{ch-1}$: signal intensity of compensated high-frequency luminance component at (P+1)-th level, $P_{ch}$: signal intensity of compensated high-frequency luminance component at P-th level.

30. The method of claim 28, wherein said specific condition further fulfills the relationships of $P_{chg}/P_{ch} \leq A_t$, and $1.5 \geq A_t > 1$ where, $P_{chg}$: signal intensity of compensated luminance high-frequency component at a level larger than P-th level, $P_{ch}$: signal intensity of compensated luminance high-frequency component at P-th level; and wherein $P_h$, representing said signal intensity of said high-frequency luminance component at P-th level, is suppressed to substantially zero, when said specific condition fulfills the relationships of $P_{ch+1}/P_{ch} \leq B_t$, and $1 > B_t \geq 0.7$ where, $P_{ch+1}$: signal intensity of compensated luminance high-frequency component at (P+1)-th level, $B_t$: second threshold value.

31. The method of claim 27, wherein said Dyadic Wavelet transform processing at a P-th level is also applied to said luminance signals, and said specific condition fulfills the relationship of $P_h/P_{hs} \leq E_t$ where, $P_h$: signal intensity of high-frequency luminance component at P-th level, $P_{hs}$: signal intensity of high-frequency luminance component lower than P-th level $E_t$: third threshold value; and wherein said Dyadic Wavelet inverse-transform processing is conducted from said P-th level, after suppressing said intensity of said high-frequency luminance component at said P-th level; and further, wherein said first threshold value $E_t$ is made to vary depending on a difference between signal intensities of low-frequency luminance components.

32. The method of claim 31, wherein said specific condition further fulfills the relationships of $P_{ch}/P_{ch-1} \leq A_t$, and $1.5 \geq E_t > 1$ where, $P_{ch}$: signal intensity of compensated high-frequency luminance component at P-th level, $P_{ch-1}$: signal intensity of compensated high-frequency luminance component at (P−1)-th level.

33. The method of claim 31, wherein said specific condition further fulfills the relationships of $P_{ch}/P_{ch-1} \leq E_t$, and $1.5 \geq E_t > 1$ where, $P_{ch}$: signal intensity of compensated high-frequency luminance component at P-th level, $P_{ch-1}$: signal intensity of compensated high-frequency luminance component at (P−1)-th level; and wherein $P_h$, representing said signal intensity of said high-frequency luminance component at P-th level, is suppressed to substantially zero, when said specific condition fulfills the relationships of $P_{ch}/P_{ch-1} \leq F_t$, and $1 > F_t \geq 0.7$ where, $F_t$: fourth threshold value.

34. The method of claim 27, wherein said specific condition is such that an absolute value of said signal intensity of said high-frequency luminance component at P-th level is equal to or smaller than fifth threshold value $C_t$, which is derived from a standard deviation of said signal intensity of said high-frequency luminance component at Pth level; and wherein said fifth threshold value $C_t$ is made to vary depending on a difference between signal intensities of low-frequency luminance components.

35. The method of claim 27, wherein said specific condition is such that an absolute value of said signal intensity of said high-frequency luminance component at P-th level is equal to or smaller than sixth threshold value $G_t$, which is derived from a standard deviation of said signal intensity of said high-frequency luminance component at said P-th level; and wherein said signal intensity of said highfrequency luminance component at said P-th level, is suppressed to substantially zero.

36. The method of claim 27, wherein said specific condition is such that an absolute value of said signal intensity of said high-frequency luminance component at P-th level is equal to or smaller than seventh threshold value $D_t$, which is equal to or larger than fifth threshold value $C_t$, and both fifth threshold value $C_t$ and seventh threshold value $D_t$ are derived from a standard deviation of said signal intensity of said high-frequency luminance component at P-th level; and wherein said signal intensity of said high-frequency luminance component at said P-th level, is suppressed to substantially zero, when said absolute value is equal to or smaller than fifth threshold value $C_t$; and wherein both said fifth threshold value $C_t$ and said seventh threshold value $D_t$ are made to vary depending on a difference between signal intensities of low-frequency luminance components.

37. The method of claim 27, wherein a sharpness enhancement processing is performed after completing a suppression processing for said signal intensity of said high-frequency luminance component under said specific condition.

38. The method of claim 37,
wherein said sharpness enhancement processing is conducted by enhancing signal intensity of high-frequency luminance components, which do not fulfill said specific condition, at a level at which said suppression processing is conducted.

39. The method of claim 27,
wherein a suppression processing for high-frequency component of said chrominance signals is performed.

40. The method of claim 27,
wherein said specific condition for suppressing said signal intensity of said high-frequency luminance component is made to vary depending on characteristics of a low-frequency component of said chrominance signals.

41. A method for processing image signals representing an original image, said method comprising the steps of:
converting said image signals to luminance signals and chrominance signals;
applying a Dyadic Wavelet transform processing to at least said luminance signals;
suppressing a signal intensity of a high-frequency luminance component at a level equal to or lower than P-th level, when said intensity of said high-frequency luminance component conforms to a specific condition;
applying a Dyadic Wavelet inverse-transform processing to transformed and processed signals; and
synthesizing processed luminance signals and said chrominance signals with each other to generate processed image signals;
wherein said specific condition is made to vary depending on a difference between signal intensities of low-frequency luminance components.

42. The method of claim 41,
wherein said Dyadic Wavelet transform processing at a Q-th level (Q>P) is also applied to said luminance signals, and said specific condition fulfills the relationship of $$P_{hl}/P_{hn} \leq A_t$$

where, $P_{hl}$: signal intensity of high-frequency luminance component at a level larger than each of levels equal to or lower than P-th level,
$P_{hn}$: signal intensity of high-frequency luminance component at each of levels equal to or lower than P-th level,
$A_t$: first threshold value; and
wherein said Dyadic Wavelet inverse-transform processing is conducted from said P-th level, after suppressing said intensity of said high-frequency luminance component at said P-th level, and further,
wherein said first threshold value $A_t$ is made to vary depending on a difference between signal intensities of low-frequency luminance components.

43. The method of claim 42,
wherein said specific condition further fulfills the relationships of $$P_{chn+1}/P_{chn} \leq A_t, \text{ and}$$

$$2 \geq A_t > 1$$

where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level.

44. The method of claim 42,
wherein said specific condition further fulfills the relationships of $$P_{chn+1}/P_{chn} \leq A_t, \text{ and}$$

$$1.5 \geq A_t > 1$$

where, $P_{chn+1}$: signal intensity of compensated high-frequency luminance component at (each of levels equal to or lower than P-th level)+1 level,
$P_{chn}$: signal intensity of compensated high-frequency luminance component at each of levels equal to or lower than P-th level; and
wherein said signal intensity of high-frequency luminance component at each of levels lower than P-th level is suppressed to substantially zero, when said specific condition fulfills the relationships of $$P_{chn+1}/P_{chn} \leq B_t, \text{ and}$$

$$1 > B_t \geq 0.7$$

where, $B_t$: second threshold value.

45. The method of claim 41,
wherein said Dyadic Wavelet transform processing at a P-th level is also applied to said luminance signals; and
wherein, when the following relationship is fulfilled with respect to at least a high-frequency luminance component at P-th level $$P_h/P_{hs} \leq E_t$$

where, $P_h$: signal intensity of high-frequency luminance component at P-th level,
$P_{hs}$: signal intensity of high-frequency luminance component lower than P-th level
$E_t$: third threshold value,
said Dyadic Wavelet inverse-transform processing is conducted from said P-th level, after suppressing said signal intensity of said high-frequency luminance component at said P-th level; and,
wherein said first threshold value $E_t$ is made to vary depending on a difference between signal intensities of low-frequency luminance components.

46. The method of claim 45,
wherein, when the following relationship is fulfilled with respect to at least a high-frequency luminance component at P-th level $$P_{ch}/P_{ch-1} \leq E_t, \text{ and}$$

$$1.2 \geq E_t > 1$$

where, $P_{ch}$: signal intensity of compensated high-frequency luminance component at P-th level,
$P_{ch-1}$: signal intensity of compensated high-frequency luminance component at (P−1)-th level
said signal intensity of said high-frequency luminance component at said P-th level is suppressed.

47. The method of claim 45,
wherein, when the following relationship is fulfilled with respect to at least a high-frequency luminance component at P-th level $$P_{ch}/P_{ch-1} \leq E_t, \text{ and}$$

$$1.5 \geq E_t > 1$$

where, $P_{ch}$: signal intensity of compensated high-frequency luminance component at P-th level,
$P_{ch-1}$: signal intensity of compensated high-frequency luminance component at (P−1)-th level
said signal intensity of said high-frequency luminance component at said P-th level is suppressed; and
wherein said signal intensity of high-frequency luminance component at said P-th level is suppressed to substantially zero, when said specific condition fulfills the relationships of $P_{ch}/P_{ch-1} \leq F_t$, and $1 > F_t \geq 0.7$ where, $F_t$: fourth threshold value.

48. The method of claim 41,
wherein said specific condition is such that an absolute value of said signal intensity of said high-frequency luminance component at each of levels equal to or smaller than P-th level is equal to or smaller than fifth threshold value $C_t$, which is derived from a standard deviation of said signal intensity of said high-frequency luminance component at each of levels equal to or smaller than P-th level; and
wherein said fifth threshold value $C_t$ is made to vary depending on a difference between signal intensities of low-frequency luminance components.

49. The method of claim 41,
wherein said specific condition is such that an absolute value of said signal intensity of said high-frequency luminance component at each of levels equal to or smaller than P-th level is equal to or smaller than sixth threshold value $G_t$, which is derived from a standard deviation of said signal intensity of said high-frequency luminance component at each of levels equal to or smaller than said P-th level; and
wherein said signal intensity of said high-frequency luminance component at each of levels equal to or smaller than said P-th level, is suppressed to substantially zero.

50. The method of claim 41,
wherein said specific condition is such that an absolute value of said signal intensity of said high-frequency luminance component at each of levels equal to or smaller than said P-th level is equal to or smaller than seventh threshold value $D_t$, which is equal to or larger than fifth threshold value $C_t$, and both fifth threshold value $C_t$ and seventh threshold value $D_t$ are derived from a standard deviation of said signal intensity of said high-frequency luminance component at P-th level; and
wherein said signal intensity of said high-frequency luminance component at each of levels equal to or smaller than said P-th level, is suppressed to substantially zero, when said absolute value is equal to or smaller than fifth threshold value $C_t$; and
wherein both said fifth threshold value $C_t$ and said seventh threshold value $D_t$ are made to vary depending on a difference between signal intensities of low-frequency luminance components.

51. An apparatus for processing image signals representing an original image, said apparatus comprising:
a converting section to convert said image signals to luminance signals and chrominance signals;
a Dyadic Wavelet transformer to apply a Dyadic Wavelet transform processing to at least said luminance signals;
a suppressing section to suppress a signal intensity of a high-frequency luminance component at P-th level (P is an integer equal to or greater than 1), when said intensity of said high-frequency luminance component conforms to a specific condition;
a Dyadic Wavelet inverse-transformer to apply a Dyadic Wavelet inverse-transform processing to transformed and processed signals; and
a synthesizing section to synthesize processed luminance signals and said chrominance signals with each other to generate processed image signals.

52. An apparatus for processing image signals representing an original image, said apparatus comprising:
a converting section to convert said image signals to luminance signals and chrominance signals;
a Dyadic Wavelet transformer to apply a Dyadic Wavelet transform processing to at least said luminance signals;
a suppressing section to suppress a signal intensity of a high-frequency luminance component at a level equal to or lower than a P-th level (P is an integer equal to or greater than 2), when said intensity of said high-frequency luminance component conforms to a specific condition;
a Dyadic Wavelet inverse-transformer to apply a Dyadic Wavelet inverse-transform processing to transformed and processed signals; and
a synthesizing section to synthesize processed luminance signals and said chrominance signals with each other to generate processed image signals.

53. An apparatus for processing image signals representing an original image, said apparatus comprising:
a converting section to convert said image signals to luminance signals and chrominance signals;
a Dyadic Wavelet transformer to apply a Dyadic Wavelet transform processing to at least said luminance signals;
a suppressing section to suppress a signal intensity of a high-frequency luminance component at P-th level (P is an integer equal to or greater than 1), when said intensity of said high-frequency luminance component conforms to a specific condition;
a Dyadic Wavelet inverse-transformer to apply a Dyadic Wavelet inverse-transform processing to transformed and processed signals; and
a synthesizing section to synthesize processed luminance signals and said chrominance signals with each other to generate processed image signals;
wherein said specific condition is made to vary depending on a low-frequency luminance component.

54. An apparatus for processing image signals representing an original image, said apparatus comprising:
a converting section to convert said image signals to luminance signals and chrominance signals;
a Dyadic Wavelet transformer to apply a Dyadic Wavelet transform processing to at least said luminance signals;
a suppressing section to suppress a signal intensity of a high-frequency luminance component at a level equal to or lower than P-th level, when said intensity of said high-frequency luminance component conforms to a specific condition;
a Dyadic Wavelet inverse-transformer to apply a Dyadic Wavelet inverse-transform processing to transformed and processed signals; and
a synthesizing section to synthesize processed luminance signals and said chrominance signals with each other to generate processed image signals;
wherein said specific condition is made to vary depending on a difference between signal intensities of low-frequency luminance components.

55. A computer program for executing image-processing operations to process image signals representing an original image, said computer program comprising the functional steps of:
    converting said image signals to luminance signals and chrominance signals;
    applying a Dyadic Wavelet transform processing to at least said luminance signals;
    suppressing a signal intensity of a high-frequency luminance component at P-th level (P is an integer equal to or greater than 1), when said intensity of said high-frequency luminance component conforms to a specific condition;
    applying a Dyadic Wavelet inverse-transform processing to transformed and processed signals; and
    synthesizing processed luminance signals and said chrominance signals with each other to generate processed image signals.

56. A computer program Computer readable medium for executing image-processing operations to process image signals representing an original image, said computer program comprising the functional steps of:
    converting said image signals to luminance signals and chrominance signals;
    applying a Dyadic Wavelet transform processing to at least said luminance signals;
    suppressing a signal intensity of a high-frequency luminance component at a level equal to or lower than a P-th level (P is an integer equal to or greater than 2), when said intensity of said high-frequency luminance component conforms to a specific condition;
    applying a Dyadic Wavelet inverse-transform processing to transformed and processed signals; and
    synthesizing processed luminance signals and said chrominance signals with each other to generate processed image signals.

57. A computer program Computer readable medium for executing image-processing operations to process image signals representing an original image, said computer program comprising the functional steps of:
    converting said image signals to luminance signals and chrominance signals;
    applying a Dyadic Wavelet transform processing to at least said luminance signals;
    suppressing a signal intensity of a high-frequency luminance component at a P-th level (P is an integer equal to or greater than 1), when said intensity of said high-frequency luminance component conforms to a specific condition;
    applying a Dyadic Wavelet inverse-transform processing to transformed and processed signals; and
    synthesizing processed luminance signals and said chrominance signals with each other to generate processed image signals;
    wherein said specific condition is made to vary depending on a low-frequency luminance component.

58. A computer program Computer readable medium for executing image-processing operations to process image signals representing an original image, said computer program comprising the functional steps of:
    converting said image signals to luminance signals and chrominance signals;
    applying a Dyadic Wavelet transform processing to at least said luminance signals;
    suppressing a signal intensity of a high-frequency luminance component at a level equal to or lower than P-th level, when said intensity of said high-frequency luminance component conforms to a specific condition;
    applying a Dyadic Wavelet inverse-transform processing to transformed and processed signals; and
    synthesizing processed luminance signals and said chrominance signals with each other to generate processed image signals;
    wherein said specific condition is made to vary depending on a difference between signal intensities of low-frequency luminance components.

59. An apparatus for recording an image based on a processed image signals onto a recording medium, said apparatus comprising:
    an image-processing section to process image signals representing an original image, so as to generate said processed image signals; and
    an image-recording section to record said image, based on said processed image signals generated by said image-processing section, onto said recording medium;
    wherein said image-processing section includes:
        a converting section to convert said image signals to luminance signals and chrominance signals;
        a Dyadic Wavelet transformer to apply a Dyadic Wavelet transform processing to at least said luminance signals;
        a suppressing section to suppress a signal intensity of a high-frequency luminance component at P-th level (P is an integer equal to or greater than 1), when said intensity of said high-frequency luminance component conforms to a specific condition;
        a Dyadic Wavelet inverse-transformer to apply a Dyadic Wavelet inverse-transform processing to transformed and processed signals; and
        a synthesizing section to synthesize processed luminance signals and said chrominance signals with each other to generate said processed image signals.

60. An apparatus for recording an image based on a processed image signals onto a recording medium, said apparatus comprising:
    an image-processing section to process image signals representing an original image, so as to generate said processed image signals; and
    an image-recording section to record said image, based on said processed image signals generated by said image-processing section, onto said recording medium;
    wherein said image-processing section includes:
        a converting section to convert said image signals to luminance signals and chrominance signals;
        a Dyadic Wavelet transformer to apply a Dyadic Wavelet transform processing to at least said luminance signals;
        a suppressing section to suppress a signal intensity of a high-frequency luminance component at a level equal to or lower than a P-th level (P is an integer equal to or greater than 2), when said intensity of said high-frequency luminance component conforms to a specific condition;
        a Dyadic Wavelet inverse-transformer to apply a Dyadic Wavelet inverse-transform processing to transformed and processed signals; and
        a synthesizing section to synthesize processed luminance signals and said chrominance signals with each other to generate said processed image signals.

61. An apparatus for recording an image based on a processed image signals onto a recording medium, said apparatus comprising:

an image-processing section to process image signals representing an original image, so as to generate said processed image signals; and an image-recording section to record said image, based on said processed image signals generated by said image-processing section, onto said recording medium;

wherein said image-processing section includes:
- a converting section to convert said image signals to luminance signals and chrominance signals;
- a Dyadic Wavelet transformer to apply a Dyadic Wavelet transform processing to at least said luminance signals;
- a suppressing section to suppress a signal intensity of a high-frequency luminance component at P-th level (P is an integer equal to or greater than 1), when said intensity of said high-frequency luminance component conforms to a specific condition;
- a Dyadic Wavelet inverse-transformer to apply a Dyadic Wavelet inverse-transform processing to transformed and processed signals; and
- a synthesizing section to synthesize processed luminance signals and said chrominance signals with each other to generate said processed image signals; and wherein said specific condition is made to vary depending on a low-frequency luminance component.

62. An apparatus for recording an image based on a processed image signals onto a recording medium, said apparatus comprising:

an image-processing section to process image signals representing an original image, so as to generate said processed image signals; and an image-recording section to record said image, based on said processed image signals generated by said image-processing section, onto said recording medium;

wherein said image-processing section includes:
- a converting section to convert said image signals to luminance signals and chrominance signals;
- a Dyadic Wavelet transformer to apply a Dyadic Wavelet transform processing to at least said luminance signals;
- a suppressing section to suppress a signal intensity of a high-frequency luminance component at a level equal to or lower than P-th level, when said intensity of said high-frequency luminance component conforms to a specific condition;
- a Dyadic Wavelet inverse-transformer to apply a Dyadic Wavelet inverse-transform processing to transformed and processed signals; and
- a synthesizing section to synthesize processed luminance signals and said chrominance signals with each other to generate said processed image signals; and wherein said specific condition is made to vary depending on a difference between signal intensities of low-frequency luminance components.

* * * * *